(12) United States Patent
Shinohara et al.

(10) Patent No.: US 9,010,932 B2
(45) Date of Patent: Apr. 21, 2015

(54) SPECTACLE LENS

(75) Inventors: Toshihide Shinohara, Chino (JP);
Takateru Mori, Komiina-gun (JP)

(73) Assignee: Hoya Lens Manufacturing Philippines Inc., Cavite (PH)

( * ) Notice: Subject to any disclaimer, the term of this patent is extended or adjusted under 35 U.S.C. 154(b) by 0 days.

(21) Appl. No.: 14/000,705

(22) PCT Filed: Feb. 20, 2012

(86) PCT No.: PCT/JP2012/054684
§ 371 (c)(1),
(2), (4) Date: Nov. 12, 2013

(87) PCT Pub. No.: WO2012/115258
PCT Pub. Date: Aug. 30, 2012

(65) Prior Publication Data
US 2014/0055742 A1 Feb. 27, 2014

(30) Foreign Application Priority Data

Feb. 23, 2011 (JP) ................. 2011-036808
Feb. 23, 2011 (JP) ................. 2011-036809
Feb. 23, 2011 (JP) ................. 2011-036810

(51) Int. Cl.
*G02C 7/06* (2006.01)

(52) U.S. Cl.
CPC ............. *G02C 7/061* (2013.01); *G02C 7/068* (2013.01); *G02C 7/063* (2013.01)

(58) Field of Classification Search
CPC .......... G02C 7/024; G02C 7/028; G02C 7/06; G02C 7/061; G02C 7/063; G02C 7/065; G02C 7/066; G02C 7/068
USPC .............. 351/159.01, 159.41–159.43, 159.54
See application file for complete search history.

(56) References Cited

U.S. PATENT DOCUMENTS

| 5,920,372 A | 7/1999 | Guilino et al. |
| 2004/0233385 A1 | 11/2004 | Kitani et al. |
| 2011/0037944 A1 | 2/2011 | Varnas |

FOREIGN PATENT DOCUMENTS

| EP | 1 691 232 A1 | 8/2006 |
| EP | 1691232 A1 * | 8/2006 ............... G02C 7/06 |

(Continued)

OTHER PUBLICATIONS

International Search Report issued in International Patent Application No. PCT/JP2012/054684 dated Aug. 7, 2012.

(Continued)

*Primary Examiner* — Suchin Parihar
*Assistant Examiner* — William R Alexander
(74) *Attorney, Agent, or Firm* — Oliff PLC

(57) ABSTRACT

A progressive power lens 10 for spectacles has a distance portion 11 and a near portion 12 of different powers. A surface power OMHP in a horizontal direction on an object-side surface along a principal meridian 14 or a vertical reference line passing through a fitting point Pe, a surface power OMVP (y) in a vertical direction of the object-side surface, the absolute value IMHP of a surface power on an eye-side surface, and the absolute value IMVP of a surface power in a vertical direction on the eye-side surface satisfy the following condition. OMHP(y)>OMVP(y) IMHP(y)>IMVP(y) OMHP(y)–OMVP(y)=IMHP(y)–IMVP(y) In the conditions, y is a coordinate along the principal meridian or the vertical reference line.

20 Claims, 42 Drawing Sheets

(56) References Cited

FOREIGN PATENT DOCUMENTS

| | | |
|---|---|---|
| EP | 2 237 100 A1 | 10/2010 |
| JP | A-2003-344813 | 12/2003 |
| JP | A-2004-4436 | 1/2004 |
| WO | WO 97/19382 A1 | 5/1997 |
| WO | WO 97/19383 A1 | 5/1997 |
| WO | WO 99/63392 A1 | 12/1999 |

OTHER PUBLICATIONS

Written Opinion issued in International Patent Application No. PCT/JP2012/054684 dated Aug. 7, 2012.

* cited by examiner

SPECTACLE LENS

TECHNICAL FIELD

The present invention relates to a spectacle lens.

BACKGROUND ART

WO97/19382 describes a progressive multifocal lens that is used as a spectacle lens suitable for correction of presbyopia or the like. In this progressive multifocal lens, a progressive surface conventionally attached to the object-side surface is provided on the eye-side surface. Accordingly, since the object-side surface can be a spherical surface with a constant base curve, it becomes possible to prevent the variations in magnification due to a shape factor, to reduce the difference in magnification between a distance portion and a near portion, and to suppress the variations in magnification in the progressive portion. Therefore, it is possible to reduce the image sway or distortion due to the difference in magnification, thereby providing a progressive multifocal lens that provides a comfortable field of view. In the progressive multifocal lens described in WO97/19382, it becomes possible to combine the progressive surface and the toric surface for astigmatism correction on the eye-side surface using a combination expression, thereby reducing the image sway or distortion even in a progressive multifocal lens for astigmatism correction.

WO97/19383 describes a multifocal lens for spectacles that has visual field portions being different in power, such as a distance portion and a near portion. In this multifocal lens, the difference between the average surface power of the distance portion and the average surface power of the near portion on the object-side surface is set to be numerically smaller than a predetermined addition power, and the average surface power of the distance portion and the average surface power of the near portion on the eye-side surface are adjusted, thereby providing a multifocal lens for spectacles with the predetermined addition power. It becomes possible to adjust the average surface power of the object-side surface such that the difference in magnification between the distance portion and the near portion is reduced, and to reduce the difference in the average surface power of the object-side surface. Therefore, it is possible to provide a multifocal lens that has less sway or distortion of images due to the difference in magnification, and obtains a comfortable field of view with improved astigmatism, a wide range of distinct vision, less image sway, and the like.

JP-A-2003-344813 describes a double-sided aspheric progressive power lens that reduces the difference in magnification of images between a distance portion and a near portion, allows satisfactory vision correction with reference to a prescription value, and provides an effective wide field of view with less distortion when wearing. For this reason, in JP-A-2003-344813, when the surface power in the horizontal direction and the surface power in the vertical direction at a distance portion power measurement position F1 in a first refractive surface on the object-side surface are respectively DHf and DVf, and the surface power in the horizontal direction and the surface power in the vertical direction at a near power measurement position N1 in the first refractive surface are respectively DHn and DVn, the relational expressions DHf+DHn<DVf+DVn and DHn<DVn are satisfied. The surface astigmatism components at the positions F1 and N1 on the first refractive surface are balanced with a second refractive surface on the eye-side surface, and the distance portion power and the addition power based on a prescription value are given with the combination of the first and second refractive surfaces.

JP-A-2004-004436 describes a progressive power lens that can reduce image distortion or blurring inherent in the progressive power lens and can improve wearability. For this reason, in JP-A-2004-004436, a double-sided progressive lens with both the outer surface and the inner surface are progressive surfaces is prepared, the surface addition power of the outer surface is made negative, and the shape of the progressive surface is designed such that the average surface power distribution of the outer surface and the inner surface are made similar.

According to these techniques, the performance of the progressive power lens is being improved, but there are still users who may not be compatible with the characteristics of the progressive power lens, in particular, sway. Thus, there is demand for further improvement.

SUMMARY OF INVENTION

An aspect of the invention provides a progressive power lens for spectacles that has a distance portion and a near portion of different powers. A surface power OMHP(y) in a horizontal direction on an object-side surface along a principal meridian or a vertical reference line passing through a fitting point, a surface power OMVP(y) in a vertical direction on the object-side surface, the absolute value IMHP(y) of a surface power in a horizontal direction on an eye-side surface, and the absolute value IMVP (y) of a surface power in a vertical direction on the eye-side surface satisfy the following conditions.

$$OMHP(y) > OMVP(y) \quad (1)$$

$$IMHP(y) > IMVP(y) \quad (2)$$

$$OMHP(y) - OMVP(y) = IMHP(y) - IMVP(y) \quad (3)$$

In the conditions, y is a coordinate along the principal meridian or the vertical reference line. These conditions and the following conditions do not include a prescription for astigmatism. That is, these conditions do not include a prescription for astigmatism in a prescription for a distance portion. The same is also applied to the following description.

The progressive power lens includes elements of toric surfaces (also called a toroidal surface) along at least the principal meridian or the vertical reference line passing through the fitting point (both may be called a principal meridian) on both the object-side surface and the eye-side surface. The elements of the toric surfaces on both the object-side surface and the eye-side surface have the curvature in the lateral direction (horizontal direction) greater than the curvature in the longitudinal direction (vertical direction). That is, the radius of curvature in the longitudinal direction is greater than the radius of curvature in the lateral direction. The shifts in the surface power by the elements of the toric surfaces are cancelled by the elements of both the toric surfaces. Therefore, the elements of the toric surfaces are not intended for astigmatism correction, and are effective for suppressing the sway of images having passed through a spectacle lens involved in the movement of the eyes (line of sight).

Usually, the movement of the line of sight (eyes) when sway occurs in the images obtained through the spectacle lens is caused by the movement of the eyeballs (line of sight) with respect to the head by vestibulo-ocular reflex compensating for the movement of the head. In regard to the movement range of the line of sight, in general, the horizontal direction (lateral direction) is wide due to vestibulo-ocular reflex. Accordingly, the elements of a toric surface with a surface power in a horizontal direction greater than a surface power in a vertical direction are introduced to the object-side surface and the eye-side surface, such that, when the line of sight moves in the horizontal direction, it is possible to suppress variation in the angle at which the line of sight passes through a spectacle lens (the entrance angle and the exit angle of the line of sight with respect to the surface of the spectacle lens). For this reason, it is possible to reduce aberrations of the images obtained through the spectacle lens when the line of sight moves. Therefore, it is possible to provide a spectacle lens with less sway of images obtained through the spectacle lens.

The condition (3) is a conditional expression when the thickness of the lens is small. In general, a conditional expression (3a) with a shape factor taking into consideration the thickness of the lens for use in calculating the power of a spectacle lens is as follows.

$$IMHP(y)-IMVP(y)=OMHP(y)/(1-t/n*OMHP(y))-OMVP(y)/(1-t/n*OMVP(y)) \quad (3a)$$

Therefore, instead of the condition (3), the condition (3a) is available. Here, t is the thickness (unit meter) of the progressive power lens, and n is the refractive index of a base material of the progressive power lens. The same is also applied to the following description.

In order to calculate the power more accurately, in a lens peripheral portion, the y coordinate in the conditions (3) and (3a) may be obtained by ray trace for a shift between the outer side and the inner side at the transmission position of the line of sight on the lens, and may be applied.

Although a method that manipulates the surface power on the eye side (inner side) so as to cancel the elements of the toric surface applied to the object side (outer side) includes a method taking into consideration the thickness of the lens, and the detailed path of rays passing through the lens, the object can be substantially attained by the condition (3).

It is preferable that the progressive power lens further satisfies the following condition.

$$OMHP(y)-OMVP(y)=IMHP(y)-IMVP(y)=C0 \quad (4)$$

It is preferable that C0 is a constant and satisfies the following range.

$$1(D)<C0<6(D) \quad (5)$$

The unit D is dioptre. The same is also applied to the following description.

It is more preferable that the constant C0 satisfies the following range.

$$1(D)<C0<4(D) \quad (5')$$

A progressive power lens that has a surface with the difference between the surface power in the horizontal direction (lateral direction) and the surface power in the vertical direction (longitudinal direction) constant is comparatively easily manufactured. Therefore, it is possible to provide a progressive power lens with less sway at low cost.

In the progressive power lens, it is preferable that the eye-side surface is a progressive surface. It is possible to provide a spectacle lens with less variation in magnification or distortion of images obtained through the spectacle lens.

In the progressive power lens, it is preferable that a surface power OHP(y) in the horizontal direction on the object-side surface within a range of ±10 mm with the principal meridian or the vertical reference line interposed, a surface power OVP(y) in the vertical direction on the object-side surface, the absolute value IHP(y) of a surface power in the horizontal direction on the eye-side surface, and the absolute value IVP(y) of a surface power in the vertical direction on the eye-side surface satisfy the following conditions.

$$OHP(x, y)>OVP(x, y) \quad (6)$$

$$IHP(x, y)>IVP(x, y) \quad (7)$$

$$OHP(x, y)-OVP(x, y)=IHP(x, y)-IVP(x, y)=C0 \quad (8)$$

In the conditions, x is the coordinate of a horizontal reference line passing through the fitting point.

In regard to the visual characteristics of a person when the progressive power lens is used, the use frequency on the principal meridian is very high, and image sway is found when a visual operation is carried out using near the principal meridian. Therefore, if a shift in the intensity direction of the surface power OHP in the horizontal direction is within at least ±10 mm in the horizontal direction with the principal meridian as a center, it is possible to sufficiently obtain an image sway reduction effect.

In the progressive power lens, it is preferable that the following conditions are satisfied within a range of ±10 mm with the principal meridian or the vertical reference line interposed.

$$OHP(x, y)=C1 \quad (9)$$

$$OVP(x, y)=C2 \quad (10)$$

According to the above-described conditions, a region on the object-side surface with the principal meridian or the vertical reference line interposed can be constituted by a comparatively simple toric surface with the surface power in the horizontal direction and the surface power in the vertical direction constant. Therefore, it is possible to provide a progressive power with less sway at lower cost. A usual progressive power lens is a progressive power lens in which the object-side surface is a toric surface.

Another aspect of the invention provides a method of designing a multi focal spectacle lens that includes a distance portion and a near portion of different powers. The method includes the following steps.

Setting a surface power OMHP (y) in a horizontal direction on an object-side surface along a principal meridian or a vertical reference line passing through a fitting point, a surface power OMVP(y) in a vertical direction on the object-side surface, the absolute value IMHP(y) of a surface power in a horizontal direction on an eye-side surface, and the absolute value IMVP(y) of a surface power in a vertical direction on the eye-side surface so as to satisfy the conditions (1) to (3)

It is effective that the selection is done so as to satisfy the conditions (4), (6) to (8), and (9) and (10).

Still another aspect of the invention provides a progressive power lens for spectacles that has a distance portion and a near portion of different powers. When a surface power in a horizontal direction and a surface power in a vertical direction of the distance portion on an object-side surface along a principal meridian or a vertical reference line passing through a fitting point are OHPf and OVPf, and a surface power in a horizontal direction and a surface power in a vertical direction of the near portion are OHPn and OVPn, the object-side surface includes elements of a toric surface with the surface power OHPf greater than the surface power OVPf. An eye-side surface along the principal meridian or the vertical reference line includes elements that cancel shifts in the surface power by the elements of the toric surface on the object-side surface. That is, the progressive power lens satisfies the following condition.

$$OHPf>OVPf \quad (11)$$

The progressive power lens further satisfies the following condition.

$$OHPf+OHPn>OVPf+OVPn \quad (12)$$

$$OVPn>OVPf \quad (13)$$

The progressive power lens is an outer surface progressive lens that includes the elements of the toric surface (also called a toroidal surface) along the principal meridian or the vertical reference line passing through the fitting point (both may be called a principal meridian) on the object-side surface (outer surface). The elements of the toric surface on the object-side surface have the surface power OHPf in the horizontal direction greater than the surface power OVPf in the vertical direction of the distance portion. The sum of the surface power OHPf in the horizontal direction of the distance portion and the surface power OHPn in the horizontal direction of the near portion is greater than the sum of the surface power OVPf in the vertical direction of the distance portion and the surface power OVPn in the vertical direction of the near portion. That is, the surface power in the horizontal direction is set to be greater than the surface power in the vertical direction as the whole of the lens. The surface power OVPn in the vertical direction of the near portion is set to be greater than the surface power OVPf in the vertical direction of the distance portion on the principal meridian of the object-side surface, and progressively increases from the distance portion toward the near portion in the intermediate portion of the principal meridian.

In general, in regard to the movement range of the line of sight, the horizontal direction (lateral direction) is wide due to vestibulo-ocular reflex. Accordingly, the elements of the toric surface with the surface power in the horizontal direction greater than the surface power in the vertical direction are introduced to the object-side surface, such that, when the line of sight moves in the horizontal direction, it is possible to suppress variations in the angle at which the line of sight passes through the object-side surface of the spectacle lens. For this reason, it is possible to reduce aberrations of images obtained through the spectacle lens when the line of sight moves, thereby providing a spectacle lens with less sway of images obtained through the spectacle lens.

In the progressive power lens, the addition power of the object-side surface may be obtained by the surface power in the vertical direction and the power in the horizontal direction. However, the manufacturing of the object-side surface becomes complicated. For this reason, it is preferable that the addition power is provided on the object-side surface by the smaller surface power in the vertical direction. The addition power of the surface power in the horizontal direction can be provided on the eye-side surface (inner surface).

It is preferable that a surface power IHPf in the horizontal direction and a surface power IVPf in the vertical direction of the distance portion on the eye-side surface (inner surface) along the principal meridian or the vertical reference line, and a surface power IHPn in the horizontal direction and a surface power IVPn in the vertical direction of the near portion satisfy the following conditions.

$$OHPf-OVPf=IHPf-IVPf \quad (14)$$

$$OHPn-OVPn=IHPn-IVPn \quad (15)$$

In the conditions, the surface powers IHPf, IVPf, IHPn, and IVPn are absolute values. The same is also applied to the following description.

With the conditions (14) and (15), the elements of the toric surface that cancel shifts in the power by the elements of the toric surface in the distance portion and the near portion on the outer surface can be provided in the distance portion and the near portion on the inner surface. Therefore, even in the intermediate portion, it is possible to provide the elements of the toric surface that cancel shifts in the power by the elements of the toric surface on the outer surface.

The conditions (14) and (15) are conditional expressions when the thickness of the lens is small. In general, conditional expressions (4a) and (5a) with a shape factor taking into consideration the thickness of the lens for use in calculating the power of a spectacle lens are as follows.

$$IHPf-IVPf=OHPf/(1-t/n*OHPf)-OVPf/(1-t/n*OVPf) \quad (14a)$$

$$IHPn-IVPn=OHPn/(1-t/n*OHPn)-OVPn/(1-t/n*OVPn) \quad (15a)$$

With the use of the expressions (14) and (15) taking into consideration the thickness of the lens, while it is possible to cancel the elements of the toric surface applied to the outer surface on the inner surface with higher precision, the object can be substantially attained by the abbreviated expressions of the expressions (19) and (15).

The elements of the toric surface on the outer surface are cancelled by the elements of the toric surface on the inner surface, such that, while the elements of the toric surfaces on the inner and outer surfaces are not intended for astigmatism correction, the sway of images having passed through the spectacle lens involved in the movement of the eyes (line of sight) is suppressed. Thus, it is more effectively available.

It is preferable that the progressive power lens further satisfies the following conditions.

$$IHPf>IVPf \quad (16)$$

$$IHPn>IVPn \quad (17)$$

$$IHPf>IHPn \quad (18)$$

Although the conditions (16) and (17) are substantially equivalent to the conditions (14) and (15), the elements of the toric surface with the surface power in the horizontal direction greater than the surface power in the vertical direction are introduced to the inner surface, thereby cancelling shifts in the surface power by the elements of the toric surface on the outer surface. With the condition (18), it is possible to secure the addition power of the surface power in the horizontal direction on the inner surface.

It is also effective that the progressive power lens satisfies the following conditions.

$$OHPf=OHPn \quad (19)$$

$$IVPf=IVPn \quad (20)$$

With the conditions (19) and (20), it is possible to make the surface power in the horizontal direction on the outer surface constant (uniform), and to make the surface power in the vertical direction on the inner surface constant, thereby providing a progressive power lens with ease of manufacturing and less aberration.

In the progressive power lens, it is preferable that, when there is no prescription for astigmatism in a prescription for a distance portion, the following conditions are further satisfied.

$$OHPf-OVPf=IHPf-IVPf=C1 \quad (14')$$

$$OHPn-OVPn=IHPn-IVPn=C2 \quad (15')$$

It is preferable that the constants C1 and C2 satisfy the following range.

$$1(D)<C1,C2<6(D) \quad (21)$$

It is more preferable that the constants C1 and C2 satisfy the following range.

$$1(D)<C1,C2<4(D) \quad (21')$$

In the progressive power lens, it is preferable that the conditions are satisfied within a range of ±10 mm with the principal meridian or the vertical reference line interposed. When the progressive power lens is used, image sway is found when a visual operation is carried out using near the principal meridian. Accordingly, if a shift in the intensity direction of the surface power OHP in the horizontal direction is within at least ±10 mm in the horizontal direction with the principal meridian as a center, it is possible to sufficiently obtain the effect of reducing image sway.

Yet another aspect of the invention provides a progressive power lens for spectacles that has a distance portion and a near portion of different powers. When a surface power in a horizontal direction and a surface power in a vertical direction of the distance portion on an object-side surface along a principal meridian or a vertical reference line passing through a fitting point are OHPf and OVPf, a surface power in a horizontal direction and a surface power in a vertical direction of the near portion on the object-side surface along the principal meridian or the vertical reference line are OHPn and OVPn, and a surface power in a vertical direction of the distance portion and a surface power in a vertical direction of the near portion on an eye-side surface along the principal meridian or the vertical reference line are IVPf and IVPn, the object-side surface includes elements of a toric surface with the surface power OHPf greater than the surface power OVPf and the surface power OHPn greater than the surface power OVPn. The eye-side surface along the principal meridian or the vertical reference line includes elements that cancel shifts in the surface power by the elements of the toric surface on the object-side surface. That is, the progressive power lens satisfies the following conditions.

$$OHPf>OVPf \quad (11)$$

$$OHPn>OVPn \quad (22)$$

The progressive power lens further satisfies the following conditions.

$$OVPf>OVPn \quad (23)$$

$$IVPf-IVPn>OVPf-OVPn \quad (24)$$

In the progressive power lens, contrary to the addition power, the surface power of the near portion on the object-side surface is smaller than the surface power of the distance portion (condition (23)), thereby reducing the difference in magnification between images obtained through the distance portion of the progressive power lens and images obtained through the near portion. The addition power can be secured by making the difference between the surface power of the near portion and the surface power of the distance portion on the eye-side surface (inner surface) greater than the difference between the surface power of the near portion and the distance portion on the outer surface (condition (24)). The progressive power lens includes the elements of the toric surface with the surface power in the horizontal direction greater than the surface power in the vertical direction on the outer surface. Therefore, it is possible to provide a progressive power lens with less sway.

In regard to the movement range of the line of sight, in general, the horizontal direction (lateral direction) is wide due to vestibulo-ocular reflex. Accordingly, the elements of the toric surface with the surface power in the horizontal direction greater than the surface power in the vertical direction are introduced to the object-side surface, such that, when the line of sight moves in the horizontal direction, it is possible to suppress variations in the angle at which the line of sight passes through the object-side surface of the spectacle lens. Therefore, it is possible to aberrations of images obtained through the spectacle lens when the line of sight moves, thereby providing a spectacle lens with less sway of images obtained through the spectacle lens.

Regressive elements on the object-side surface may be introduced by the surface power in the vertical direction and the surface power in the horizontal direction. However, the structure of the object-side surface becomes complicated. For this reason, it is preferable that the regressive elements are introduced to the object-side surface by the smaller surface power in the vertical direction. It is possible to provide a progressive power lens with less image sway at low cost.

It is preferable that a surface power IHPf in the horizontal direction of the distance portion and a surface power IHPn in the horizontal direction of the near portion on the eye-side surface (inner surface) along the principal meridian or the vertical reference line satisfy the conditions (14) and (15).

With the conditions (14) and (15), the elements of the toric surface that cancel shifts in the power by the elements of the toric surface in the distance portion and the near portion on the outer surface can be provided in the distance portion and the near portion on the inner surface. Therefore, even in the intermediate portion, it is possible to provide the elements of the toric surface that cancel shifts in the power by the elements of the toric surface on the outer surface.

The conditions (14) and (15) are conditional expressions when the thickness of the lens is small. In general, conditional expressions (14a) and (15a) with a shape factor taking into consideration the thickness of the lens for use in calculating the power of a spectacle lens are as follows.

With the use of the expressions (14a) and (15a) taking into consideration the thickness of the lens, while it is possible to cancel the elements of the toric surface applied to the outer surface on the inner surface with higher precision, the object can be substantially attained by the abbreviated expressions of the expressions (14) and (15).

The elements of the toric surface on the outer surface are cancelled by the elements of the toric surface on the inner surface, such that, while the elements of the toric surfaces on the inner and outer surfaces are not intended for astigmatism correction, sway of images having passed through the spectacle lens involved in the movement of the eyes (line of sight) is suppressed. Thus, it is more effectively available.

It is preferable that the progressive power lens satisfies the conditions (16), (17), and (18).

Although the conditions (16) and (17) are substantially equivalent to the conditions (14) and (15), the elements of the toric surface with the surface power in the horizontal direction greater than the surface power in the vertical direction are introduced to the inner surface, thereby cancelling shifts in the surface power by the elements of the toric surface on the outer surface. With the condition (18), it is possible to secure a predetermined addition power of the surface power in the horizontal direction on the inner surface.

It is also effective that the progressive power lens satisfies the condition (19). It is possible to make the surface power in the horizontal direction on the outer surface constant (uniform), and to make the surface power in the vertical direction on the inner surface constant, thereby providing a progressive power lens with ease of manufacturing and less aberration.

It is preferable that the progressive power lens further satisfies the conditions (14') and (15'). It is preferable that the constants C1 and C2 satisfy the condition (21). It is more preferable that the constants C1 and C2 satisfy the condition (21').

In the progressive power lens, it is preferable that the conditions are satisfied within a range of ±10 mm with the principal meridian or the vertical reference line interposed. When the progressive bower lens is used, image sway is found when a visual operation is carried out using near the principal meridian. Accordingly, if a shift in the intensity direction of the surface power OHP in the horizontal direction is within at least ±10 mm in the horizontal direction with the principal meridian as a center, it is possible to sufficiently obtain the effect of reducing image sway.

Still yet another aspect of the invention provides a, spectacle that includes the above-described progressive power lens, and a frame to which the progressive power lens is attached.

DESCRIPTION OF EMBODIMENTS

Figure 1:
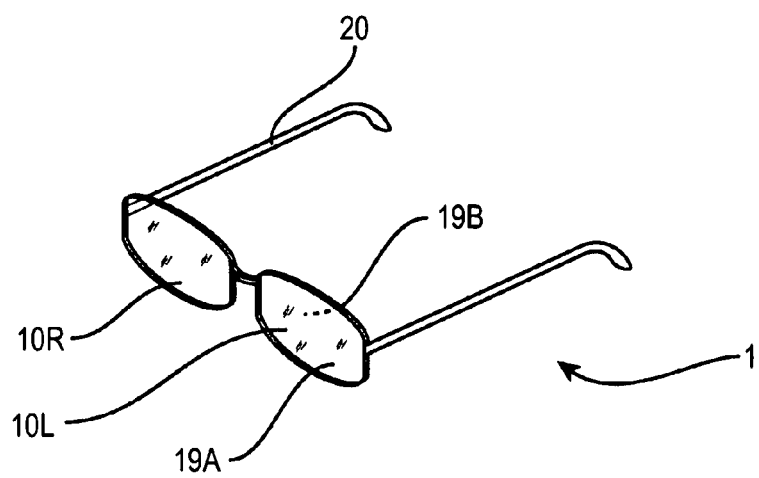
FIG. 1 is a perspective view showing an example of spectacles.
Figures 2A, 2B:
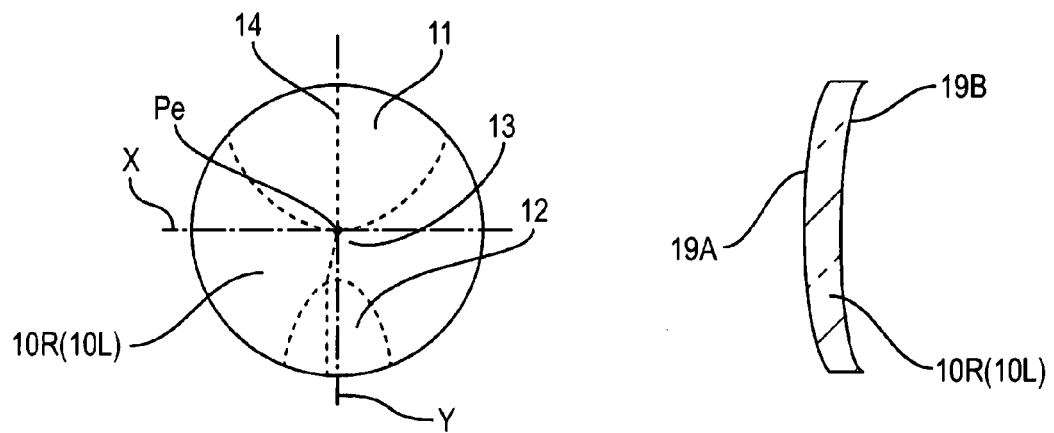
FIG. 2A is a plan view schematically showing one lens of a progressive power lens.
FIG. 2B is a sectional view of the progressive power lens.

FIG. 1 is a perspective view showing an example of spectacles. FIG. 2A is a plan view schematically showing one lens of a progressive power lens according to an embodiment of the invention. FIG. 2B is a sectional view schematically showing the progressive power lens shown in FIG. 2A.

In this example, when viewed from a user side (user side, a wearer side, or an eye side), the left side is referred to as left, and the right side is referred to as right. Spectacles 1 have a pair of left and right spectacle lenses 10L and 10R for left and right eyes, and a frame 20 in which the lenses 10L and 10R are mounted. The spectacle lenses 10L and 10R are progressive power lenses, specifically, progressive multifocal lenses (progressive power lenses). The lenses 10L and 10R are meniscus lenses whose basic shape is convex toward the object side. Therefore, each of the lenses 10L and 10R has an object-side surface (convex surface, hereinafter, referred to as an outer surface) 19A and an eye-side (user-side) surface (concave surface, hereinafter, referred to as an inner surface) 19B.

FIG. 2A shows the right-eye lens 10R. The lens 10R includes a distance portion 11 which is an upper visual field portion for seeing an object at a long distance (distant vision) and a near portion 12 which is a lower visual field portion for seeing an object at a short distance, of power different from the distance portion 11 (near vision). The lens 10R also includes an intermediate portion (a portion of an intermediate vision, a progressive portion, or a progressive zone) 13 which connects the distance portion 11 and the near portion 12 such that the power continuously changes. The lens 10R includes a principal meridian 19 which connects the position on the lens as the center of the field of view in a distant vision, an intermediate vision, or a near vision. When the spectacle lens 10R with the outer circumference based on the frame is fitted into the frame, usually, a fitting point Pe as a reference point on the lens through which the line of sight in a distant horizontal front vision (primary position of the eye) passes is substantially located at the lower end of the distance portion 11. In the following description, the fitting point Pe is referred to as the coordinate origin of the lens, the coordinate in the horizontal direction is referred to as an X coordinate, and the coordinate in the vertical direction is referred to as a Y coordinate. The principal meridian 14 substantially extends vertically from the distance portion 11 toward the near portion 12, and is bent toward the nose when having reached the fitting point Pe with respect to the Y coordinate.

Although the following description will be provided focusing on the right-eye spectacle lens 10R as a spectacle lens, a spectacle lens or a lens may be the left-eye spectacle lens 10L. The left-eye spectacle lens 10L is horizontally symmetrical to the right-eye spectacle lens 10R, except for the difference between the spectacle specifications of the left and right eyes. In the following description, the right-eye and left-eye spectacle lenses 10R and 10L are commonly called a spectacle lens (or lens) 10.

Of the optical performance of the progressive power lens 10, the width of the field of view can be known by an astigmatism distribution map or an equivalent spherical surface power distribution map. As one of the performance of the progressive power lens 10, sway which is found when the head with the progressive power lens 10 moves is important. Even when the astigmatism distribution or the equivalent spherical power distribution is substantially the same, in regard to sway, a difference may occur. In the following description, first, a sway evaluation method will be described. The comparison result of an embodiment of the invention and the related art using the evaluation method is shown.

1. Sway Evaluation Method

Figure 3A:
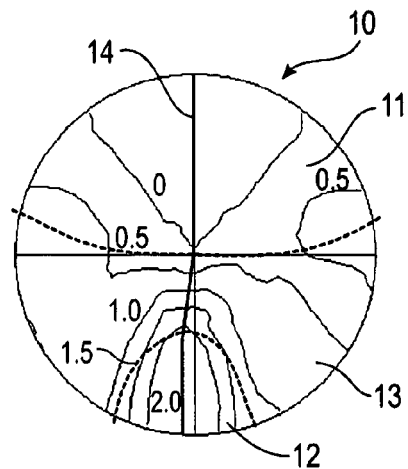
FIG. 3A is a diagram showing an equivalent spherical power distribution of a spectacle lens.
Figure 3B:
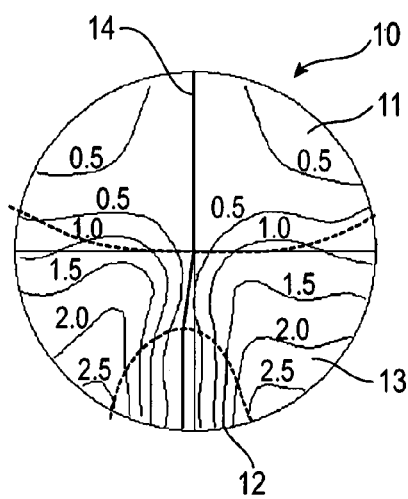
FIG. 3B is a diagram showing an astigmatism distribution of a spectacle lens.
Figure 3C:
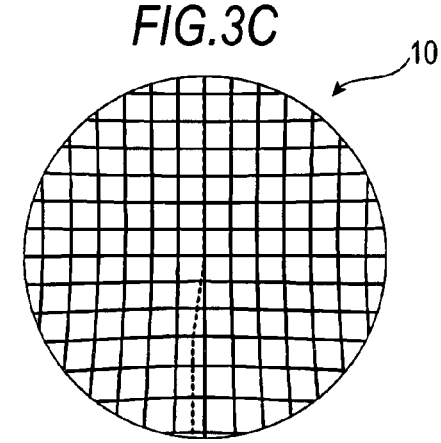
FIG. 3C is a diagram showing the state of distortion when a square grid is viewed.

FIG. 3A shows an equivalent spherical power distribution (the unit is dioptre (D)) of a typical progressive power lens 10, FIG. 3B shows an astigmatism distribution (the unit is dioptre (D)), and FIG. 3C shows the state of distortion when a square grid is viewed through the lens 10. In the progressive power lens 10, predetermined power is added along the principal meridian 14. Accordingly, with the addition of power, large astigmatism is generated laterally to the intermediate region (intermediate portion or progressive portion) 13. In this portion, an object appears blurred. In regard to the equivalent spherical power distribution, power increases by a predetermined amount in the near portion 12, and sequentially decreases toward the intermediate portion 13 and the distance portion 11. In the progressive power lens 10, power (distance portion power, Sph) of the distance portion 11 is 3.00 D (dioptre), and the addition power (ADD) is 2.00 D.

Image magnification increases in the near portion 12 with a high power compared to the distance portion 11 due to the difference depending on the position on the progressive power lens 10, the square grid image appears distorted laterally to the near portion 12 from the intermediate portion 13. This causes image sway when the head moves.

Figure 4:
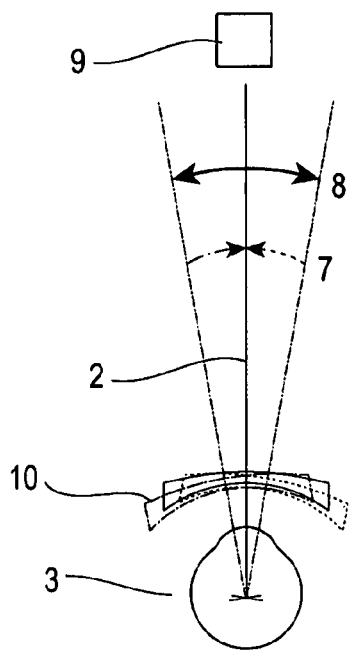
FIG. 4 is a diagram showing vestibulo-ocular reflex.

FIG. 4 shows the outline of vestibulo-ocular reflex (VOR). When a person sees an object, if the head moves, the range of view also moves. At this time, an image on the retina also moves. If there is the movement (the rotation of the eye) 7 of the eyeball 3 to cancel the movement (the rotation of the face or the rotation of the head) 8 of the head, the line of sight 2 is stable (does not move), and the retinal image does not move. A reflex eye movement which has a function of stabilizing the retinal image is called a compensatory eye movement. One compensatory eye movement is vestibulo-ocular reflex, reflex is stimulated by the rotation of the head. It is thought that a neural mechanism of vestibulo-ocular reflex by horizontal rotation (horizontal turn) is revealed to some extent, a horizontal semicircular canal detects the rotation 8 of the head, the inputs therefrom provide inhibitiveness and excitability to an extraocular muscle, and the eyeball 3 moves.

When the head rotates, if the eyeball rotates by vestibulo-ocular reflex, the retinal image does not move, and as indicated by a broken line and a one-dot-chain line of FIG. 4, the spectacle lens 10 rotates in connection with the rotation of the head. For this reason, the line of sight 2 which passes through the spectacle lens 10 relatively moves on the spectacle lens 10 by vestibulo-ocular reflex. Accordingly, if there is a difference in the imaging performance of the spectacle lens 10 in the movement range of the eyeball 3 by vestibulo-ocular reflex, that is, the range through which the line of sight 2 passes by vestibulo-ocular reflex, the retinal image may sway.

Figure 5:
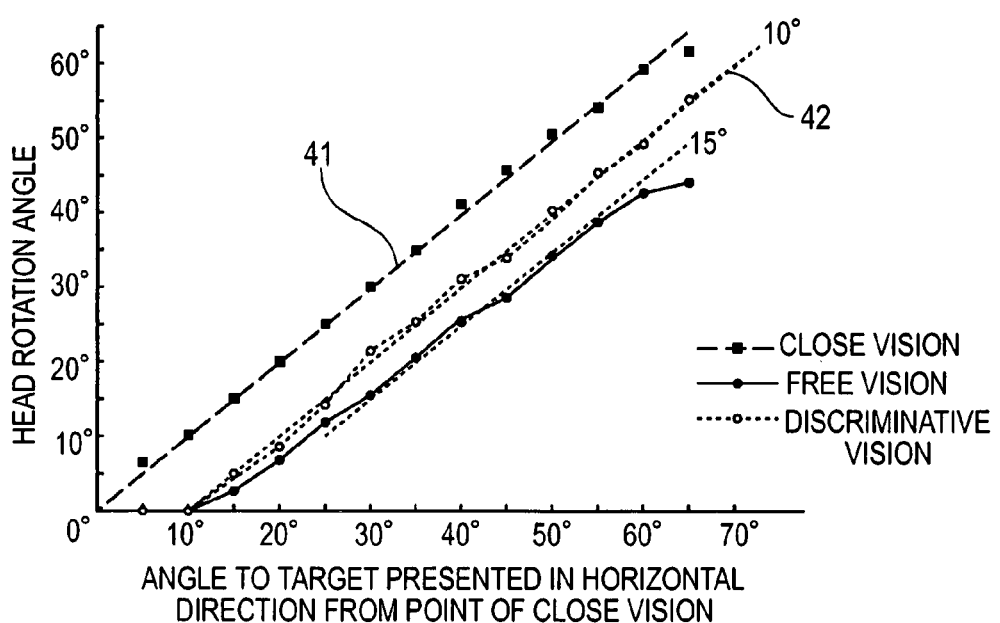
FIG. 5 is a diagram showing a maximum angle of vestibulo-ocular reflex.

FIG. 5 shows an example in which a head position (eye position) movement is observed at the time of target search. A few graphs shown in FIG. 5 show how much the head rotates so as to recognize a target (object) having moved from a point of close vision at a certain angle in the horizontal direction. In a close vision state in which the target (object) is concentrated, as indicated by a graph 41, the head rotates along with the object. Meanwhile, in a discriminative vision state such that the target (object) is simply recognized, as indicated by a graph 42, the movement of the head decreases (is smaller) by about 10 degrees with respect to the angle (movement) of the object. From this observation result, the range in which the object can be recognized by the movement of the eyeball can be limited to about 10 degrees. Accordingly, it is thought that, in a natural state, the rotation angle of the head in the horizontal direction when a person looks the object by vestibulo-ocular reflex while moving the head is maximum about 10 degrees left and right (the maximum horizontal angle θxm at which the eyeball 3 moves by vestibulo-ocular reflex).

In the progressive power lens, there is a variation in power in the intermediate portion. Thus, it is thought that, if the head moves strongly, the power of lens does not coincide with the distance to the object, and the maximum rotation angle of the head in the vertical direction when the object is viewed by vestibulo-ocular reflex decreases compared to that in the horizontal direction, such that an image is blurred. From above, it is preferable that the head rotation angle which is a parameter when a sway simulation is carried out is about 10 degrees left and right in the horizontal direction, and the head rotation angle in the vertical direction is smaller and for example, about 5 degrees up and down. It is understood that the typical value of the movement range of the line of sight by vestibulo-ocular reflex is ±10 degrees left and right of the principal meridian 14 in the horizontal direction.

Figure 6:
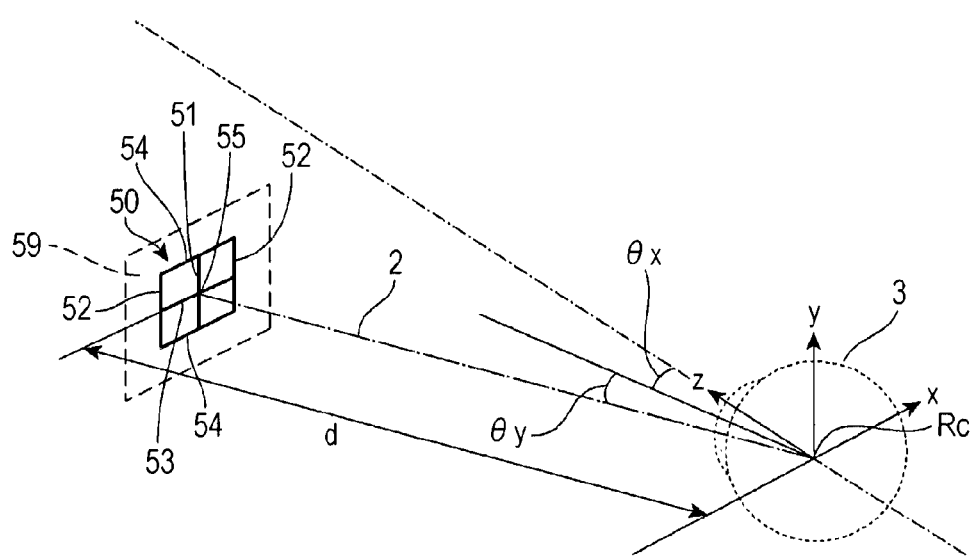
FIG. 6 is a diagram showing a state in which a rectangular pattern is set.

FIG. 6 shows a state in which a visual simulation is carried out taking into consideration vestibulo-ocular reflex when the head rotates toward a target under observation disposed on a virtual plane 59 of a virtual space, in this example, a rectangular pattern 50. In the virtual space, when the rotation center Rc of the eyeball 3 is defined as the origin, the z axis is set in the horizontal front direction, the x axis is set in the horizontal direction, and the y axis is set in the vertical direction. The rectangular pattern 50 of the target under observation is disposed on the virtual plane 59 at a distance d in a direction at an angle θx relative to the y-z plane and an angle θy relative to the x-z plane.

In this example, the rectangular pattern 50 is a square grid which is bisected in every direction. The rectangular pattern 50 includes a central vertical grid line 51 which passes through a geometric center 55, left and right vertical grid lines 52 which are horizontally symmetrical to the central vertical grid line 51, a central horizontal grid line 53 which passes through the geometric center 55, and upper and lower horizontal grid lines 54 which are vertically symmetrical to the central horizontal grid line 53. As described below, the distance d between the virtual plane 59 and the eyeball 3 is adjusted such that the rectangular pattern 50 of the square grid has a pitch set by the viewing angle on the spectacle lens 10.

In this example, the spectacle lens 10 is disposed in front of the eyeball 3 at the same position and in the same posture as when actually wearing, and the virtual plane 59 is set such that the left and right vertical grid lines 52 and the upper and lower horizontal grid lines 54 are viewed in the vicinity of the maximum horizontal angle θxm at which the eyeball 3 moves relative to fixation point by vestibulo-ocular reflex, that is, at ±10 degrees relative to fixation point.

The size of the rectangular pattern 50 of the square grid can be specified by the viewing angle, and can be set in accordance with the object to be viewed. For example, the visual field pitch of the grid can be set to be small on the screen of a mobile personal computer or the like, and the visual field pitch of the grid can be set to be large on an object, such as the screen of a desktop personal computer.

In the progressive power lens 10, the distance to the target under observation which is postulated by each of the distance portion, the intermediate portion, and the near portion changes. For this reason, the distance d to the target (virtual plane) 59 under observation is a long distance of several m or more in the distance portion, a short distance of about 40 cm to 30 cm in the near portion, and an intermediate distance of about 1 m to 50 cm in the intermediate portion. However, for example, when walking, a target under observation is at a distance of 2 m to 3 m in the intermediate portion and the near portion. Therefore, it is not necessary to strictly set the distance d depending on the distance, intermediate, and near portions on the lens, and there is little influence on the sway indicator calculation result.

The rectangular pattern 50 as a target under observation is observed in a viewing angle direction deviated from a visual field direction (θx,θy) by a lens refraction action. An observed image of the rectangular pattern 50 at this time can be obtained by a usual ray tracing method. In this state as basis, if the head rotates at +α° in the horizontal direction, the lens 10 rotates at +α° along with the face. Since the eyeball 3 rotates at α° in a reverse direction, that is, at −α° by vestibulo-ocular reflex at this time, with the use of the position where the line of sight 2 has moved by −α° on the lens 10, the geometric center 55 of the rectangular pattern 50 of the target is viewed. Accordingly, since the point of transmission of the line of sight 2 on the lens 10 and the entrance angle of the line of sight 2 to the lens 10 change, the rectangular pattern 50 as a target under observation is observed in a different form.

For this reason, when the head iteratively rotates horizontally or vertically, images of the target 50 (rectangular pattern) under observation at both end positions at the maximum rotation angle or a predetermined rotation angle θx1 are superimposed at the geometric center 55 of the target under observation, and misalignment in the shape therebetween is calculated geometrically. An example of the horizontal angle θx1 is the maximum horizontal angle θxm (about 10 degrees) at which the eyeball 3 moves by vestibulo-ocular reflex.

One of the indexes which are used for sway evaluation is a sway indicator IDd. As the sway indicator IDd, variations in the slope of the horizontal grid lines 53 and 54 and the vertical grid lines 51 and 52 are calculated. As a sway indicator IDs, the movement areas of the horizontal grid lines 53 and 54 and the vertical grid lines 51 and 52 are calculated.

Figure 7:
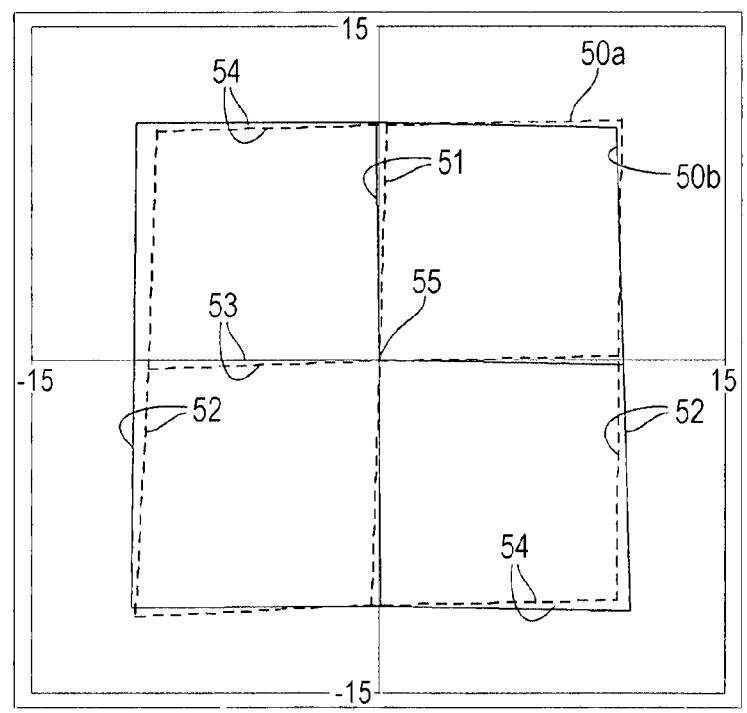
FIG. 7 is a diagram showing geometric misalignment of a rectangular pattern in an overlapping manner.

FIG. 7 shows an example of an image of the rectangular pattern 50 when the eyeball 3 and the rectangular pattern 50 have moved left and right at a first horizontal angle (shaking angle) θx1 (10 degrees) relative to fixation point. This state corresponds to a state where, when the spectacle lens 10 has moved left and right at a horizontal angle (shaking angle) of 10 degrees along with the head, the rectangular pattern 50 is viewed such that the rectangular pattern 50 does not move and the line of sight 2 does not move from the geometric center 55 of the rectangular pattern 50. A rectangular pattern 50a (broken line) is an image (right-rotation image) which is observed at a shaking angle 10° through the spectacle lens 10 by a ray tracing method, and a rectangular pattern 50b (solid line) is an image (left-rotation image) which is observed at a shaking angle of −10° in the same manner. These rectangular patterns 50a and 50b are superimposed such that the geometric centers 55 coincided with each other. By comparison, an image of the rectangular pattern 50 which is observed at a shaking angle of 0° is substantially located in the middle. Images (upper-rotation image and lower-rotation image) which are observed when a shaking angle is set up and down can be obtained in the same manner.

These images (rectangular patterns) 50a and 50b are images of the target under observation that the user actually obtains when the user shakes the head while viewing the target under observation through the spectacle lens 10. The difference (deformation) between these images 50a and 50b can be regarded as representing the movement of an image when the head is shaken.

Figure 8:
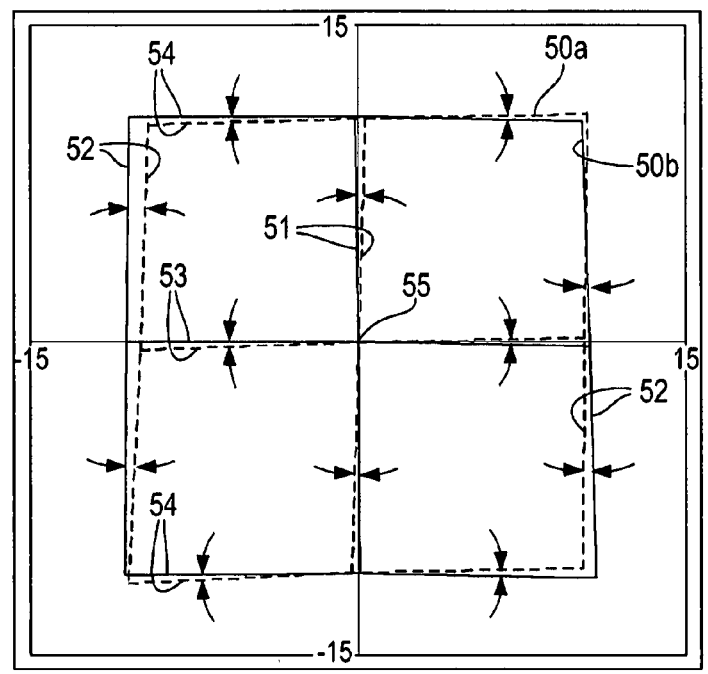
FIG. 8 is a diagram showing variations in the slope of grid lines of a rectangular pattern.

FIG. 8 shows the sway indicator (sway index) IDd. The sway indicator IDd refers to variations in the slope of the grid lines 51 to 54. As shown in FIG. 8, variations in the inclination of the respective sides (grid lines) 51 to 54 of the rectangular pattern 50 are geometrically calculated, thereby obtaining 12 sway indicators IDd. It is thought that, of these, the variations in the inclination of the grid lines 53 and 54 in the horizontal direction represent "ruffling (undulation)", and the variations in the inclination of, the grid lines 51 and 52 in the vertical direction represent "fluctuation". Accordingly, if the variations in the inclination of the grid lines 51 to 54 are totalized in each direction, sway can be quantitatively evaluated as "a sense of ruffling" and "a sense of fluctuation".

Figure 9:
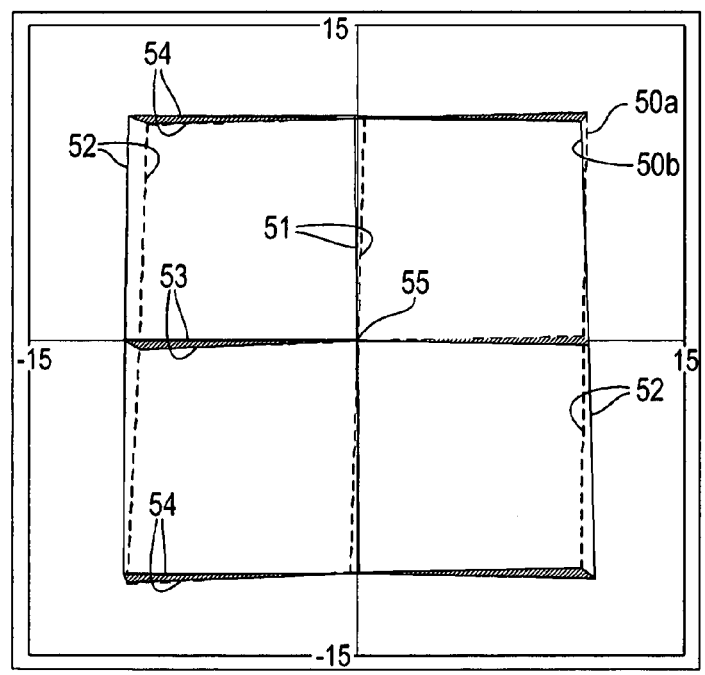
FIG. 9 is a diagram showing variations of grid lines in a horizontal direction of grid lines of a rectangular pattern.
Figure 10:
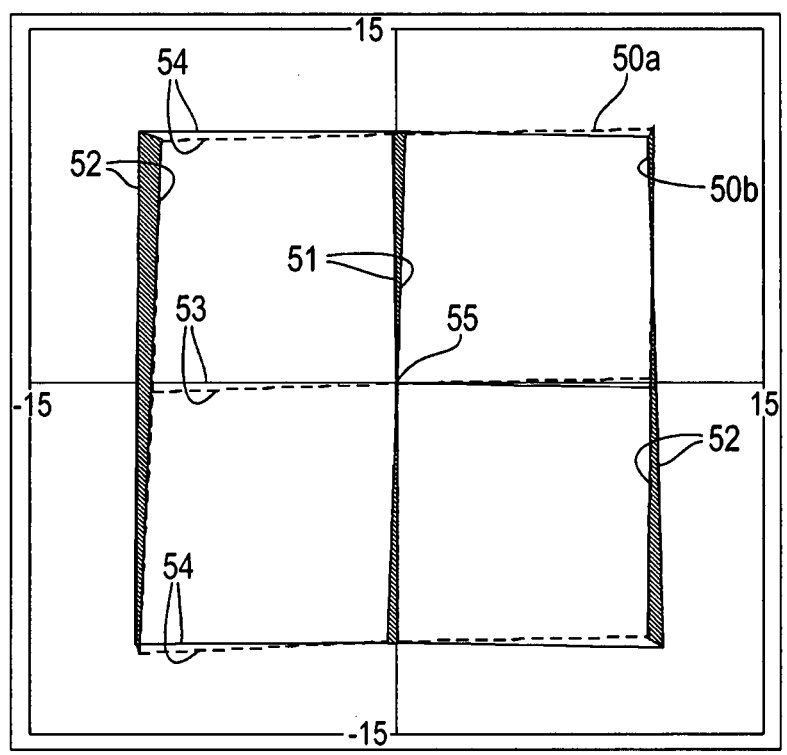
FIG. 10 is a diagram showing variations of grid lines in a vertical direction of grid lines of a rectangular pattern.

FIGS. 9 and 10 show the sway indicator (sway index) IDs. The sway indicator IDs is a different index which is used for sway evaluation, and refers to the magnitude of deformation of the overall shape of the rectangular pattern 50. As shown in FIGS. 9 and 10, in regard to the sway indicator IDs, the displacements of the grid lines 51 to 54 of the rectangular pattern 50 are geometrically calculated as areas, thereby obtaining 12 numerical values. FIG. 9 shows the displacements (hatched portions) of the grid lines 53 and 54 in the horizontal direction, and FIG. 10 shows the displacements (hatched portions) of the grid lines 51 and 52 in the vertical direction. The sway indicator IDs represented by the displacement (area) has the same tendency as the sway indicator IDd represented by the variation in the inclination. Meanwhile, when the lens 10 undergoes a significant change in magnification in the vicinity of a sway evaluation position, for example, when there is deformation in which expansion and contraction occur in the horizontal direction, these elements are included in the sway indicator IDs.

The sway indicators IDd and IDs can be used by purpose as a horizontal direction component, a vertical direction component, and a total value thereof. Hereinafter, the sway indicator IDd which is obtained from the variation in the inclination may be expressed as "vibration", and the sway indicator IDs which is obtained from the displacement of the grid line may be expressed as "deformation amount".

The unit of the sway indicator IDd of "vibration" is the variation in the inclination of each grid line on the viewing angle coordinates and is thus dimensionless. The unit of the sway indicator IDs of "deformation amount" is the area on the viewing angle coordinates, and is the square of the degree. The sway index IDs by the deformation amount may become dimensionless by dividing the area of the variation by the area at 0 degree before the head rotates, and may be displayed depending on the proportion (for example, percent).

In regard to the factor IDd relating to vibration, the vibration of the grid line 53 in the horizontal direction from among the vibration of the central grid lines (Center Line) 51 and 53 is indicated as "horizontal@CL", and the vibration of the grid line 51 in the vertical direction is indicated as "vertical@CL". The vibration of all the horizontal grid lines 53 and 54 including the central grid line 53 is indicated as "horizontal L", the vibration of all the vertical grid lines 51 and 52 is indicated as "vertical L", and the sum or average of the vibration of all the grid lines including the horizontal grid lines and the vertical grid lines is indicated as "total L".

Since "horizontal@CL" and "vertical@CL" are easily and simply calculated, it is convenient when calculation is done over the entire surface of the lens 10, and a map is created. Meanwhile, from the fact that, when a person (user) actually feels sway, not only a variation in one horizontal or vertical line but also a variation in the outline of the outline of the target viewed as a form are simultaneously perceived, "horizontal L" and "vertical L" are regarded as indicators which are closer to the feeling of the user.

Since any user simultaneously perceive the horizontal direction and the vertical direction, "total L" obtained by totalizing the horizontal direction and the vertical direction becomes the most appropriate indicator. However, there is a case where there is a possibility that any user has different susceptibility to "ruffling (undulation)" and "fluctuation" or how to use the line of sight based on the individual living environment concerns with "ruffling (undulation)" where the line of sight frequently moves in the horizontal direction or conversely concerns with "fluctuation". Accordingly, it is also useful to indicate and evaluate sway by each directional component.

In regard to the indicator IDs relating to a deformation amount, the variation area of all the horizontal grid lines 53 and 54 is indicated as "horizontal L", the variation area of all the vertical grid lines 51 and 52 is indicated as "vertical L", and the total thereof is indicated as "total L". The need for the indication of each component and the indication by the total is the same as that relating to vibration. The indicator IDs by the deformation amount has an advantage in that a variation in magnification is taken into consideration. In particular, in the progressive power lens 10, power addition is made in the vertical direction. For this reason, when the user sees an object while shaking the head in the longitudinal direction, there is a phenomenon that an image expands or is reduced with a variation in power, or is viewed to be shaken back and forth. When the addition power is large, the phenomenon that magnification falls down on the lateral side of the near portion becomes conspicuous. For this reason, expansion and contraction of an image in the lateral direction occur. The indicator IDs by the deformation amount can digitalize these variations, and is thus useful as an evaluation method.

Although in the following embodiments, the rectangular pattern 50 of a square grid is used as the pattern of an observation indicator for evaluation, evaluation precision or density in each direction may be changed by changing the grid pitch in the horizontal direction and the vertical direction, or evaluation precision or density may be changed by increasing the number of grids.

2. Embodiment 1

2.1 Example 1

Figure 11A:
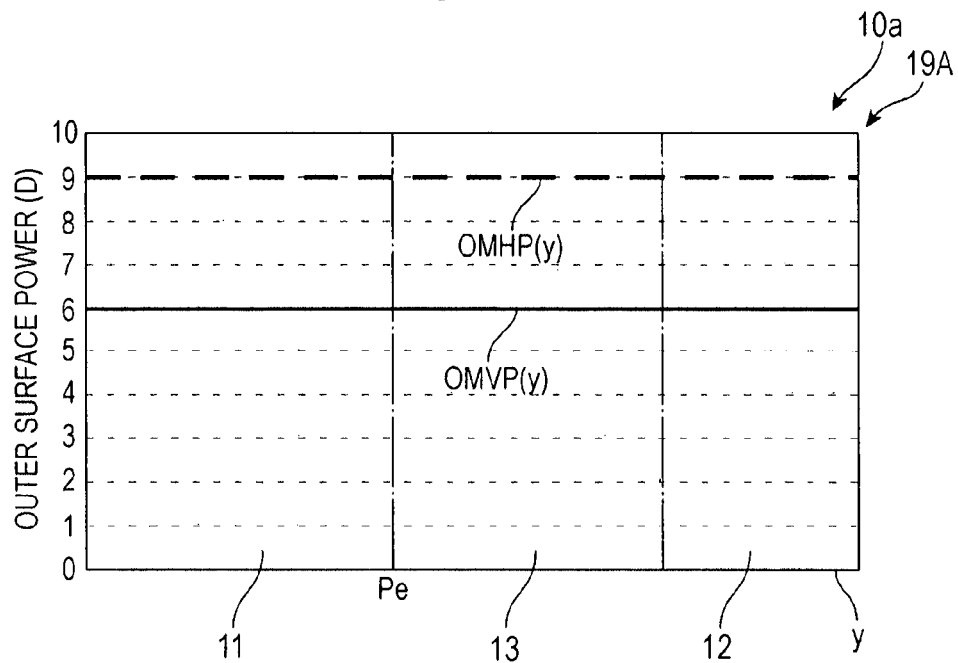
FIG. 11A is a diagram showing a surface power on a principal meridian on the outer surface of a progressive power lens of Example 1.
Figure 11B:
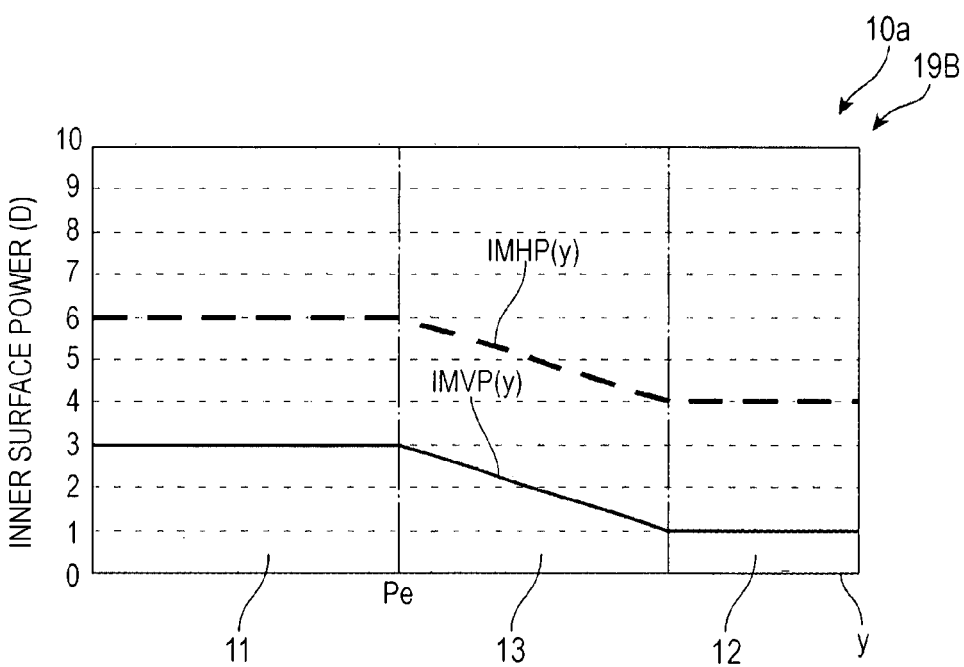
FIG. 11B is a diagram showing a surface power on a principal meridian on the inner surface of a progressive power lens of Example 1.

FIG. 11A shows a surface power OMHP(y) in a horizontal direction and a surface power OMVP(y) in a vertical direction along a principal meridian 14 on an outer surface (object-side surface) 19A of a progressive power lens 10a of Example 1 in terms of dioptre (D). FIG. 11B shows a surface power IMHP (y) in a horizontal direction and a surface power IMVP(y) in a vertical direction along a principal meridian 14 on an inner surface (eye-side surface) 19B of the progressive power lens 10a in terms of dioptre (D). Although the surface power IMHP (y) and the surface power IMVP(y) in the vertical direction on the inner surface 19B are intrinsically negative values, in this specification, the surface powers on the inner surface 19B are absolute values. The same is also applied to the following description.

In the following embodiments, the y coordinate is the coordinate of a vertical reference line with a fitting point Pe as the origin. The x coordinate described below is the coordinate of a horizontal reference line which is perpendicular to a horizontal reference line perpendicular to the vertical reference line with the fitting point Pe as the origin. The principal meridian 14 is inset toward the nose relative to the vertical reference line, and the coordinate thereof is represented using the y coordinate.

In the progressive power lens 10a and a progressive power lens of each example described below, in regard to a transmission refractive power (power) HP in the horizontal direction and a transmission refractive power (power) VP in the vertical direction along the principal meridian 14, if the line of sight 2 is perpendicular to the respective surfaces 19A and 19B of the lens 10a, HP(y) and VP(y) are approximately obtained by the following expressions.

$$HP(y)=OMHP(y)-IMHP(y) \quad (25)$$

$$VP(y)=OMVP(y)-IMVP(y) \quad (26)$$

Expressions (25) and (26) are relational expressions when the thickness of the lens is small, and may be substituted with relational expressions with a shape factor taking into consideration the thickness of the lens for use in calculating the power of a spectacle lens. In this case, Expressions (25a) and (26a) are obtained.

$$HP(y)=OMHP(y)/(1-t/n*OMHP(y))-IMHP(y) \quad (25a)$$

$$VP(y)=OMVP(y)/(1-t/n*OMVP(y))-IMVP(y) \quad (26a)$$

Here, t is the thickness (unit meter) of the lens, and n is the refractive index of a lens material. In regard to the y coordinate of Expressions (25), (25a), (26), and (26a), for more accurate power calculation, in the peripheral portion of the lens, misalignment between the outer surface and the inner surface at the transmission position of the line of sight on the lens may be obtained by ray trace and applied.

In a region other than the principal meridian 14, it is necessary to take into consideration a prismatic effect that the line of sight 2 relative to the respective surfaces 19A and 19B of the lens 10 is inclined from the vertical direction. However, the relationships of expressions (25) and (26) are approximately established.

In the progressive power lens 10a of Example 1 and a progressive power lens 10b of Example 2 described below, it is preferable to manipulate the surface power of the eye-side surface (inner surface) 19B according to the condition (3a) so as to cancel elements of a toric surface applied to the object-side surface (outer surface) 19A. However, in a thin lens having a sufficiently small thickness, it is possible to substantially cancel the elements of the toric surface according to the condition (3). Accordingly, in the following description, Examples 1 and 2 will be described as to a thin lens having a sufficiently small thickness.

The progressive power lens 10a of Example 1 was designed by applying the spectacle specification, including a progressive zone length of 14 mm, a prescription power (distance portion power, Sph) of 0.00 (D), and an addition power (Add) of 2.00 (D), to a progressive power lens "SEKIO P-1 SYNERGY AS" (refractive index 1.67) with an inner surface of a progressive power lens manufactured by SEIKO EPSON CORPORATION. The diameter of the lens 10a is 65 mm, and an astigmatic power is not included.

In the progressive power lens 10a of Example 1, the outer surface 19A is constituted by a toric (toroidal) surface with the surface power OHP in the horizontal direction greater than the surface power OVP in the vertical direction, and the inner surface 19B is constituted by an inner progressive surface which includes elements of a toric surface to cancel shifts in the surface power by the toric surface on the outer surface. In the progressive power lens 10a, the outer surface 19A is constituted by a toric surface where the surface power OHP in the horizontal direction and the surface power OVP in the vertical direction remain constant and the surface power OHP in the horizontal direction and the surface power OVP in the vertical direction satisfy the following condition.

$$OHP-OVP=3(D) \quad (27)$$

That is, the outer surface 19A of the progressive power lens 10a is constituted by a toric surface where a curvature Ch in the horizontal direction and a curvature Cv in the vertical direction remain constant, and the curvature Ch in the horizontal direction is greater than the curvature Cv in the vertical direction.

In the progressive power lens 10a, the inner surface 19B includes elements of a toric surface which cancel shifts in the surface power by the toric surface on the outer surface 19A. That is, the outer surface 19A includes a region along the principal meridian 14 and includes elements of a toric surface with the surface power OHP in the horizontal direction greater than the surface power OVP in the vertical direction over the entire region, and the inner surface 19B includes a region along the principal meridian 14 and includes elements of a toric surface with the surface power IHP in the horizontal direction greater than the surface power IVP in the vertical direction over the entire region.

Accordingly, in the progressive power lens 10a of Example 1, the surface power OMHP in the horizontal direction of the region along the principal meridian 14 on the outer surface 19A is 9.0 (D) and constant, and the surface power OMVP in the vertical direction of the region along the principal meridian 14 on the outer surface 19A is 6.0 (D) and constant. In regard to the surface power IMHP in the horizontal direction of the region along the principal meridian 14 on the inner surface 19B, the distance portion 11 is 6.0 (D) and the addition power is 2.0 (D). In regard to the surface power IMVP in the vertical direction of the region along the principal meridian 14 on the inner surface 19B, the distance portion 11 is 3.0 (D) and the addition power is 2.0 (D). For this reason, the progressive power lens 10a of Example 1 has all the conditions (1) to (10).

That is, the surface power OMHP(y) in the horizontal direction of the region along the principal meridian 14 on the outer surface 19A is greater than the surface power OMVP(y) in the vertical direction (condition (1)). The surface power IMHP(y) in the horizontal direction of the region along the principal meridian 14 on the inner surface 19B is greater than the surface power IMVP(y) in the vertical direction (condition (2)). The difference between the surface power OMHP(y) in the horizontal direction and the surface power OMVP(y) in the vertical direction of the region along the principal meridian 14 on the outer surface 19A is equal to the difference between the surface power IMHP(y) in the horizontal direction and the surface power IMVP(y) in the vertical direction of the region along the principal meridian 14 on the inner surface 19B (condition (3)). The difference is constant, and in this example, the constant C0 is 3 (D) (conditions (4), (5), and (5')).

In the progressive power lens 10a of Example 1, in addition to the region along the principal meridian 14, the surface power in the horizontal direction over the entire region of each of the outer surface 19A and the inner surface 19B is greater than the surface power in the vertical direction. The outer surface 19A of the progressive power lens 10a of Example 1 is a toric surface where the surface power OHP in the horizontal direction and the surface power OVP in the vertical direction remain constant. Accordingly, the conditions (6) to (10) are satisfied. The constant C1 is 9 (D), and the constant C2 is 6 (D).

2.2 Comparative Example 1

For comparison with the progressive power lens 10a of Example 1, as Comparative Example 1, a progressive power lens 10b having a spherical outer surface 19A was designed with the same specification as described above.

Figure 12A:
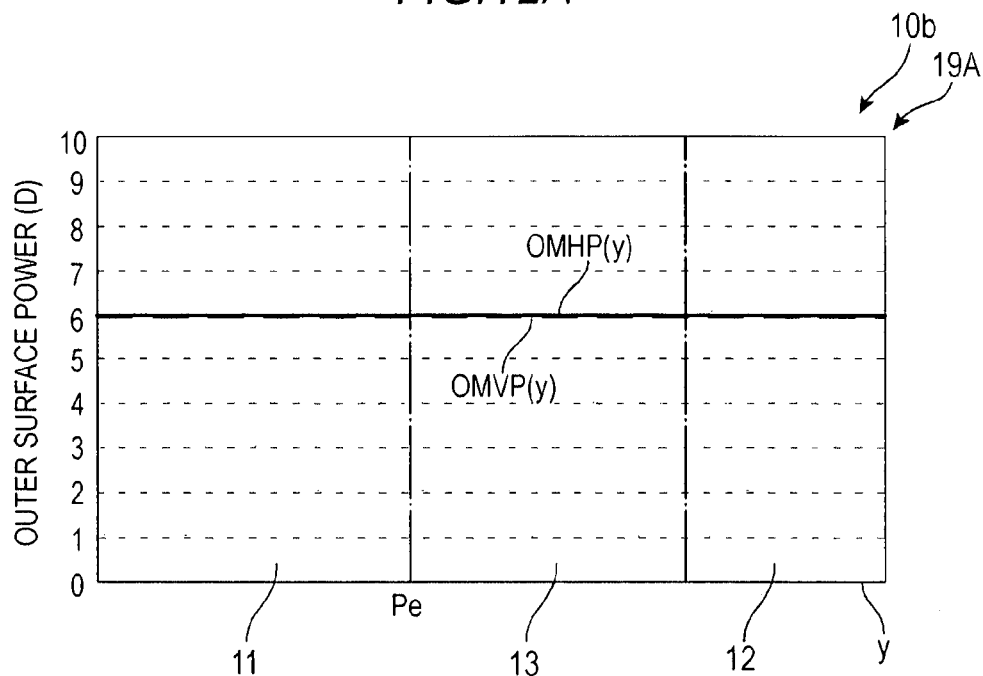
FIG. 12A is a diagram showing a surface power on a principal meridian on the outer surface of a progressive power lens of Comparative Example 1.
Figure 12B:
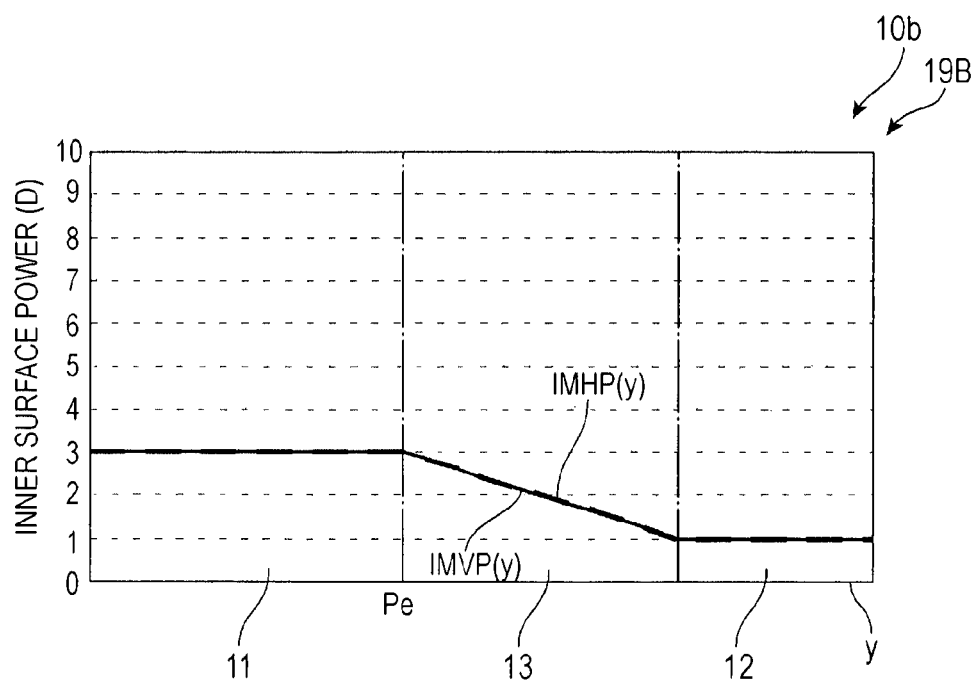
FIG. 12B is a diagram showing a surface power on a principal meridian on the inner surface of a progressive power lens of Comparative Example 1.

FIG. 12A shows a surface power OMHP(y) in a horizontal direction and a surface power OMVP(y) in a vertical direction along a principal meridian 14 on an outer surface (object-side surface) 19A of a progressive power lens 10b of Comparative Example 1 in terms of dioptre (D). FIG. 12B shows a surface power IMHP(y) in the horizontal direction and a surface power IMVP(y) in the vertical direction along a principal meridian 14 on an inner surface (eye-side surface) 19B of the progressive power lens 10b in terms of dioptre (D).

In the progressive power lens 10b of Comparative Example 1, the outer surface 19A is a spherical surface, and the surface power OMHP(y) in the horizontal direction and the surface power OMVP(y) in the vertical direction of the region along the principal meridian are identical and 6.0 (D). The values of the surface power IMHP(y) in the horizontal direction and the surface power IMVP(y) in the vertical direction of the region along the principal meridian 14 on the inner surface 19B are common, the distance portion 11 is 3.0 (D), and the addition power is 2.0 (D).

Variations in the surface power shown in FIGS. 11A to 12B are simplified for understanding of the basic configuration. In actual design, aspheric correction which is intended to correct aberration in a lens peripheral vision is applied, and a few variations in the power in the vertical direction and the horizontal direction occur above the distance portion or in the near portion.

2.3 Comparison 1

In the progressive power lens 10a of Example 1, as shown in FIG. 11A, while the surface power OMVP in the vertical direction on the outer surface 19A is 6.0 (D) from the distance portion 11 to the near portion 12 as in the progressive power lens 10b of Comparative Example 1, the surface power OMHP in the horizontal direction is 9.0 (D) from the distance portion 11 to the near portion 12. Accordingly, the surface power OMHP in the horizontal direction on the outer surface 19A is shifted in a direction to be greater than the surface power OMVP in the vertical direction on the outer surface 19A by 3.0 (D). On the inner surface 19B, as shown in FIG. 11B, like the outer surface 19A, the surface power IMHP in the horizontal direction is greater than the surface power IMVP in the vertical direction by 3.0 (D). For this reason, as a result, while the outer surface 19A is a toric surface, a shift in the surface power on the outer surface 19A (the difference between the surface power in the vertical direction and the surface power in the horizontal direction on the outer surface 19A) is cancelled by a shift in the surface power on the inner surface 19B (the difference between the surface power in the vertical direction and the surface power in the horizontal direction on the inner surface 19B), and the same power as in the progressive power lens 10b of Comparative Example 1 is secured.

Figure 13A:
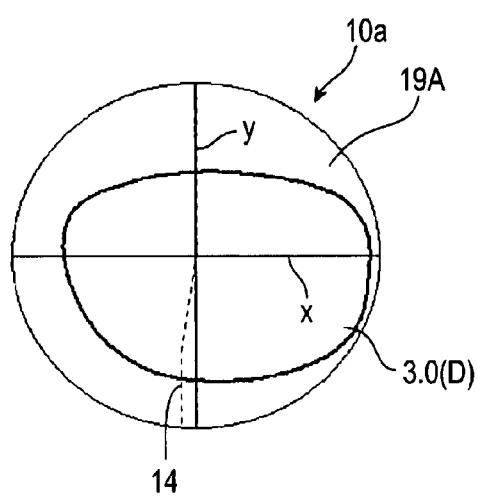
FIG. 13A is a diagram showing a surface astigmatism distribution on the outer surface of a progressive power lens of Example 1.
Figure 13B:
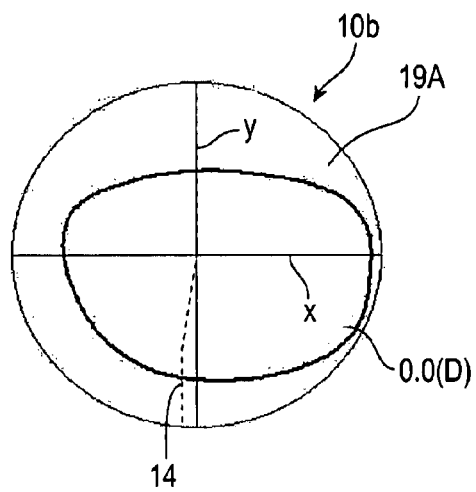
FIG. 13B is a diagram showing a surface astigmatism distribution on the outer surface of a progressive power lens of Comparative Example 1.
Figure 14A:
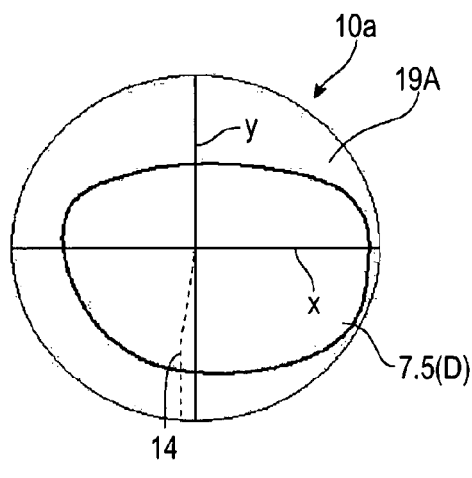
FIG. 14A is a diagram showing an equivalent spherical surface power distribution on the outer surface of a progressive power lens of Example 1.
Figure 14B:
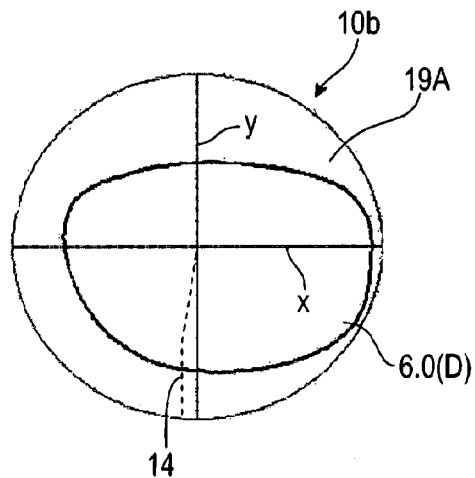
FIG. 14B is a diagram showing an equivalent spherical surface power distribution on the outer surface of a progressive power lens of Comparative Example 1.

FIG. 13A shows a surface astigmatism distribution on the outer surface 19A of the progressive power lens 10a of Example 1, and FIG. 13B shows a surface astigmatism distribution on the outer surface 19A of the progressive power lens 10b of Comparative Example 1. FIG. 14A shows an equivalent spherical surface power distribution on the outer surface 19A of the progressive power lens 10a of Example 1, and FIG. 14B shows an equivalent spherical surface power distribution on the outer surface 19A of the progressive power lens 10b of Comparative Example 1. An equivalent spherical surface power ESP is obtained by Expression (28).

$$ESP=(OHP+OVP)/2 \qquad (28)$$

Vertical and horizontal lines of the drawing represent reference lines (vertical reference line y and horizontal reference line x) which pass through the geometric center of a circular lens, and a shape image when being fitted into the frame when with the geometric center, that is, an intersection point as a fitting point is shown. The same is also applied to the subsequent drawings.

As shown in FIG. 13A, while the outer surface 19A of the progressive power lens 10a of Example 1 includes a uniform surface astigmatism of 3.0 (D), the surface astigmatism is uniform and thus an isoquant line is not expressed. As shown in FIG. 14A, the equivalent spherical surface power of the outer surface 19A is uniform and becomes 7.5 (D). In this case, the surface power is uniform and thus an isoquant line is not shown. Meanwhile, as shown in FIG. 13B, the outer surface 19A of the progressive power lens 10b of Comparative Example 1 has a surface astigmatism of 0.0 (D), and as shown in FIG. 14B, the equivalent spherical surface power on the outer surface 19A is uniform and becomes 6.0 (D).

Figure 15A:
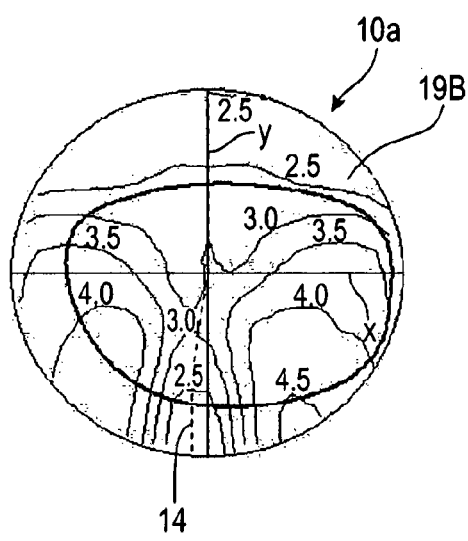
FIG. 15A is a diagram showing a surface astigmatism distribution on the inner surface of a progressive power lens of Example 1.
Figure 15B:
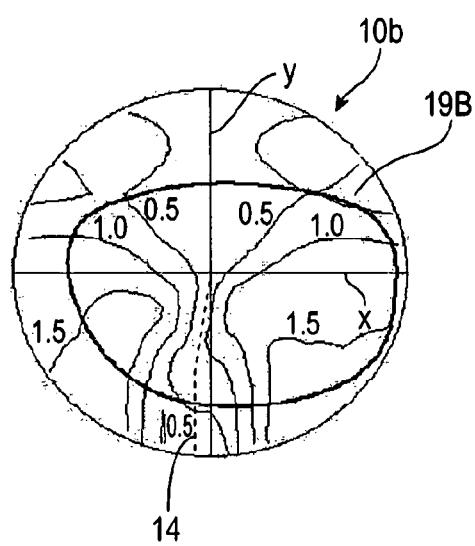
FIG. 15B is a diagram showing a surface astigmatism distribution on the inner surface of a progressive power lens of Comparative Example 1.
Figure 16A:
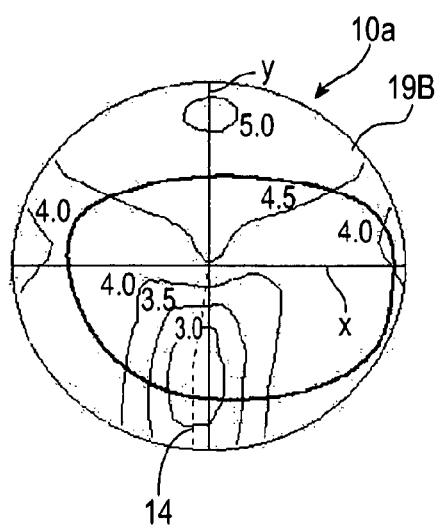
FIG. 16A is a diagram showing an equivalent spherical surface power distribution on the inner surface of a progressive power lens of Example 1.

FIG. 15A shows a surface astigmatism distribution on the inner surface 19B of the progressive power lens 10a of Example 1, and FIG. 15B shows a surface astigmatism distribution on the inner surface 19B of the progressive power lens 10b of Comparative Example 1. FIG. 16A shows an equivalent spherical surface power distribution on the inner surface 19B of the progressive power lens 10a of Example 1, and FIG. 16B shows an equivalent spherical surface power distribution on the inner surface 19B of the progressive power lens 10b of Comparative Example 1.

In the surface astigmatism of the progressive power lens 10a of Example 1 shown in FIG. 15A, the surface astigmatism of 3.0 (D) having a major meridian in the horizontal direction is basically applied to the surface astigmatism of the progressive power lens 10b of Comparative Example 1 shown in FIG. 15B. However, it is understood that a combination is not simple because aspheric correction is applied so as to adjust aberration.

Figure 16B:
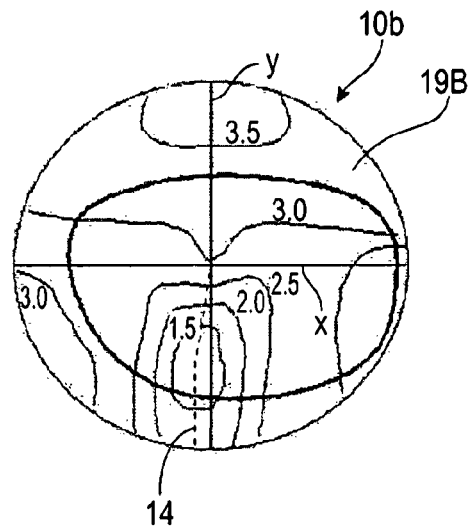
FIG. 16B is a diagram showing an equivalent spherical surface power distribution on the inner surface of a progressive power lens of Comparative Example 1.

In the equivalent spherical surface power distribution of the progressive power lens 10a of Example 1 shown in FIG. 16A, the equivalent spherical surface power of +1.5 (D) is basically applied uniformly to the equivalent spherical surface power distribution of the progressive power lens 10b of Comparative Example 1 shown in FIG. 16B. However, it is understood that a combination is not simple due to the influence of aspheric correction.

Figure 17A:
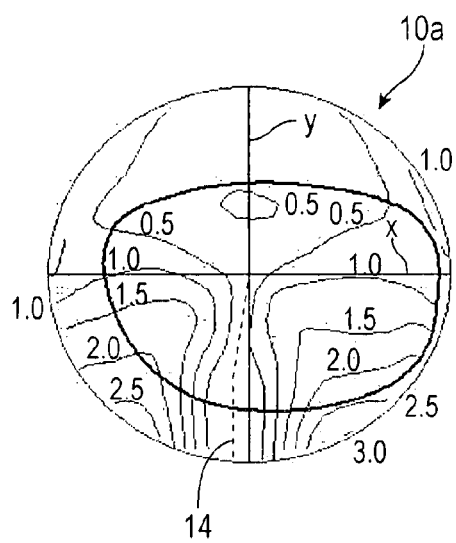
FIG. 17A is an astigmatism distribution of a progressive power lens of Example 1.
Figure 17B:
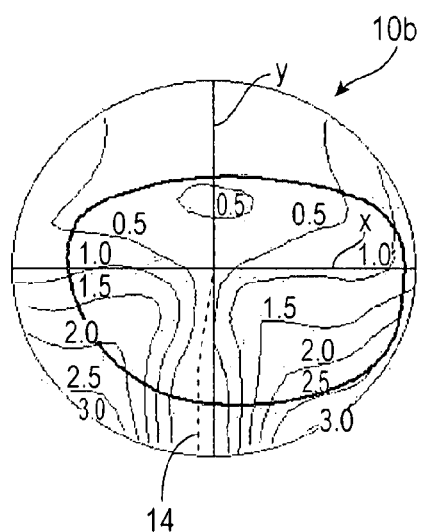
FIG. 17B is an astigmatism distribution of a progressive power lens of Comparative Example 1.
Figure 18A:
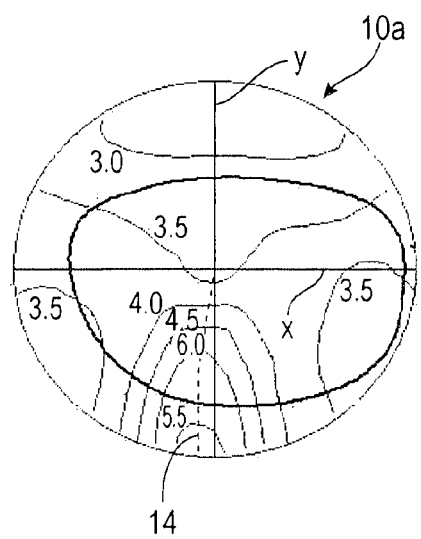
FIG. 18A is an equivalent spherical power distribution of a progressive power lens of Example 1.
Figure 18B:
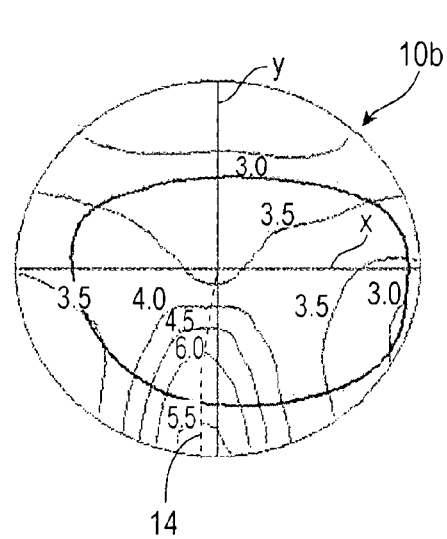
FIG. 18B is an equivalent spherical power distribution of a progressive power lens of Comparative Example 1.

FIG. 17A shows an astigmatism distribution when observation is done through each position on the lens in the progressive power lens 10a of Example 1, and FIG. 17B shows an astigmatism distribution when observation is done through each position on the lens in the progressive power lens 10b of Comparative Example 1. FIG. 18A shows an equivalent spherical power distribution when observation is done through each position on the lens in, the progressive power lens 10a of Example 1, and FIG. 18B shows an equivalent spherical power distribution when observation is done through each position on the lens in the progressive power lens 10b of Comparative Example 1.

The astigmatism distribution of the progressive power lens 10a of Example 1 shown in FIG. 17A is substantially the same as the astigmatism distribution of the progressive power lens 10b of Comparative Example 1 shown in FIG. 17B. The equivalent spherical power distribution of the progressive power lens 10a of Example 1 shown in FIG. 18A is substantially the same as the equivalent spherical power distribution of the progressive power lens 10b of Comparative Example 1 shown in FIG. 18B. Accordingly, it is understood that, with the effective use of aspheric correction, a progressive power lens which has much the same performance as the progressive power lens 10b of Comparative Example 1 from the viewpoint of the astigmatism distribution and the equivalent spherical power distribution is obtained as the progressive power lens 10a of Example 1.

Figure 19:
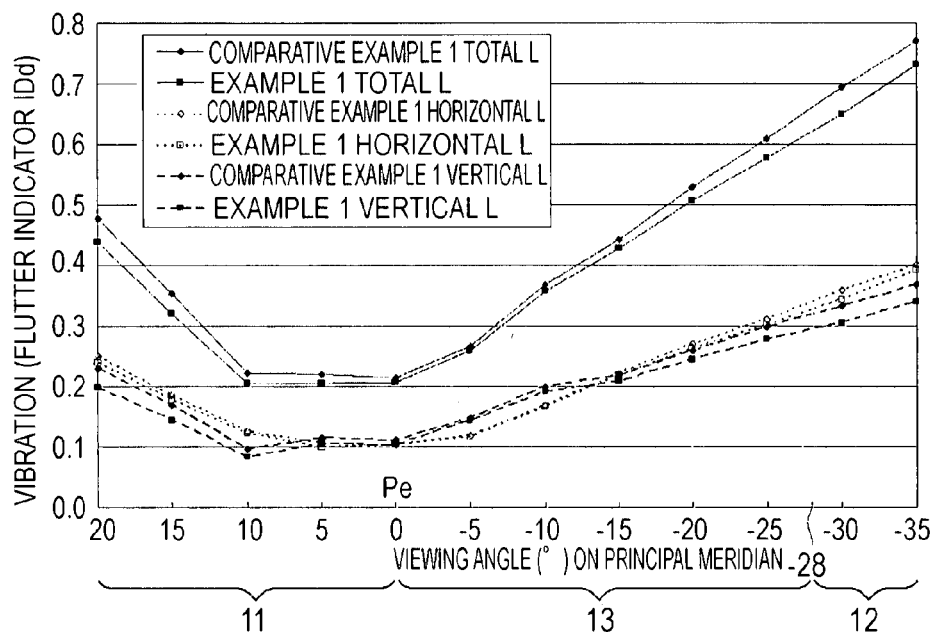
FIG. 19 is a diagram showing vibration (sway indicator IDd).
Figure 20:
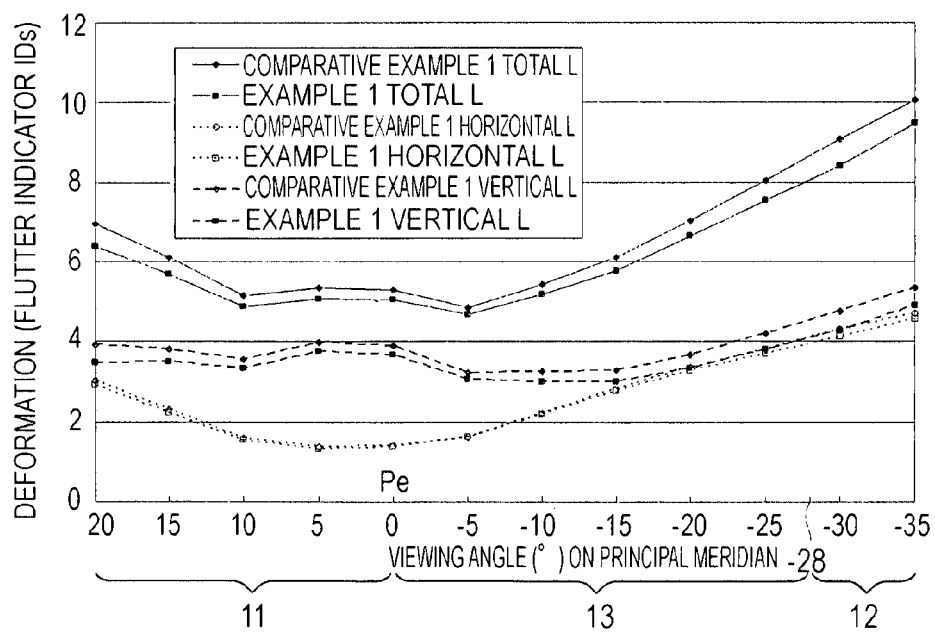
FIG. 20 is a diagram showing a deformation amount (sway indicator IDs).

FIG. 19 shows the indicator IDd relating to vibration obtained by the sway evaluation method. FIG. 20 shows the indicator IDs relating to a deformation amount obtained by the sway evaluation method. The viewing angle pitch of the grid 50 under observation is 10 degrees, the head is shaken in the left-right direction, and the shaking angle is 10 degrees left and right. The indicator IDs relating to a deformation amount represents the deformation amount by the proportion (%). The same is also applied to the subsequent drawings.

In regard to the indicator IDd relating to vibration, "horizontal L" which is the sum of the vibration of all the horizontal grid lines 53 and 59 including the central grid line 53, "vertical L" which is the sum of the vibration of all the vertical grid lines 51 and 52, and "total L" which represents the sum or average of the vibration of all the grid lines including the horizontal grid lines and the vertical grid lines are obtained at a few points along the principal meridian of each of the progressive power lens 10a of Example 1 and the progressive power lens 10b of Comparative Example 1. The fitting point Pe of each of the lenses 10a and 10b is in the horizontal front vision with the viewing angle of 0 degree, that is, at the primary position of the eye. The distance portion 11 is up to 20 degrees upward from the fitting point Pe, the intermediate portion 13 is up to near about −28 degrees downward from the fitting point Pe, and below the intermediate portion 13 corresponds to the near portion 12. The same is also applied to the subsequent drawings.

In regard to the indicator IDs relating to a deformation amount, "horizontal L" which is the sum of the variation areas of all the horizontal grid lines 53 and 54 including the central grid line 53, "vertical L" which is the sum of the variation areas of all the vertical grid lines 51 and 52, and "total L" which is the sum or average of the variation areas of all the grid lines including the horizontal grid lines and the vertical grid lines are obtained at a few points along the principal meridian of each of the progressive power lens 10a of Example 1 and the progressive power lens 10b of Comparative Example 1. The same is also applied to the subsequent drawings.

As shown in FIGS. 19 and 20, the indicator IDd relating to vibration and the indicator IDs relating to a deformation amount in the progressive power lens 10a of Example 1 are smaller than those in the progressive power lens 10b of Comparative Example 1. The sway improvement effect is well shown in the total L of each of the indicators IDd and IDs, and it is shown that sway is reduced over all the regions of the distance portion, the intermediate portion, and the near portion on the principal meridian 14. In particular, the sway improvement effect is large in a region from the intermediate portion 13 toward the near portion 12 above the distance portion 11. By comparison of the vertical L and the horizontal L, it is understood that, in all the indicators IDd and IDs, the vertical L has a larger improvement effect.

As described above, in the progressive power lens 10a of Example 1 in which the elements of the toric surface are introduced to the outer surface 19A and the inner surface 19B, the astigmatism distribution and the equivalent spherical power distribution which are the general performance as a spectacle lens are the same as those in the spherical progressive power lens 10b of Comparative Example 1 which has a spherical surface not including elements of a toric surface (as a spectacle lens which is not intended for astigmatism correction). In the progressive power lens 10a of Example 1, it is understood that it is possible to reduce image sway when the line of sight 2 (eyeball 3) moves by vestibulo-ocular reflex, compared to the progressive power lens 10b of Comparative Example 1. One reason for this is thought to be that the elements of the toric surface are introduced to the inner and outer surfaces, in particular, the elements of the toric surface are introduced to the regions along the principal meridian 14 on the inner and outer surfaces, thereby suppressing variations in the angle at which the line of sight 2 enters or is emitted from the spectacle lens 10a when the line of sight 2 moves by vestibulo-ocular reflex and suppress variations in all aberrations when the line of sight 2 moves by vestibulo-ocular reflex.

Accordingly, the progressive power lens 10a of Example 1 is a spectacle lens which is suitable for a user who is compatible with image sway with difficulty, or an application.

In this example, the entire outer surface 19A is a toric surface. In regard to the visual characteristics of a person when the progressive power lens 10 is used, the use frequency on the principal meridian 14 is very high, and image sway is found when a visual operation is carried out using near the principal meridian 14. Therefore, if a shift in the intensity direction of the surface power OHP in the horizontal direction on the outer surface 19A is within at least 10 mm in the horizontal direction with the principal meridian 14 as a center, it is possible to sufficiently obtain the image sway reduction effect.

3. Embodiment 2

3.1 Example 2

Figure 21A:
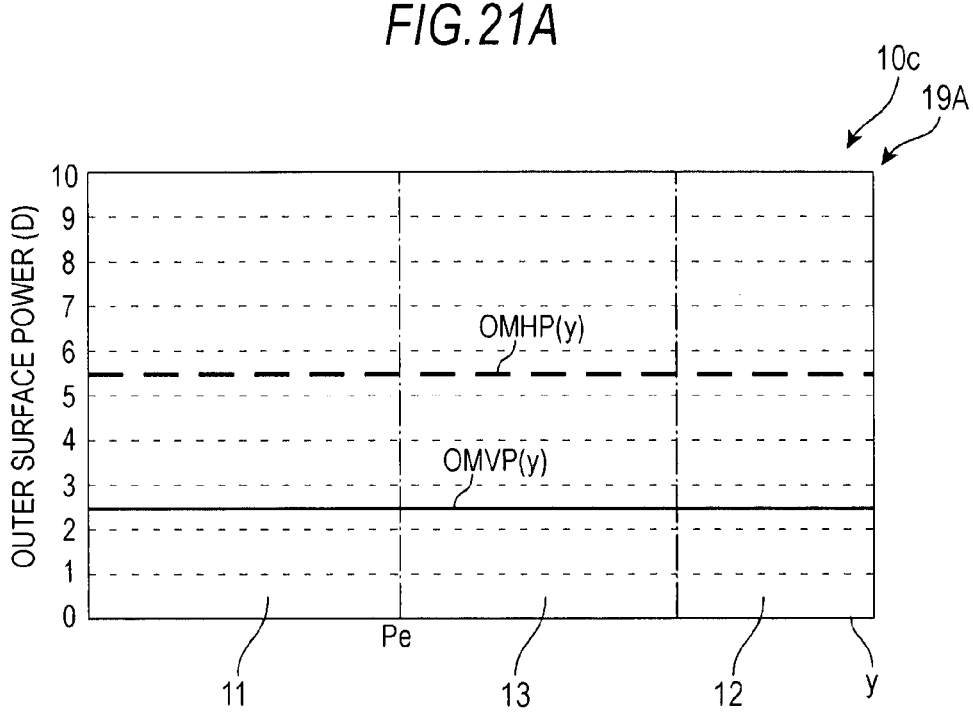
FIG. 21A is a diagram showing a surface power on a principal meridian on the outer surface of a progressive power lens of Example 2.
Figure 21B:
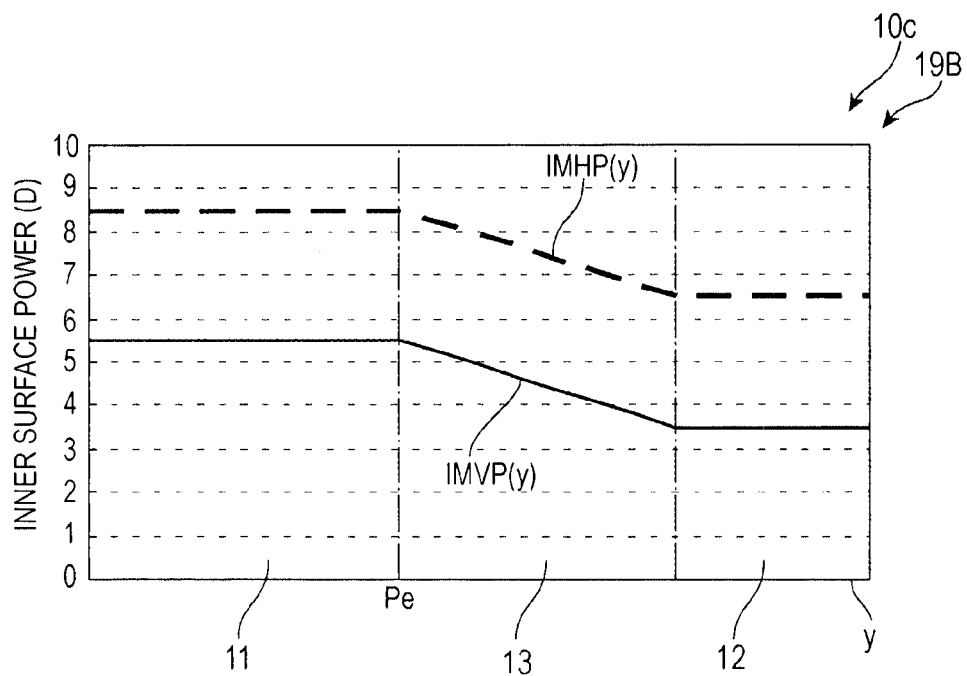
FIG. 21B is a diagram showing a surface power on a principal meridian on the inner surface of a progressive power lens of Example 2.

FIG. 21A shows a surface power OMHP(y) in a horizontal direction and a surface power OMVP(y) in a vertical direction along a principal meridian 14 on an outer surface (object-side surface) 19A of a progressive power lens 10c of Example 2 in terms of dioptre (D). FIG. 21B shows a surface power LMHP (y) in the horizontal direction and a surface power IMVP(y) in the vertical direction along a principal meridian 14 on an inner surface (eye-side surface) 19B of the progressive power lens 10c in terms of dioptre (D).

The progressive power lens 10c of Example 2 was designed by applying the spectacle specification, including a progressive zone length of 14 mm, a prescription power (distance portion power, Sph) of −3.00 (D), and an addition power (Add) of 2.00 (D), to a progressive power lens "SEKIO P-1 SYNERGY AS" (refractive index 1.67) with an inner surface of a progressive power lens manufactured by SEIKO EPSON CORPORATION. The diameter of the lens 10c is 65 mm, and an astigmatic power is not included.

In the progressive power lens 10c of Example 2, as in the progressive power lens 10a of Example 1, the outer surface 19A is constituted by a toric (toroidal) surface with the surface power OHP in the horizontal direction greater than the surface power OVP in the vertical direction, and the inner surface 19B is constituted by an inner progressive surface which includes elements of a toric surface to cancel shifts in the surface power by the toric surface on the outer surface. Accordingly, the inner surface 19B includes a region along the principal meridian 14 and includes elements of a toric surface with the surface power IHP in the horizontal direction greater than the surface power IVP in the vertical direction over the entire region.

Specifically, in the progressive power lens 10c of Example 2, the surface power OMHP(y) in the horizontal direction of the region along the principal meridian 14 on the outer surface 19A is 5.5 (D) and constant, and the surface power OMVP(y) in the vertical direction of the region along the principal meridian 14 on the outer surface 19A is 2.5 (D) and constant. In regard to the surface power IMHP(y) in the horizontal direction of the region along the principal meridian 14 on the inner surface 19B, the distance portion 11 is 8.5 (D) and the addition power is 2.0 (D). In regard to the surface power IMVP(y) in the vertical direction of the region along the principal meridian 14 on the inner surface 19B, the distance portion 11 is 5.5 (D) and the addition power is 2.0 (D). For this reason, as in the progressive power lens 10a of Example 1, the progressive power lens 10c of the Example 2 has all the conditions (1) to (10). The constant C0 is 3 (D), the constant C1 is 5.5 (D), and the constant C2 is 2.5 (D).

3.2 Comparative Example 2

For comparison with the progressive power lens 10c of Example 2, as Comparative Example 2, a progressive power lens 10d having a spherical outer surface 19A, was designed with the same specification as in the progressive power lens 10c.

Figure 22A:
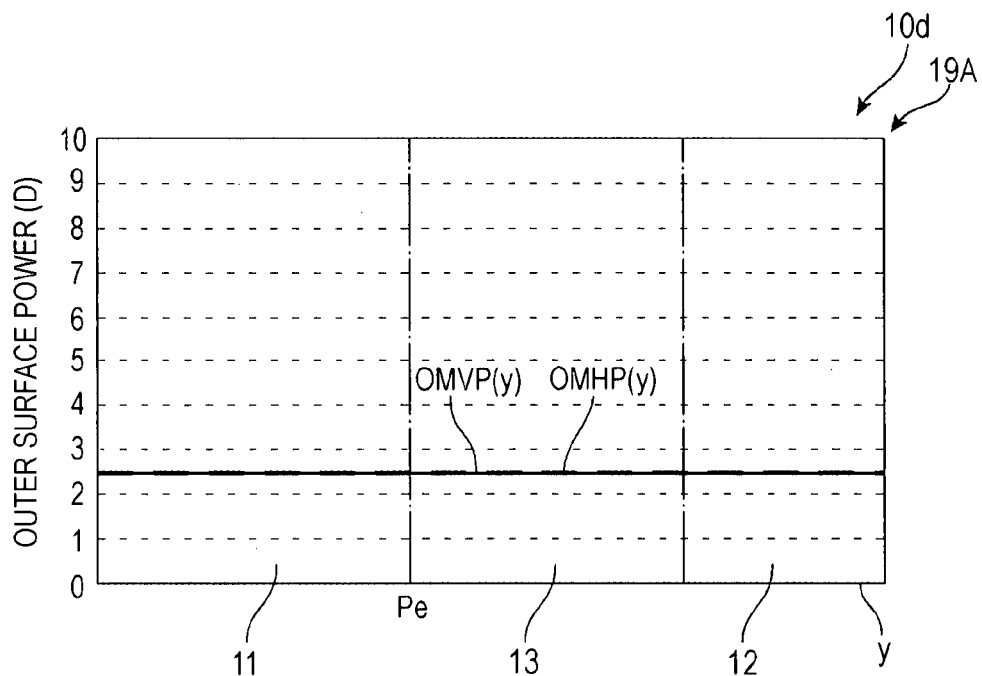
FIG. 22A is a diagram showing a surface power on a principal meridian on the outer surface of a progressive power lens of Comparative Example 2.
Figure 22B:
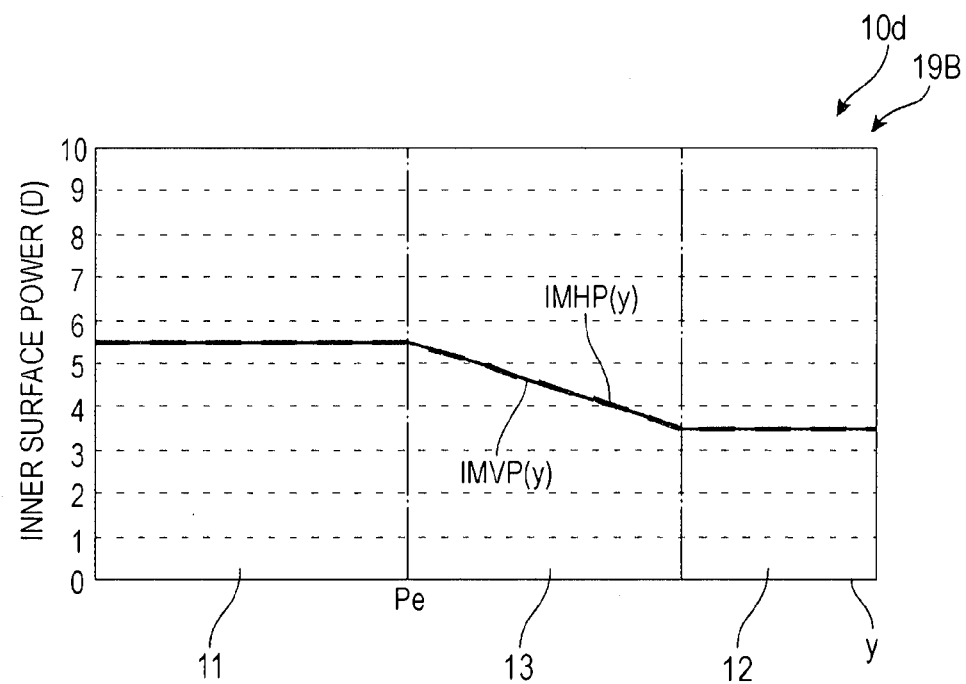
FIG. 22B is a diagram showing a surface power on a principal meridian on the inner surface of a progressive power lens of Comparative Example 2.

FIG. 22A shows a surface power OMHP(y) in a horizontal direction and a surface power OMVP(y) in a vertical direction along a principal meridian 14 on an outer surface (object-side surface) 19A of a progressive power lens 10d of Comparative Example 2 in terms of dioptre (D). FIG. 22B shows a surface power IMHP(y) in the horizontal direction and a surface power IMVP(y) in the vertical direction along a principal meridian 14 on an inner surface (eye-side surface) 19B of the progressive power lens 10d in terms of dioptre (D).

In the progressive power lens 10d of Comparative Example 2, the outer surface 19A is a spherical surface, and the surface power OMHP(y) in the horizontal direction and the surface power OMVP(y) in the vertical direction along the principal meridian are identical and 2.5 (D). The values of the surface power IMHP(y) in the horizontal direction and the surface power IMVP(y) in the vertical direction of the region along the principal meridian 14 on the inner surface 19B are common, the distance portion 11 is 5.5 (D), and the addition power is 2.0 (D).

Variations in the surface power shown in FIGS. 21 to 22 are simplified for understanding of the basic configuration. In actual design, aspheric correction which is intended to correct aberration in a lens peripheral vision is applied, and a few variations in the power in the vertical direction and the horizontal direction occur above the distance portion or in the near portion.

3.3 Comparison 2

In the progressive power lens 10c of Example 2, as shown in FIG. 21A, while the surface power OMVP in the vertical direction on the outer surface 19A is 2.5 (D) from the distance portion 11 to the near portion 12 as in the progressive power lens 10d of Comparative Example 2, the surface power OMHP in the horizontal direction is 5.5 (D) from the distance portion 11 to the near portion 12. Accordingly, the surface power OMHP in the horizontal direction on the outer surface 19A is shifted in a direction to be greater by 3.0 (D). On the inner surface 19B, as shown in FIG. 21B, like the outer surface 19A, the surface power IMHP in the horizontal direction is shifted in a direction to be greater than the surface power IMVP in the vertical direction by 3.0 (D). For this reason, as a result, although the outer surface 19A is a toric surface, shifts in the surface power on the outer surface 19A are cancelled by shifts in the surface power on the inner surface 19B, and the same power as in the progressive power lens 10d of Comparative Example 2 is secured.

Figure 23A:
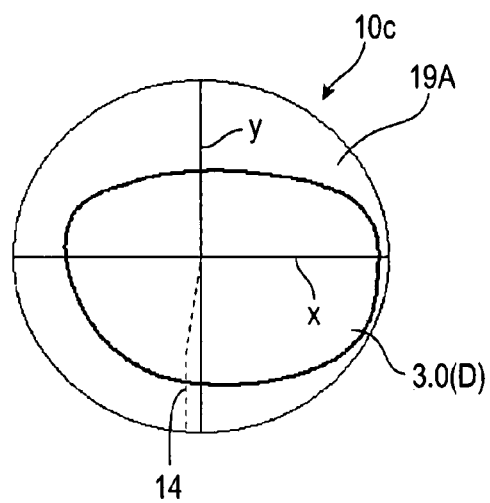
FIG. 23A is a diagram showing a surface astigmatism distribution on the outer surface of a progressive power lens of Example 2.
Figure 23B:
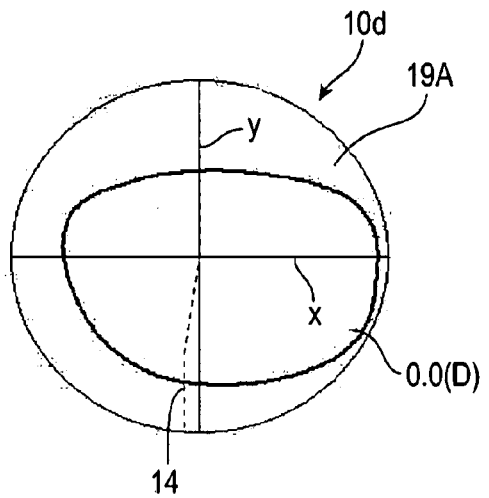
FIG. 23B is a diagram showing a surface astigmatism distribution on the outer surface of a progressive power lens of Comparative Example 2.
Figure 24A:
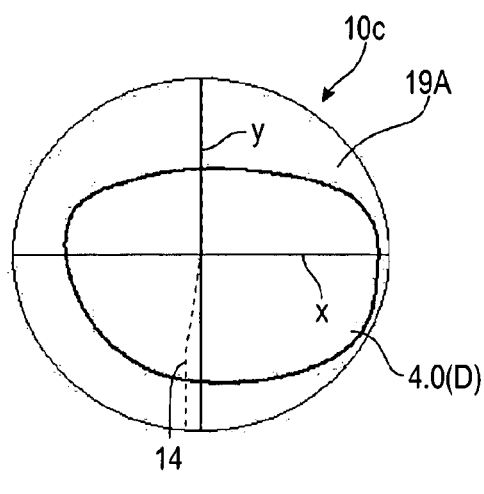
FIG. 24A is a diagram showing an equivalent spherical surface power distribution on the outer surface of a progressive power lens of Example 2.
Figure 24B:
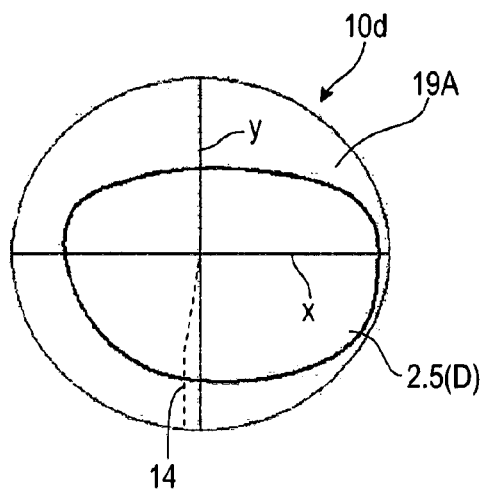
FIG. 24B is a diagram showing an equivalent spherical surface power distribution on the outer surface of a progressive power lens of Comparative Example 2.

FIG. 23A shows a surface astigmatism distribution on the outer surface 19A of the progressive power lens 10c of Example 2, and FIG. 23B shows a surface astigmatism distribution on the outer surface 19A of the progressive power lens 10d of Comparative Example 2. FIG. 24A shows an equivalent spherical surface power distribution on the outer surface 19A of the progressive power lens 10c of Example 2, and FIG. 24B shows an equivalent spherical surface power distribution on the outer surface 19A of the progressive power lens 10d of Comparative Example 2.

As in Embodiment 1, while the outer surface 19A of the progressive power lens 10c of Example 2 includes a uniform surface astigmatism of 3.0 (D), the surface astigmatism is uniform and thus an isoquant line is not shown. The equivalent spherical surface power of the outer surface 19A is uniform and becomes 4.0 (D). In this case, the surface power is uniform and thus an isoquant line is not shown. Meanwhile, the outer surface 19A of the progressive power lens 10d of Comparative Example 2 has a surface astigmatism of 0.0 (D), and the equivalent spherical surface power on the outer surface 19A is uniform and becomes 2.5 (D).

Figure 25A:
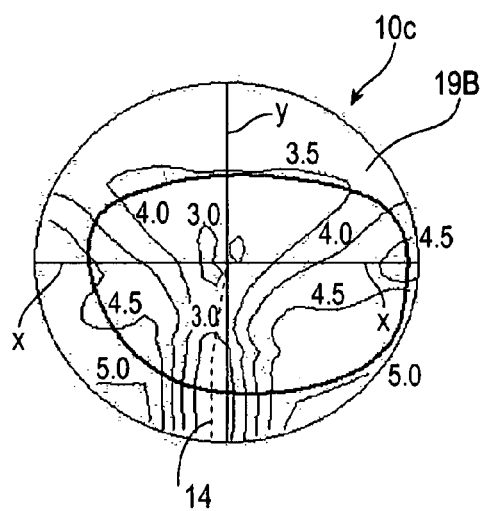
FIG. 25A is a diagram showing a surface astigmatism distribution on the inner surface of a progressive power lens of Example 2.
Figure 25B:
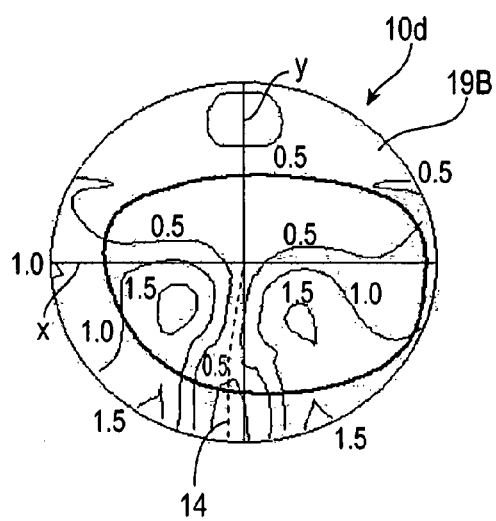
FIG. 25B is a diagram showing a surface astigmatism distribution on the inner surface of a progressive power lens of Comparative Example 2.
Figure 26A:
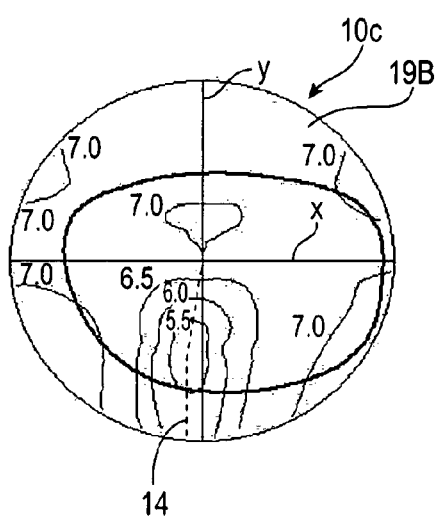
FIG. 26A is a diagram showing an equivalent spherical surface power distribution on the inner surface of a progressive power lens of Example 2.
Figure 26B:
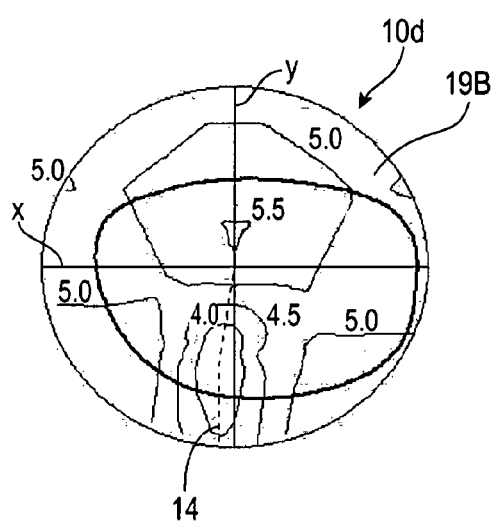
FIG. 26B is a diagram showing an equivalent spherical surface power distribution on the inner surface of a progressive power lens of Comparative Example 2.

FIG. 25A shows a surface astigmatism distribution on the inner surface 19B of the progressive power lens 10c of Example 2, and FIG. 25B shows a surface astigmatism distribution on the inner surface 19B of the progressive power lens 10d of Comparative Example 2. FIG. 26A shows an equivalent spherical surface power distribution on the inner surface 19B of the progressive power lens 10c of Example 2, and FIG. 26B shows an equivalent spherical surface power distribution on the inner surface 19B of the progressive power lens 10d of Comparative Example 2.

As in Embodiment 1, in the surface astigmatism of the progressive power lens 10c of Example 2, the surface astigmatism of 3.0 (D) having a major meridian in the horizontal direction is basically applied to the surface astigmatism of the progressive power lens 10d of Comparative Example 2. However, a combination is not simple because aspheric correction is applied so as to adjust aberration. In the equivalent spherical surface power distribution of the progressive power lens 10c of Example 2, the equivalent spherical surface power of +1.5 (D) is basically applied uniformly to the equivalent spherical surface power distribution of the progressive power lens 10d of Comparative Example 2. However, a combination is not simple due to the influence of aspheric correction.

Figure 27A:
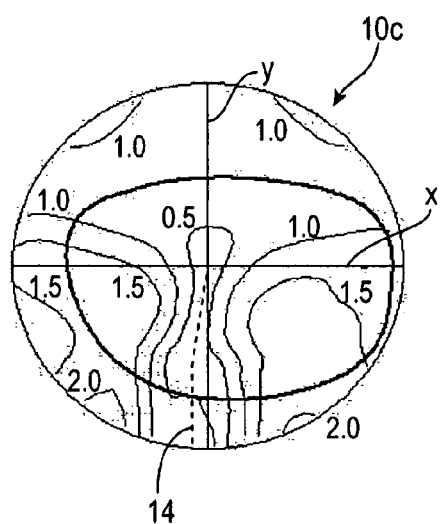
FIG. 27A is an astigmatism distribution of a progressive power lens of Example 2.
Figure 27B:
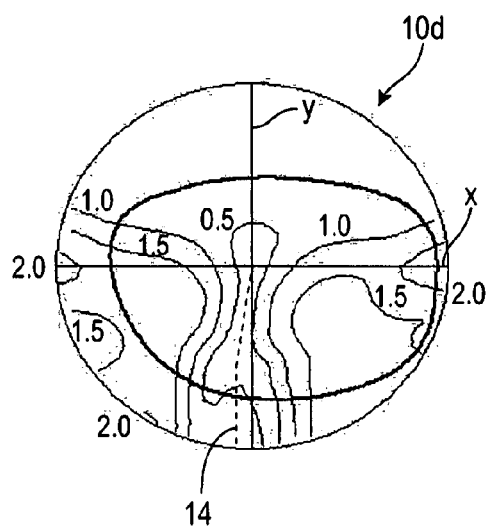
FIG. 27B is an astigmatism distribution of a progressive power lens of Comparative Example 2.
Figure 28A:
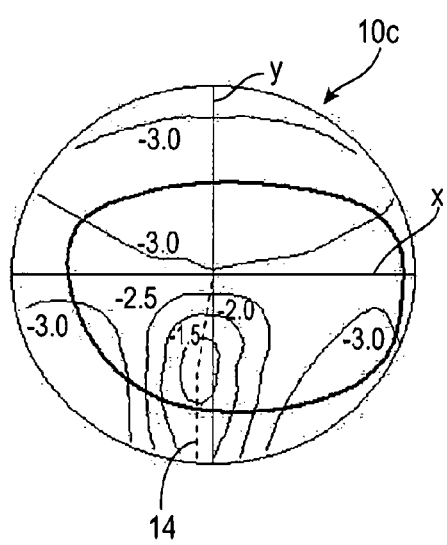
FIG. 28A is an equivalent spherical power distribution of a progressive power lens of Example 2.
Figure 28B:
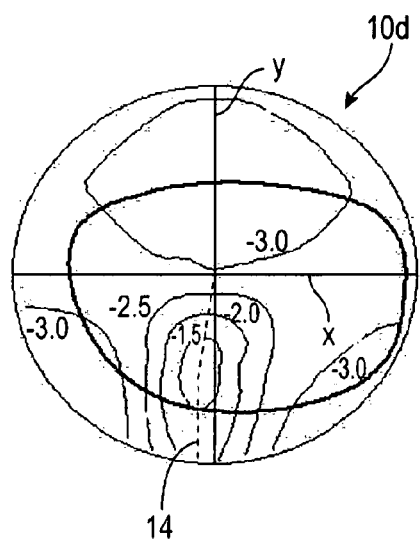
FIG. 28B is an equivalent spherical power distribution of a progressive power lens of Comparative Example 2.

FIG. 27A shows an astigmatism distribution when observation is done through each position on the lens in the progressive power lens 10c of Example 2, and FIG. 27B shows an astigmatism distribution when observation is done through each position on the lens in the progressive power lens 10d of Comparative Example 2. FIG. 28A shows an equivalent spherical power distribution when observation is done through each position on the lens in the progressive power lens 10c of Example 2, and FIG. 28B shows an equivalent spherical power distribution when observation is done through each position on the lens in the progressive power lens 10d of Comparative Example 2.

The astigmatism distribution of the progressive power lens 10c of Example 2 shown in FIG. 27A is substantially the same as the astigmatism distribution of the progressive power lens 10d of Comparative Example 2 shown in FIG. 27B. The equivalent spherical power distribution of the progressive power lens 10c of Example 2 shown in FIG. 28A is substantially the same as the equivalent spherical power distribution of the progressive power lens 10d of Comparative Example 2 shown in FIG. 28B. Accordingly, it is understood that, with the effective use of aspheric correction, a progressive power lens which has much the same performance as the progressive power lens 10d of Comparative Example 2 from the viewpoint of the astigmatism distribution and the equivalent spherical power distribution is obtained as the progressive power lens 10c of Example 2.

Figure 29:
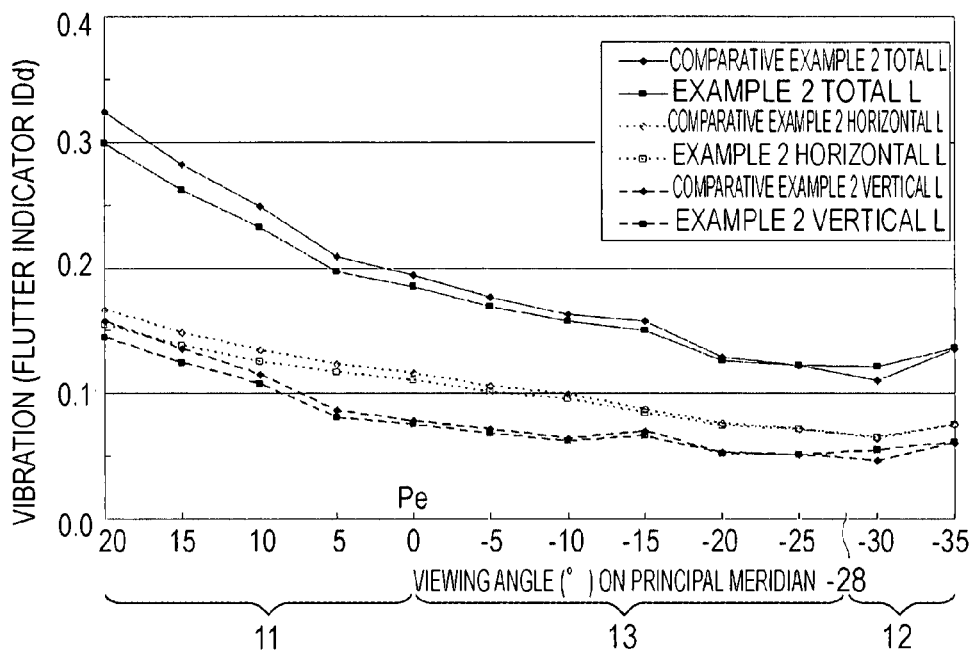
FIG. 29 is a diagram showing vibration (sway indicator IDd).
Figure 30:
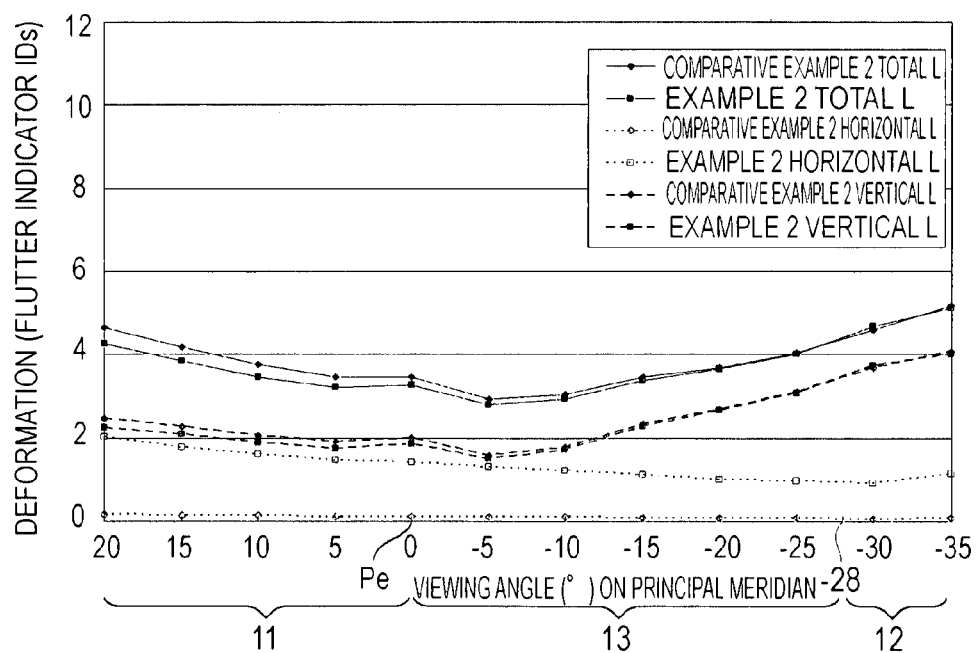
FIG. 30 is a diagram showing a deformation amount (sway indicator IDs).

FIG. 29 shows the indicator IDd relating to vibration obtained by the sway evaluation method. FIG. 30 shows the indicator IDs relating to a deformation amount obtained by the sway evaluation method. As in Embodiment 1, in regard to the indicator IDd relating to vibration, "horizontal L", "vertical L", and "total L" are represented, and in regard to the indicator IDs relating to a deformation amount, "horizontal L", "vertical L", and "total L" are represented.

It is understood that image sway obtained by the progressive power lenses 10c and 10d of Embodiment 2 is relatively smaller than image sway obtained by the progressive power lenses 10a and 10b of Embodiment 1. For this reason, the difference between the indicators IDd and IDs of the progressive power lens 10c and the indicators IDd and IDs of the progressive power lens 10d is small. However, it is understood that the indicators IDd and IDs of the progressive power lens 10c of Example 2 are equal to or smaller than the indicators IDd and IDs of the progressive power lens 10d of Comparative Example 2 over all the regions of the distance portion, the intermediate portion, and the near portion on the principal meridian 14, and sway is improved by the progressive power lens 10c of Example 2. In particular, sway is reduced in a wide range from the distance portion 11 to the intermediate portion 13.

Although in the above description, the rectangular pattern 50 of a square grid is used as the pattern of an observation indicator for evaluation, evaluation precision or density in each direction may be changed by changing the grid pitch in the horizontal direction and the vertical direction, or evaluation precision or density may be changed by increasing the number of grids.

4. Embodiment 3

4.1 Example 3

Figure 31A:
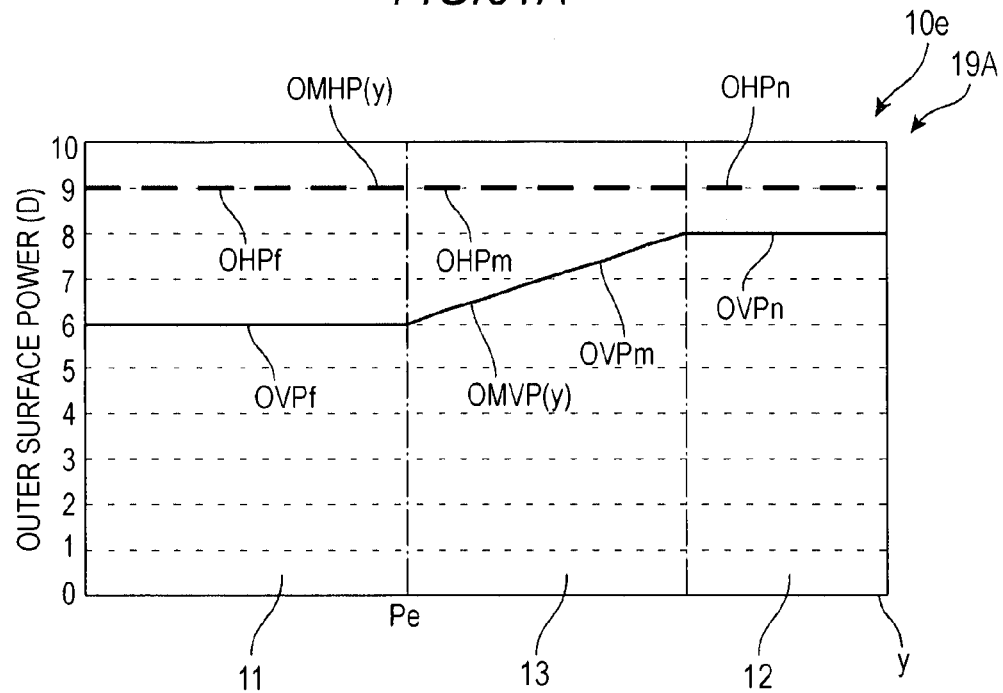
FIG. 31A is a diagram showing a surface power on a principal meridian on the outer surface of a progressive power lens of Example 3.
Figure 31B:
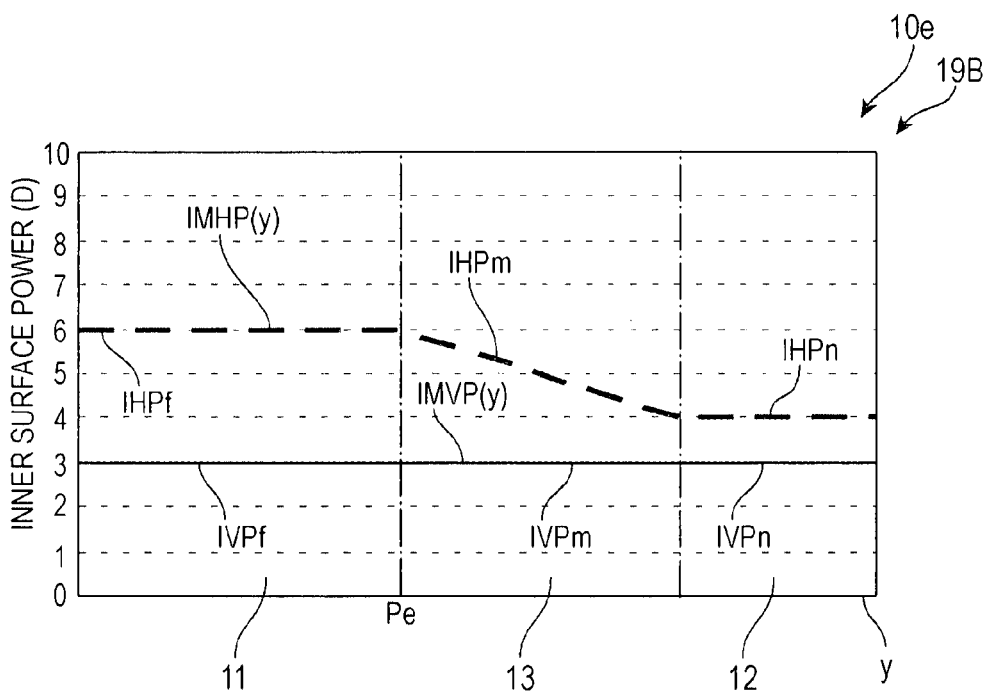
FIG. 31B is a diagram showing a surface power on a principal meridian on the inner surface of a progressive power lens of Example 3.

FIG. 31A shows a surface power OMHP(y) in a horizontal direction and a surface power OMVP(y) in a vertical direction along a principal meridian 14 on an outer surface (object-side surface) 19A of a progressive power lens 10e of Example 3 in terms of dioptre (D). FIG. 31B shows a surface power IMHP (y) in the horizontal direction and a surface power IMVP(y) in the vertical direction along a principal meridian 14 on an inner surface (eye-side surface) 19B of the progressive power lens 10e in terms of dioptre (D).

In the progressive power lens 10e of Example 3 and the progressive power lens 10g of Example 4, it is preferable to manipulate the surface power of the eye-side surface (inner surface) 19B according to the conditions (4a) and (5a) so as to cancel elements of a toric surface applied to the object-side surface (outer surface) 19A. However, in a thin lens having a sufficiently small thickness, it is possible to substantially cancel the elements of the toric surface according to the conditions (4) and (5). Accordingly, as in Examples 1 and 2, Examples 3 and 4 will be described as to a thin lens having a sufficiently small thickness.

The progressive power lens 10e of Example 3 was designed by applying the spectacle specification, including a progressive zone length of 14 mm, a prescription power (distance portion power, Sph) of 3.00 (D), and an addition power (Add) of 2.00 (D), to a progressive power lens "SEIKO P-1 SYNERGY AS (refractive index 1.67) manufactured by SEIKO EPSON CORPORATION. The diameter of the lens 10e is 65 mm, and an astigmatic power is not included.

In the progressive power lens 10e of Example 3, the outer surface 19A is constituted by a progressive surface (outer progressive surface) which includes elements of a toric (toroidal) surface with the surface power OHP in the horizontal direction greater than the surface power OVP in the vertical direction, and the inner surface 19B is constituted by an inner progressive surface which includes elements of a toric surface to cancel shifts in the surface power by the elements of the toric surface on the outer surface.

Specifically, on the outer surface 19A shown in FIG. 31A, the surface power OVPf in the vertical direction (longitudinal direction) of the distance portion 11 is constant and 6.0 (D). The surface power OVPm of the vertical direction of the intermediate portion 13 progressively increases and reaches a predetermined addition power of 2.0 (D) in the near portion 12. The surface power OVPn in the vertical direction of the near portion 12 is constant to 8.0 (D).

The surface power OHPf in the horizontal direction of the distance portion 11 on the outer surface 19A, the surface power OHPm in the horizontal direction of the intermediate portion 13, and the surface power OHPn in the horizontal direction of the near portion 12 are constant and 9.0 (D). Accordingly, in the distance portion 11, the surface power OHPf in the horizontal direction is shifted in a direction to be greater than the surface power OVPf in the vertical direction by 3.0 (D). In the near portion 12, the surface power OHPn in the horizontal direction is shifted in a direction to be greater than the surface power OVPn in the vertical direction by 1.0 (D). In the intermediate portion 13, the surface power OHPm in the horizontal direction is shifted in a direction to be greater than the surface power OVPm in the vertical direction. The shift amount changes from 3.0 (D) to 1.0 (D) from the distance portion 11 toward the near portion 12.

On the inner surface 19B shown in FIG. 31B, the surface power IVPf in the vertical direction of the distance portion 11, the surface power IVPm in the vertical direction of the intermediate portion 13, and the surface power IVPn in the vertical direction of the near portion 12 are constant and 3.0 (D).

The surface power IHPf in the horizontal direction (lateral direction) of the distance portion 11 on the inner surface 19B is constant and 6.0 (D), and the surface power IHPm in the horizontal direction of the intermediate portion 13 progressively decreases and reaches a predetermined addition power of 2.0 (D) in the near portion 12. The surface power IHPn in the horizontal direction of the near portion 12 is constant to 4.0 (D).

Accordingly, in the distance portion 11, the surface power IHPf in the horizontal direction is shifted in a direction to be greater than the surface power IVPf in the vertical direction by 3.0 (D). In the near portion 12, the surface power IHPn in the horizontal direction is shifted in a direction to be greater than the surface power IVPn in the vertical direction by 1.0 (D). In the intermediate portion 13, the surface power IHPm in the horizontal direction is shifted in a direction to be greater than the surface power IVPm in the vertical direction. The shift amount changes from 3.0 (D) to 1.0 (D) from the distance portion 11 toward the near portion 12. For this reason, in the progressive power lens 10e, the inner surface 19B includes elements of a toric surface which cancel shifts in the surface power by the elements of the toric surface on the outer surface 19A.

The progressive power lens 10e of Example 3 has all the conditions (11) to (21). That is, the surface power OHPf in the horizontal direction of the distance portion 11 in the region along the principal meridian 14 on the outer surface 19A is greater than the surface power OVPf in the vertical direction (condition (11)). The sum of the surface power OHPf in the horizontal direction of the distance portion and the surface power OHPn in the horizontal direction of the near portion in the region along the principal meridian 14 on the outer surface 19A is greater than the sum of the surface power OVPf in the vertical direction of the distance portion and the surface power OVPn in the vertical direction of the near portion (condition (12)). The surface power OVPn in the vertical direction of the near portion is greater than the surface power OVPf in the vertical direction of the distance portion 11 (condition (13)). The surface power OHPm in the horizontal direction of the intermediate portion 13 in the region along the principal meridian 14 on the outer surface 19A is greater than the surface power OVPm in the vertical direction.

The distance portion 11 on the inner surface 19B includes the surface power IHPf in the horizontal direction and the surface power IVPf in the vertical direction which cancel shifts in the surface power OHPf in the horizontal direction and the surface power OVPf in the vertical direction on the outer surface 19A (condition (14)). The near portion 12 on the inner surface 19B includes the surface power IHPn in the horizontal direction and the surface power IVPn in the vertical direction which cancel shifts in the surface power OHPn in the horizontal direction and the surface power OVPn in the vertical direction on the outer surface 19A (condition (15)). Similarly, the intermediate portion 13 on the inner surface 19B includes the surface power IHPm in the horizontal direction and the surface power IVPm in the vertical direction which cancel the surface power OHPm in the horizontal direction and the surface power OVPm in the vertical direction on the outer surface 19A.

The surface power IHPf in the horizontal direction of the distance portion 11 in the region along the principal meridian 14 on the inner surface 19B is greater than the surface power IVPf in the vertical direction (condition (16)). The surface power IHPn in the horizontal direction of the near portion 12 in the region along the principal meridian 14 on the inner surface 19B is greater than the surface power IVPn in the vertical direction (condition (17)). The surface power IHPf in the horizontal direction of the distance portion 11 is greater than the surface power IHPn in the horizontal direction of the near portion (condition (18)). The surface power IHPm in the horizontal direction of the intermediate portion 13 in the region along the principal meridian 14 on the inner surface 19B is greater than the surface power IVPm in the vertical direction.

Not only the surface power OHPf in the horizontal direction of the distance portion 11 and the surface power OHPn in the horizontal direction of the near portion 12 on the outer surface 19A but also the surface power OHPm in the horizontal direction of the intermediate portion 13 are constant (9.0 (D)) (condition (19)). Not only the surface power IVPf in the vertical direction of the distance portion 11 and the surface power IVPn in the vertical direction of the near portion 12 on the inner surface 19B but also the surface power IVPm in the vertical direction of the intermediate portion 13 are constant (3.0 (D)) (condition (20)).

In the progressive power lens 10e, the difference (shift) between the surface power OHPf in the horizontal direction and the surface power OVPf in the vertical direction of the distance portion 11 on the outer surface 19A and the difference (shift) between the surface power IHPf in the horizontal direction and the surface power IVPf in the vertical direction on the inner surface 19B have a constant value C1, and C1 is 3.0 (D) (conditions (21) and (21')). The difference (shift) between the surface power OHPn in the horizontal direction and the surface power OVPn in the vertical direction of the near portion 12 on the outer surface 19A and the difference (shift) between the surface power IHPn in the horizontal direction and the surface power IVPn in the vertical direction on the inner surface 19B have a constant value C2, and C2 is 1.0 (D) (conditions (21) and (21')).

4.2 Comparative Example 3

For comparison with the progressive power lens 10e of Example 3, as Comparative Example 3, an inner and outer progressive power lens 10f in which the distance portions on the outer surface 19A and the inner surface 19B were formed with a spherical surface as a base was designed with the same spectacle specification as described above.

Figure 32A:
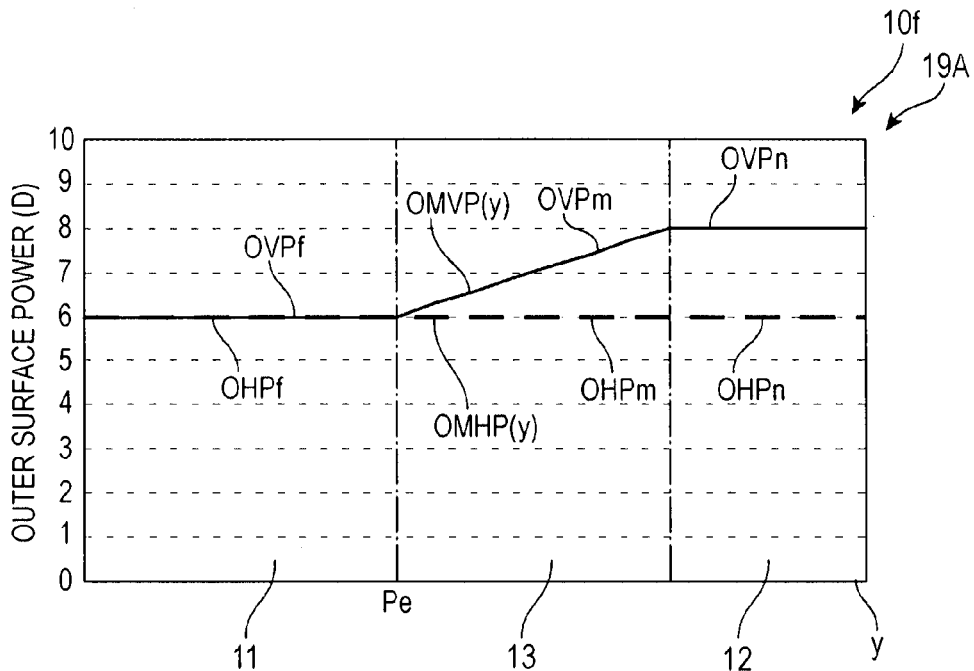
FIG. 32A is a diagram showing a surface power on a principal meridian on the outer surface of a progressive power lens of Comparative Example 3.
Figure 32B:
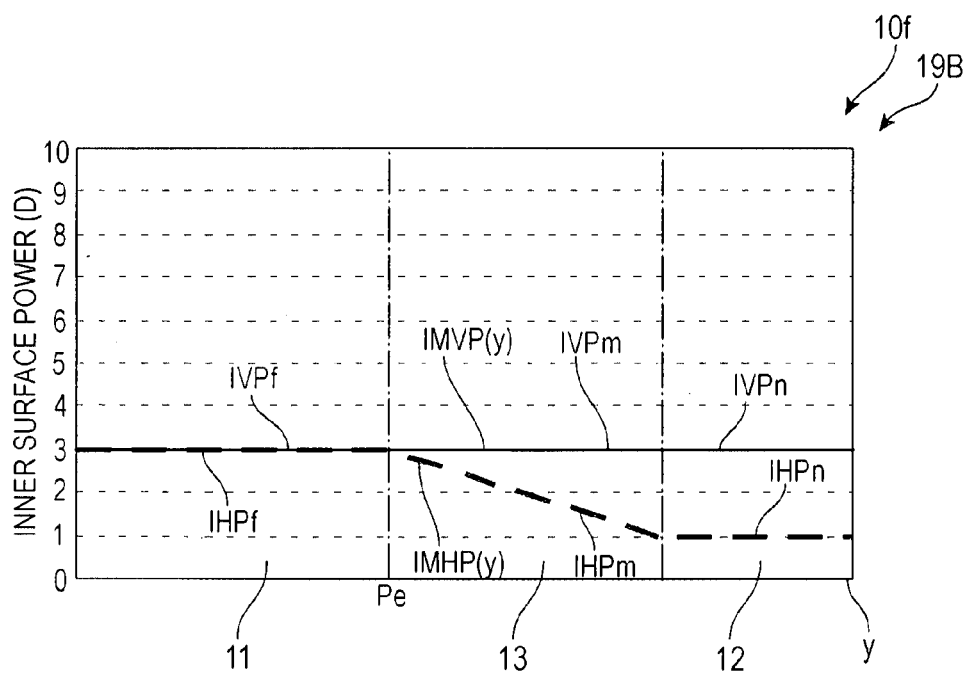
FIG. 32B is a diagram showing a surface power on a principal meridian on the inner surface of a progressive power lens of Comparative Example 3.

FIG. 32A shows a surface power OMHP(y) in a horizontal direction and a surface power OMVP (y) in a vertical direction along a principal meridian 14 on an outer surface (object-side surface) 19A of a progressive power lens 10f of Comparative Example 3 in terms of dioptre (D). FIG. 32B shows a surface power IMHP(y) in the horizontal direction and a surface power IMVP(y) in the vertical direction along a principal meridian 14 on an inner surface (eye-side surface) 19B of the progressive power lens 10f in terms of dioptre (D).

In the progressive power lens 10f of Comparative Example 3, the distance portion 11 on the outer surface 19A has a spherical surface, and the surface power OHPf in the horizontal direction and the surface power OVPf in the vertical direction of the distance portion 11 are identical and 6.0 (D). The surface power OVPm in the vertical direction of the intermediate portion 13 progressively increases and reaches a predetermined addition power of 2.0 (D) in the near portion 12. The surface power OVPn in the vertical direction of the near portion 12 is constant to 8.0 (D). The surface power OHPm in the horizontal direction of the intermediate portion 13 and the surface power OHPn in the horizontal direction of the near portion 12 are constant and 6.0 (D).

On the inner surface 19B, the distance portion 11 has a spherical surface, and the surface power IHPf in the horizontal direction and the surface power IVPf in the vertical direction of the distance portion 11 are identical and 3.0 (D). The surface power IHPm in the horizontal direction of the intermediate portion 13 progressively decreases and reaches a predetermined addition power (2.0 (D)) in the near portion 12. The surface power IHPn in the horizontal direction of the near portion 12 is constant to 1.0 (D). The surface power IVPm in the vertical direction of the intermediate portion 13 and the surface power IVPn in the vertical direction of the near portion 12 are constant to 3.0 (D).

Variations in the surface power shown in FIGS. 31A, 31B, 32A, and 32B are simplified for understanding of the basic configuration. In actual design, aspheric correction which is intended to correct aberration in a lens peripheral vision is applied, and a few variations in the power in the vertical direction and the horizontal direction occur above the distance portion or in the near portion.

4.3 Comparison 3

In the progressive power lens 10e of Example 3, as shown in FIGS. 31A and 31B, although the region along the principal meridian 14 includes the elements of the toric surface, shifts in the surface power by the elements of the toric surface on the outer surface 19A are cancelled by the elements of the toric surface on the inner surface 19B, and the same power as in the progressive power lens 10f of Comparative Example 3 is secured.

Figure 33A:
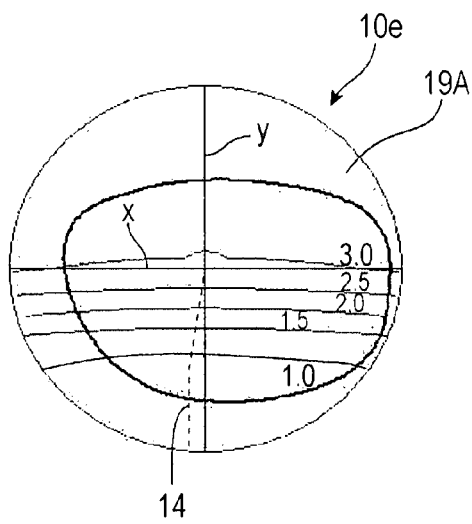
FIG. 33A is a diagram showing a surface astigmatism distribution on the outer surface of a progressive power lens of Example 3.
Figure 33B:
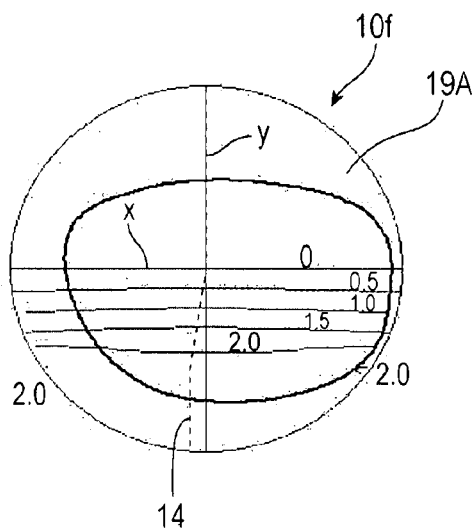
FIG. 33B is a diagram showing a surface astigmatism distribution on the outer surface of a progressive power lens of Comparative Example 3.
Figure 34A:
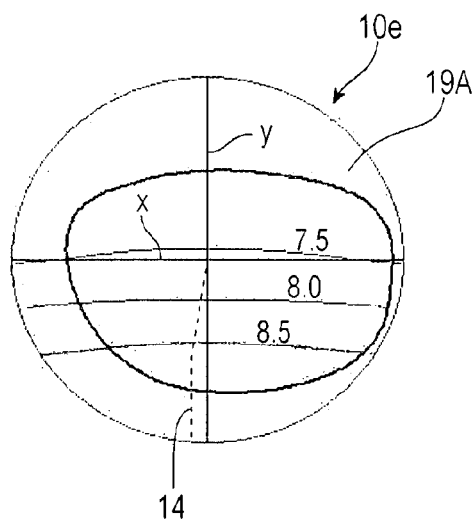
FIG. 34A is a diagram showing an equivalent spherical surface power distribution on the outer surface of a progressive power lens of Example 3.
Figure 34B:
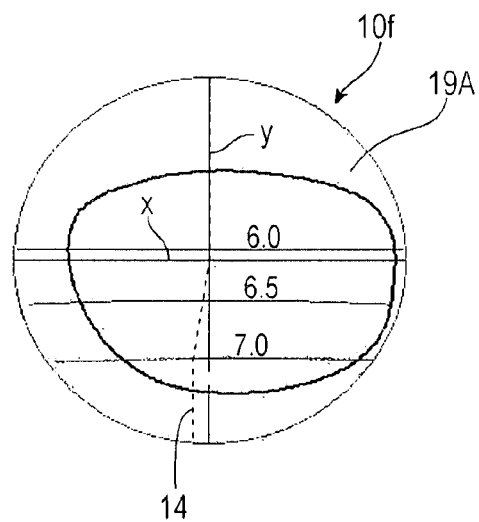
FIG. 34B is a diagram showing an equivalent spherical surface power distribution on the outer surface of a progressive power lens of Comparative Example 3.

FIG. 33A shows a surface astigmatism distribution on the outer surface 19A of the progressive power lens 10e of Example 3, and FIG. 33B shows a surface astigmatism distribution on the outer surface 19A of the progressive power lens 10f of Comparative Example 3. FIG. 34A shows an equivalent spherical surface power distribution on the outer surface 19A of the progressive power lens 10e of Example 3, and FIG. 34B shows an equivalent spherical surface power distribution on the outer surface 19A of the progressive power lens 10f of Comparative Example 3. An equivalent spherical surface power ESP is obtained by Expression (28).

As shown in FIG. 33B, in regard to the surface astigmatism on the outer surface 19A of the progressive power lens 10f of Comparative Example 3, an isoquant line is substantially shown in the horizontal direction by variation in the surface power OVP in the vertical direction. In regard to the surface astigmatism on the outer surface 19A of the progressive power lens 10e of Example 3 shown in FIG. 33A, astigmatism having a major meridian in the horizontal direction is further combined.

As shown in FIG. 34B, in regard to the equivalent spherical surface power on the outer surface 19A of the progressive power lens 10f of Comparative Example 3, an isoquant line is substantially shown in the horizontal direction by a variation in the surface power OVP in the vertical direction. In regard to the equivalent spherical surface power on the outer surface 19A of the progressive power lens 10e of Example 3 shown in FIG. 34A, the equivalent spherical surface power of nearly 1.5 (D) is fully combined.

Figure 35A:
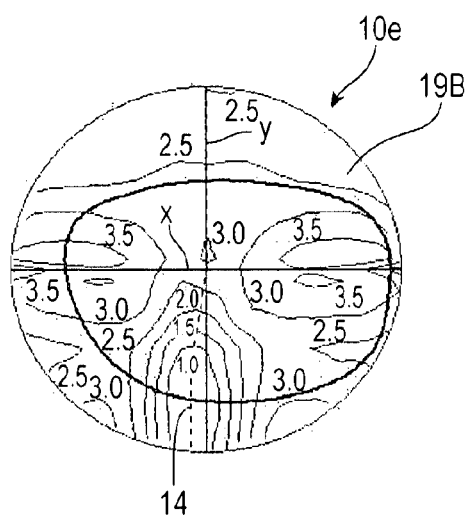
FIG. 35A is a diagram showing a surface astigmatism distribution on the inner surface of a progressive power lens of Example 3.
Figure 35B:
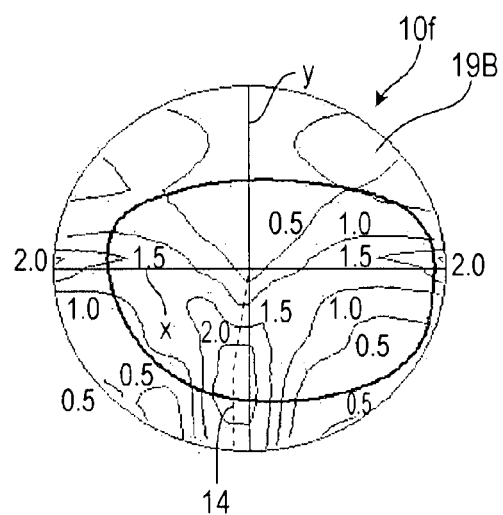
FIG. 35B is a diagram showing a surface astigmatism distribution on the inner surface of a progressive power lens of Comparative Example 3.
Figure 36A:
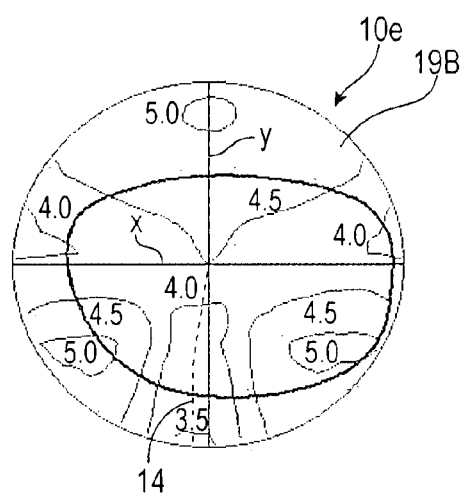
FIG. 36A is a diagram showing an equivalent spherical surface power distribution on the inner surface of a progressive power lens of Example 3.

FIG. 35A shows a surface astigmatism distribution on the inner surface 19B of the progressive power lens 10e of Example 3, and FIG. 35B shows a surface astigmatism distribution on the inner surface 19B of the progressive power lens 10f of Comparative Example 3. FIG. 36A shows an equivalent spherical surface power distribution on the inner surface 19B of the progressive power lens 10e of Example 3, and FIG. 36B shows an equivalent spherical surface power distribution on the inner surface 19B of the progressive power lens 10f of Comparative Example 3.

In the surface astigmatism of the progressive power lens 10e of Example 3 shown in FIG. 35A, the surface astigmatism of 3.0 (D) having a major meridian in the horizontal direction is basically applied to the surface astigmatism of the progressive power lens 10f of Comparative Example 3 shown in FIG. 35B. However, it is understood that a combination is not simple because aspheric correction is applied so as to adjust aberration.

Figure 36B:
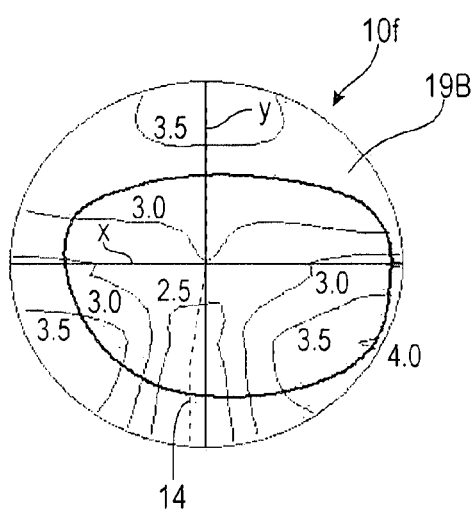
FIG. 36B is a diagram showing an equivalent spherical surface power distribution on the inner surface of a progressive power lens of Comparative Example 3.

In the equivalent spherical surface power distribution of the progressive power lens 10e of Example 3 shown in FIG. 36A, the equivalent spherical surface power of +1.5 (D) is basically applied uniformly to the equivalent spherical surface power distribution of the progressive power lens 10f of Comparative Example 3 shown in FIG. 36B. However, it is understood that a combination is not simple due to the influence of aspheric correction.

Figure 37A:
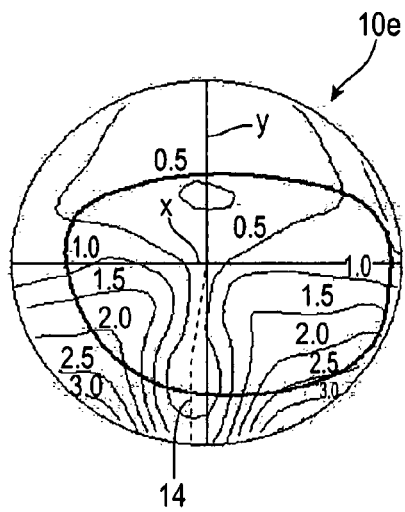
FIG. 37A is an astigmatism distribution of a progressive power lens of Example 3.
Figure 37B:
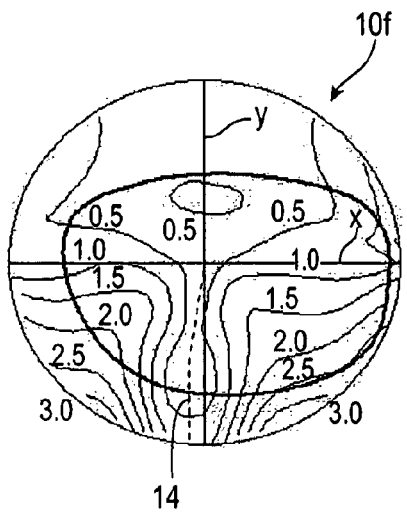
FIG. 37B is an astigmatism distribution of a progressive power lens of Comparative Example 3.
Figure 38A:
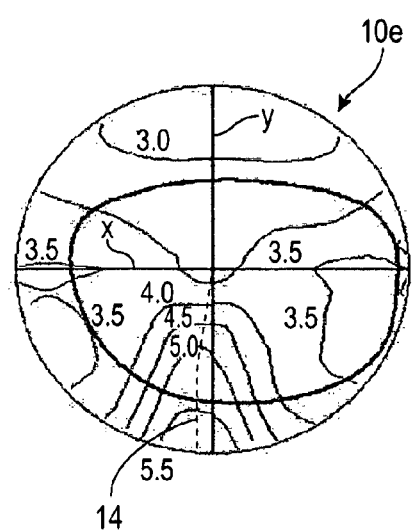
FIG. 38A is an equivalent spherical surface power distribution of a progressive power lens of Example 3.
Figure 38B:
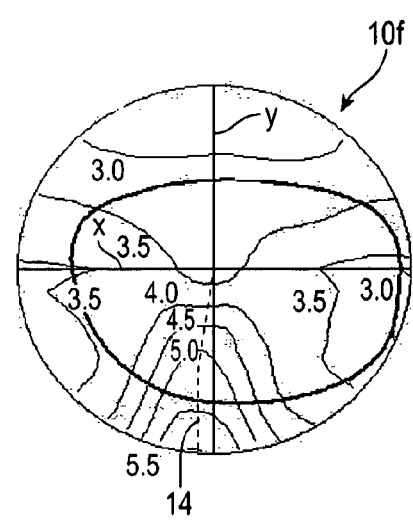
FIG. 38B is an equivalent spherical power distribution of a progressive power lens of Comparative Example 3.

FIG. 37A shows an astigmatism distribution when observation is done through each position on the lens in the progressive power lens 10e of Example 3, and FIG. 37B shows an astigmatism distribution when observation is done through each position on the lens in the progressive power lens 10f of Comparative Example 3. FIG. 38A shows an equivalent spherical power distribution when observation is done through each position on the lens in the progressive power lens 10e of Example 3, and FIG. 38B shows an equivalent spherical power distribution when observation is done through each position on the lens in the progressive power lens 10f of Comparative Example 3.

The astigmatism distribution of the progressive power lens 10e of Example 3 shown in FIG. 37A is substantially the same as the astigmatism distribution of the progressive power lens 10f of Comparative Example 3 shown in FIG. 37B. The equivalent spherical power distribution of the progressive power lens 10e of Example 3 shown in FIG. 38A is substantially the same as the equivalent spherical power distribution of the progressive power lens 10f of Comparative Example 3 shown in FIG. 38B. Accordingly, it is understood that, with the effective use of aspheric correction, a progressive power lens which has much the same performance as the progressive power lens 10f of Comparative Example 3 from the viewpoint of the astigmatism distribution and the equivalent spherical power distribution is obtained as the progressive power lens 10e of Example 3.

Figure 39:
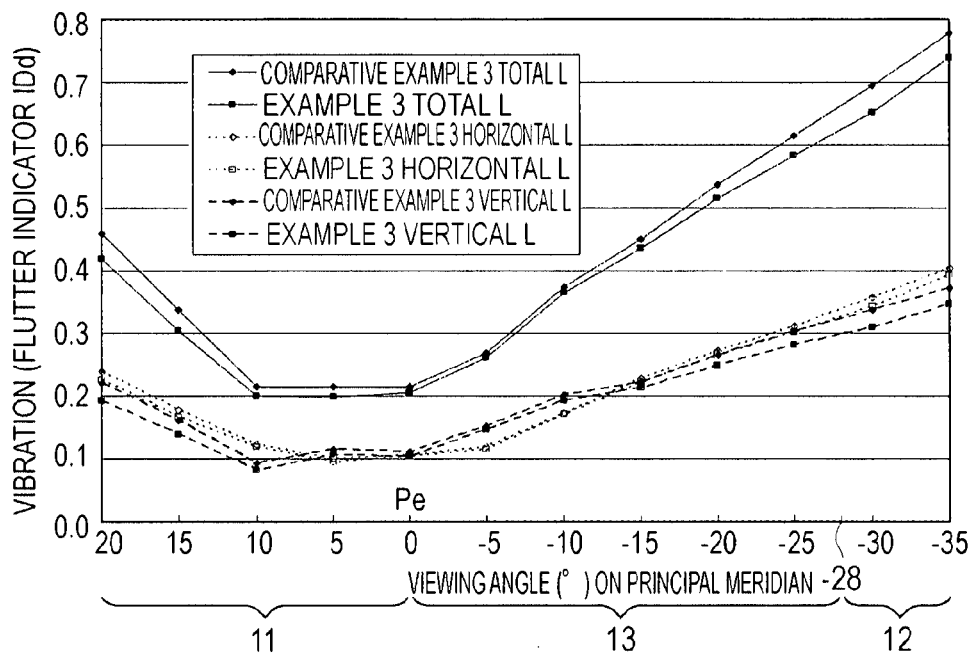
FIG. 39 is a diagram showing vibration (sway indicator IDd).
Figure 40:
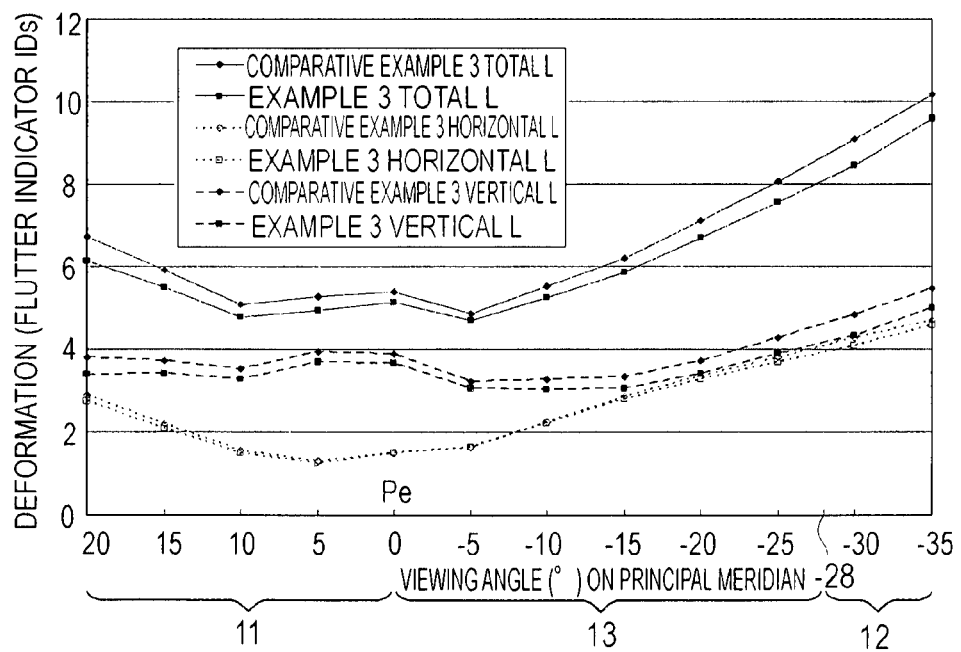
FIG. 40 is a diagram showing a deformation amount (sway indicator IDs).

FIG. 39 shows the indicator IDd relating to vibration obtained by the sway evaluation method. FIG. 40 shows the indicator IDs relating to a deformation amount obtained by the sway evaluation method.

As shown in FIGS. 39 and 40, the indicator IDd relating to vibration and the indicator IDs relating to a deformation amount in the progressive power lens 10e of Example 3 are smaller than those in the progressive power lens 10f of Comparative Example 3. The sway improvement effect is well shown in the total L of each of the indicators IDd and IDs, and it is shown that sway is reduced over all the regions of the distance portion, the intermediate portion, and the near portion on the principal meridian 14. In particular, the sway improvement effect is large in a region from the intermediate portion 13 toward the near portion 12 above the distance portion 11. By comparison of the vertical L and the horizontal L, it is understood that, in all the indicators IDd and IDs, the vertical L has a larger improvement effect.

As described above, in the progressive power lens 10e of Example 3 in which the elements of the toric surface are introduced to the outer surface 19A and the inner surface 19B, the astigmatism distribution and the equivalent spherical surface power distribution which are the general performance as a spectacle lens are the same as those in the progressive power lens 10f of Comparative Example 3 which has a spherical surface not including elements of a toric surface as a base (as a spectacle lens which is not intended for astigmatism correction). In the progressive power lens 10e of Example 3, it is understood that it is possible to reduce image sway when the line of sight 2 (eyeball 3) moves by vestibulo-ocular reflex, compared to the progressive power lens 10f of Comparative Example 3. One reason for this is thought to be that the elements of the toric surface are introduced to the inner and outer surfaces, in particular, the elements of the toric surface are introduced to the regions along the principal meridian 14 on the inner and outer surfaces, thereby suppressing variations in the angle at which the line of sight 2 enters or is emitted from the spectacle lens 10e when the line of sight 2 moves by vestibulo-ocular reflex and suppress variations in all aberrations when the line of sight 2 moves by vestibulo-ocular reflex.

Accordingly, the progressive power lens 10e of Example 3 is a spectacle lens which is suitable for a user who is compatible with image sway with difficulty, or an application. In regard to the visual characteristics of a person when the progressive power lens 10 is used, the use frequency on the principal meridian 14 is very high, and image sway is found when a visual operation is carried out using near the principal meridian 14. Therefore, if a shift in the intensity direction of the surface power OHP in the horizontal direction on the outer surface 19A is within at least 10 mm in the horizontal direction with the principal meridian 14 as a center, it is possible to sufficiently obtain the image sway reduction effect.

5. Embodiment 4

5.1 Example 4

Figure 41A:
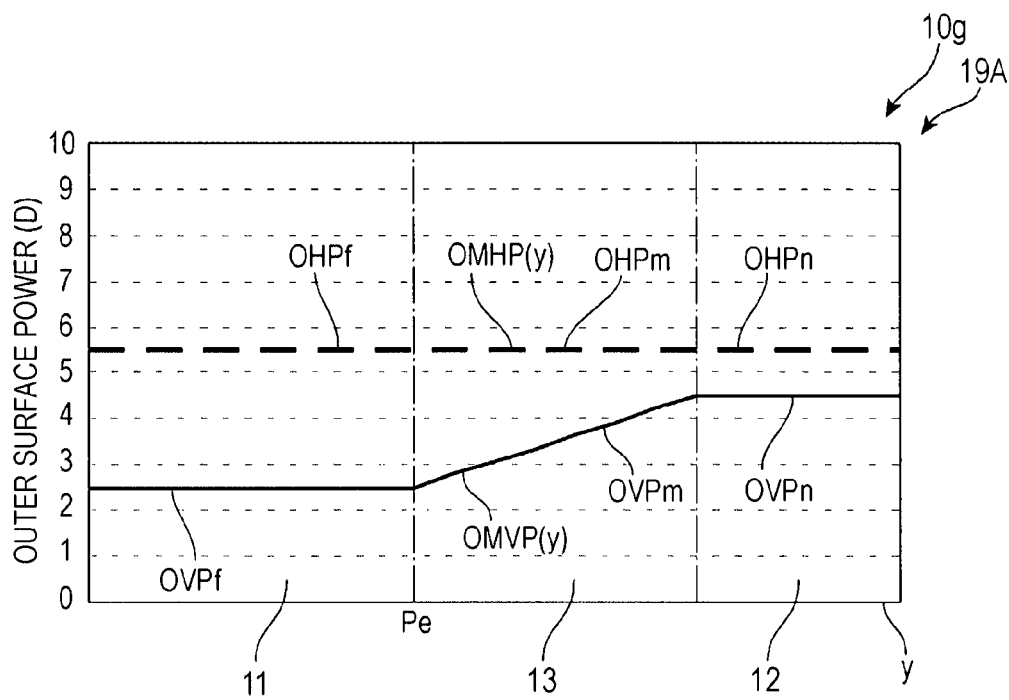
FIG. 41A is a diagram showing a surface power on a principal meridian on the outer surface of a progressive power lens of Example 4.
Figure 41B:
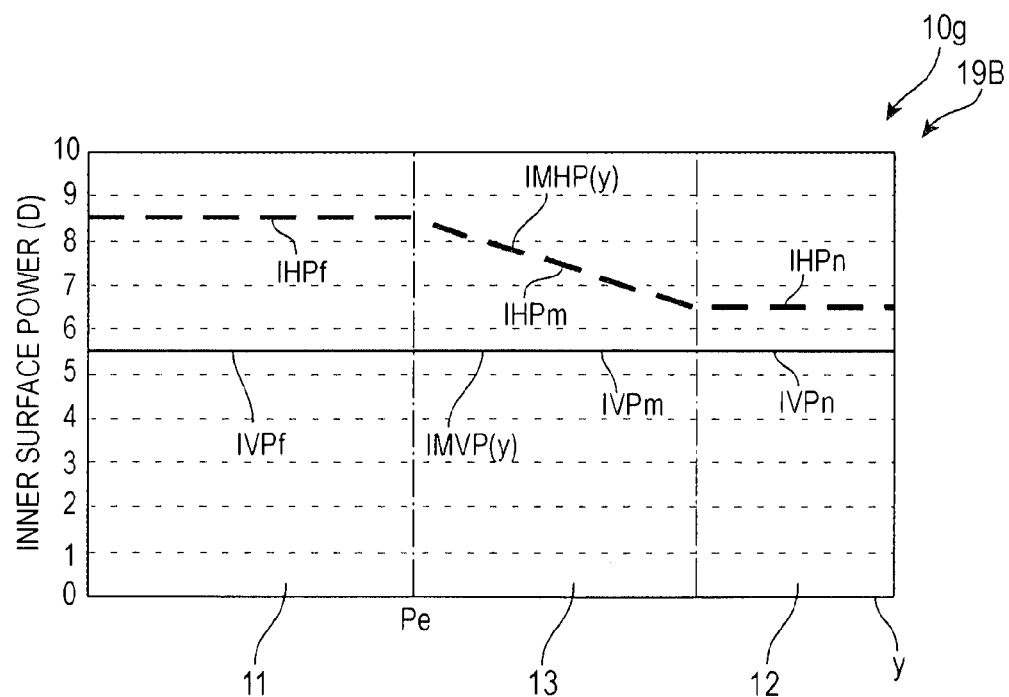
FIG. 41B is a diagram showing a surface power on a principal meridian on the inner surface of a progressive power lens of Example 4.

FIG. 41A shows a surface power OMHP(y) in a horizontal direction and a surface power OMVP(y) in a vertical direction along a principal meridian 14 on an outer surface (object-side surface) 19A of a progressive power lens 10g of Example 4 in terms of dioptre (D). FIG. 41B shows a surface power IHP(y) in a horizontal direction and a surface power IVP(y) in a vertical direction along a principal meridian 14 on an inner surface (eye-side surface) 19B of the progressive power lens 10g in terms of dioptre (D).

The progressive power lens 10g of Example 4 was designed by applying the spectacle specification, including a progressive zone length of 14 mm, a prescription power (distance portion power, Sph) of −3.00 (D), and an addition power (Add) of 2.00 (D), to a progressive power lens "SEIKO P-1 SYNERGY AS (refractive index 1.67) manufactured by SEIKO EPSON CORPORATION. The diameter of the lens 10g is 65 mm, and an astigmatic power is not included.

In the progressive power lens 10g of Example 4, as in the progressive power lens 10e of Example 3, the outer surface 19A and the inner surface 19B include elements of a toric surface. Specifically, in the progressive power lens 10g of Example 4, the surface power OVPf in the vertical direction (longitudinal direction) of the distance portion 11 on the outer surface 19A is 2.5 (D). The surface power OVPm in the vertical direction of the intermediate portion 13 progressively increases and reaches a predetermined addition power of 2.0 (D) in the near portion 12. The surface power OVPn in the vertical direction of the near portion 12 is 4.5 (D).

The surface power OHPf in the horizontal direction of the distance portion 11, the surface power OHPm in the horizontal direction of the intermediate portion 13, and the surface power OHPn in the horizontal direction of the near portion 12 on the outer surface 19A are constant and 5.5 (D). Accordingly, in the distance portion 11, the surface power OHPf in the horizontal direction is shifted in a direction to be greater than the surface power OVPf in the vertical direction by 3.0 (D). In the near portion 12, the surface power OHPn in the horizontal direction is shifted in a direction to be greater than the surface power OVPn in the vertical direction by 1.0 (D). In the intermediate portion 13, the surface power OHPm in the horizontal direction is shifted in a direction to be greater than the surface power OVPm in the vertical direction. The shift amount changes from 3.0 (D) to 1.0 (D) from the distance portion 11 toward the near portion 12.

On the inner surface 19B, the surface power IVPf in the vertical direction of the distance portion 11, the surface power IVPm in the vertical direction of the intermediate portion 13, and the surface power IVPn in the vertical direction of the near portion 12 are constant and 5.5 (D). The surface power IHPf in the horizontal direction (lateral direction) of the distance portion 11 on the inner surface 19B is 8.5 (D). The surface power IHPm in the horizontal direction of the intermediate portion 13 progressively decreases and reaches a predetermined addition power of 2.0 (D) in the near portion 12. The surface power IHPn in the horizontal direction of the near portion 12 is 6.5 (D).

Accordingly, in the distance portion 11, the surface power IHPf in the horizontal direction is shifted in a direction to be greater than the surface power IVPf in the vertical direction by 3.0 (D). In the near portion 12, the surface power IHPn in the horizontal direction is shifted in a direction to be greater than the surface power IVPn in the vertical direction by 1.0 (D). In the intermediate portion 13, the surface power IHPm in the horizontal direction is shifted in a direction to be greater than the surface power IVPm in the vertical direction. The shift amount changes from 3.0 (D) to 1.0 (D) from the distance portion 11 toward the near portion 12. For this reason, in the progressive power lens 10g, the inner surface 19B includes elements of a toric surface which cancel shifts in the surface power by the elements of the toric surface on the outer surface 19A.

As in the progressive power lens 10e of Example 3, the progressive power lens 10g of Example 4 has all the conditions (11) to (21). The constant C1 is 3.0 (D), and the constant C2 is 1.0 (D).

5.2 Comparative Example 4

For comparison with the progressive power lens 10g of Example 4, as Comparative Example 4, an inner and outer progressive power lens 10h in which the distance portions on the outer surface 19A and the inner surface 19B were formed with a spherical surface as a base was designed with the same spectacle specification as described above.

Figure 42A:
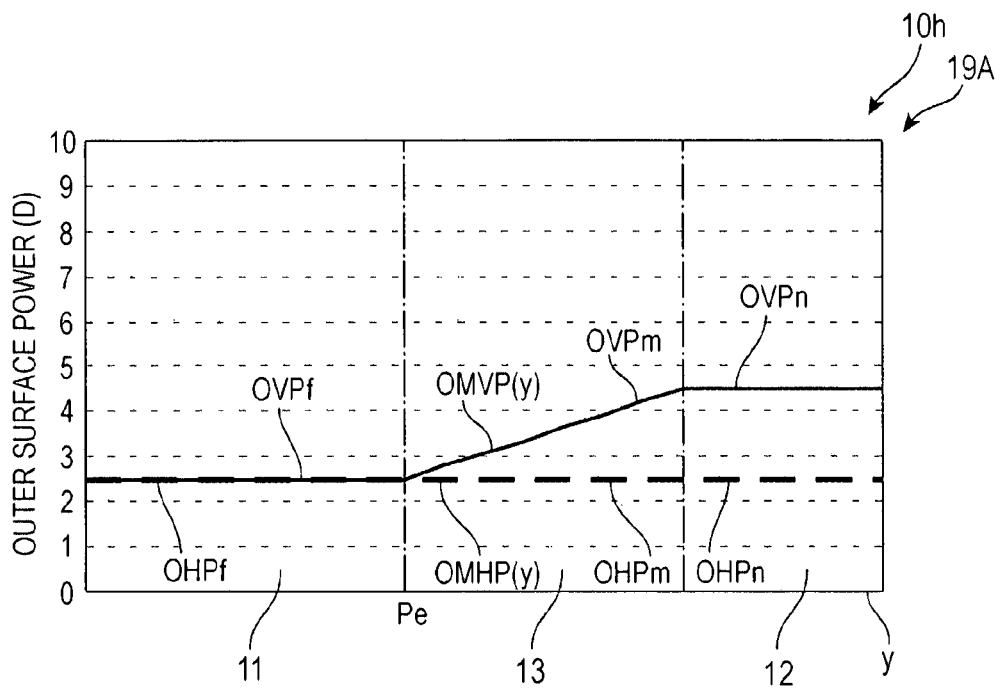
FIG. 42A is a diagram showing a surface power on a principal meridian on the outer surface of a progressive power lens of Comparative Example 4.
Figure 42B:
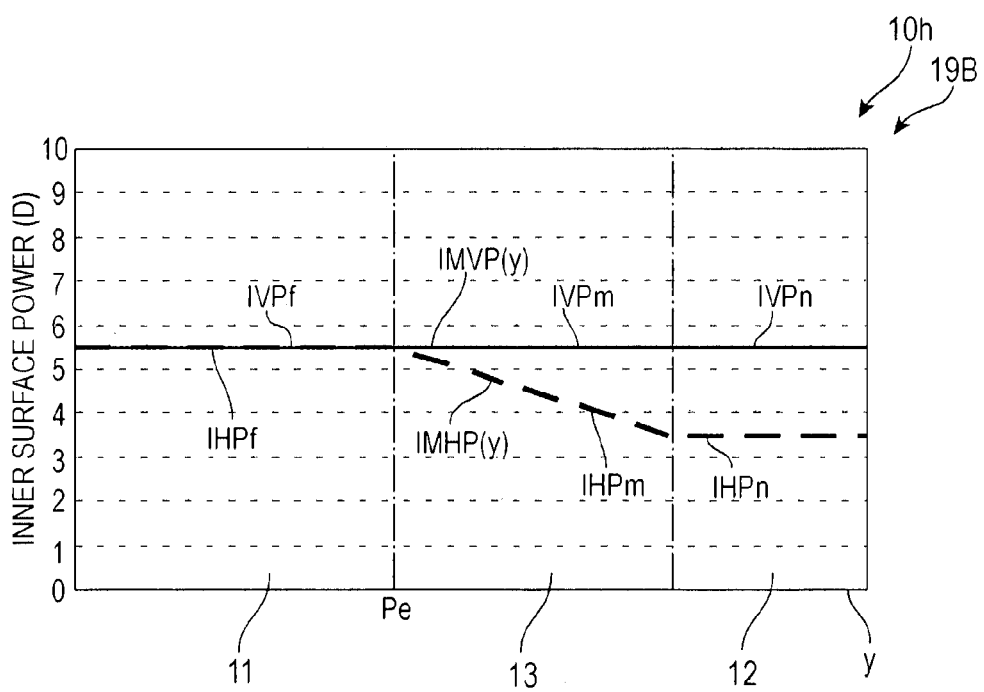
FIG. 42B is a diagram showing a surface power on a principal meridian on the inner surface of a progressive power lens of Comparative Example 4.

FIG. 42A shows a surface power OMHP(y) in a horizontal direction and a surface power OMVP(y) in a vertical direction along a principal meridian 14 on an outer surface (object-side surface) 19A of a progressive power lens 10h of Comparative Example 4 in terms of dioptre (D). FIG. 42B shows a surface power IMHP(y) in the horizontal direction and a surface power IMVP(y) in the vertical direction along a principal meridian 14 on an inner surface (eye-side surface) 19B of the progressive power lens 10h in terms of dioptre (D).

In the progressive power lens 10h of Comparative Example 4, the distance portion 11 of the outer surface 19A has a spherical surface, and the surface power OHPf in the horizontal direction and the surface power OVPf in the vertical direction are identical and 2.5 (D). The surface power OVPm in the vertical direction of the intermediate portion 13 progressively increases and reaches a predetermined addition power of 2.0 (D) in the near portion 12. The surface power OVPn in the vertical direction of the near portion 12 is 4.5 (D). The surface power OHPm in the horizontal direction of the intermediate portion 13 and the surface power OHPn in the horizontal direction of the near portion 12 are constant and 2.5 (D).

On the inner surface 19B, the distance portion 11 has a spherical surface, and the surface power IHPf in the horizontal direction and the surface power IVPf in the vertical direction are identical and 5.5 (D). The surface power IHPm in the horizontal direction of the intermediate portion 13 progressively decreases and reaches a predetermined addition power (2.0 (D)) in the near portion 12. The surface power IHPn in the horizontal direction of the near portion 12 is 3.5 (D). The surface power IVPm in the vertical direction of the intermediate portion 13 and the surface power IVPn in the vertical direction of the near portion 12 are constant and 5.5 (D).

Variations in the surface power shown in FIGS. 41A to 42B are simplified for understanding of the basic configuration. In actual design, aspheric correction which is intended to correct aberration in a lens peripheral vision is applied, and a few variations in the power in the vertical direction and the horizontal direction occur above the distance portion or in the near portion.

5.3 Comparison 4

In the progressive power lens 10g of Example 4, as shown in FIGS. 41A and 41B, a region along the principal meridian 14 includes elements of a toric surface. Shifts in the surface power by the elements of the toric surface on the outer surface 19A are cancelled by the elements of the toric surface on the inner surface 19B, and the same power as in the progressive power lens 10h of Comparative Example 4 is secured.

Figure 43A:
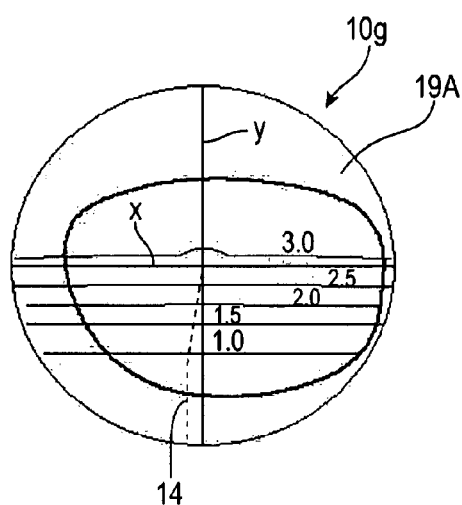
FIG. 43A is a diagram showing a surface astigmatism distribution on the outer surface of a progressive power lens of Example 4.
Figure 43B:
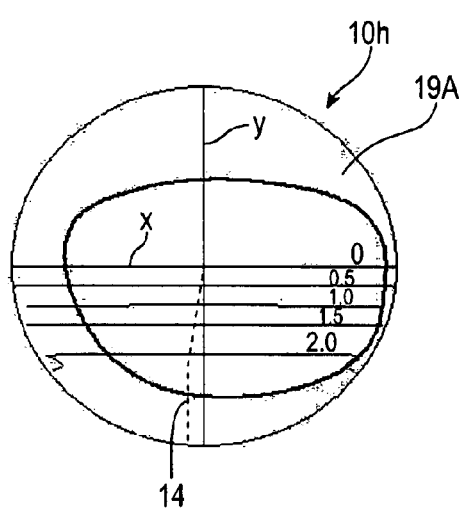
FIG. 43B is a diagram showing a surface astigmatism distribution on the outer surface of a progressive power lens of Comparative Example 4.
Figure 44A:
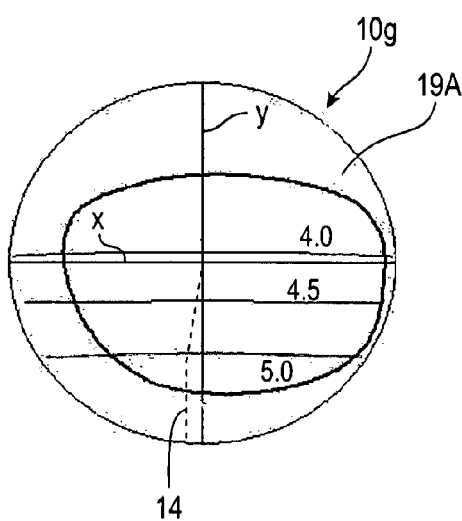
FIG. 44A is a diagram showing an equivalent spherical surface power distribution on the outer surface of a progressive power lens of Example 4.
Figure 44B:
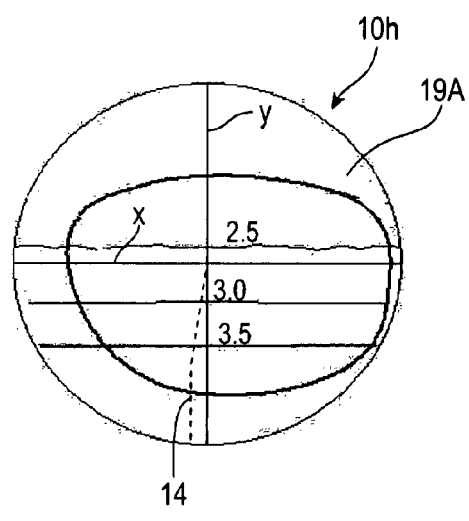
FIG. 44B is a diagram showing an equivalent spherical surface power distribution on the outer surface of a progressive power lens of Comparative Example 4.

FIG. 43A shows a surface astigmatism distribution on the outer surface 19A of the progressive power lens 10g of Example 4, and FIG. 433 shows a surface astigmatism distribution on the outer surface 19A of the progressive power lens 10h of Comparative Example 4. FIG. 44A shows an equivalent spherical surface power distribution on the outer surface 19A of the progressive power lens 10g of Example 4, and FIG. 44B shows an equivalent spherical surface power distribution on the outer surface 19A of the progressive power lens 10h of Comparative Example 4.

As in Embodiment 3, in regard to the surface astigmatism on the outer surface 19A of the progressive power lens 10g of Example 4, the surface astigmatism having a major meridian in the horizontal direction is combined with the surface astigmatism on the outer surface 19A of the progressive power lens 10h of Comparative Example 4. In regard to the equivalent spherical surface power on the outer surface 19A of the progressive power lens 10g of Example 4, the equivalent spherical surface power of nearly 1.5 (D) is fully combined with the equivalent spherical surface power on the outer surface 19A of the progressive power lens 10h of Comparative Example 4.

Figure 45A:
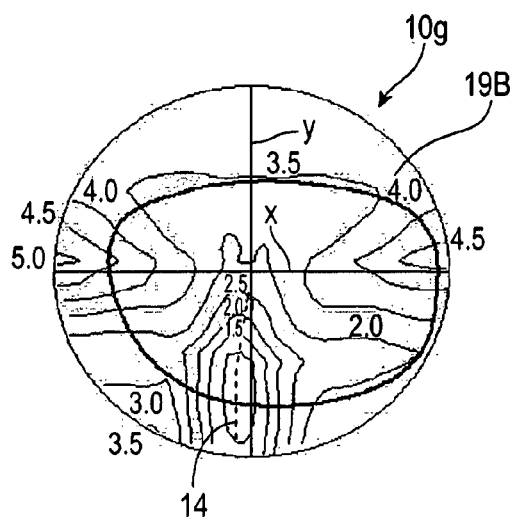
FIG. 45A is a diagram showing a surface astigmatism distribution on the inner surface of a progressive power lens of Example 4.
Figure 45B:
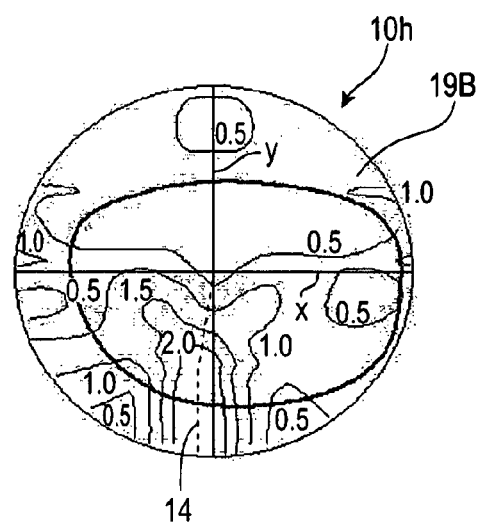
FIG. 45B is a diagram showing a surface astigmatism distribution on the inner surface of a progressive power lens of Comparative Example 4.
Figure 46A:
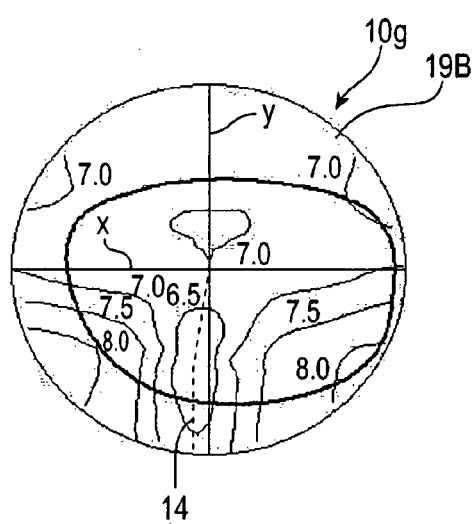
FIG. 46A is a diagram showing an equivalent spherical surface power distribution on the inner surface of a progressive power lens of Example 4.
Figure 46B:
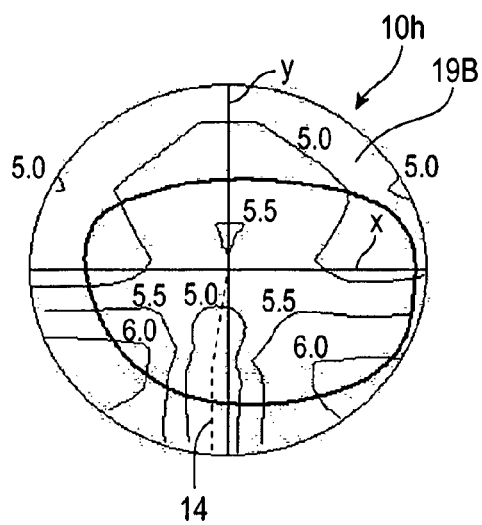
FIG. 46B is a diagram showing an equivalent spherical surface power distribution on the inner surface of a progressive power lens of Comparative Example 4.

FIG. 45A shows a surface astigmatism distribution on the inner surface 19B of the progressive power lens 10g of Example 4, and FIG. 45B shows a surface astigmatism distribution on the inner surface 19B of the progressive power lens 10h of Comparative Example 4. FIG. 46A shows an equivalent spherical surface power distribution on the inner surface 19B of the progressive power lens 10g of Example 4, and FIG. 46B shows an equivalent spherical surface power distribution on the inner surface 19B of the progressive power lens 10h of Comparative Example 4.

As in Embodiment 3, in the surface astigmatism of the progressive power lens 10g of Example 4, the surface astigmatism of 3.0 (D) having a major meridian in the horizontal direction is basically applied to the surface astigmatism of the progressive power lens 10h of Comparative Example 4. However, a combination is not simple because aspheric correction is applied so as to adjust aberration. In the equivalent spherical surface power distribution of the progressive power lens 10g of Example 4, the equivalent spherical surface power of +1.5 (D) is basically attached uniformly to the equivalent spherical surface power distribution of the progressive power lens 10h of Comparative Example 4. However, a combination is not simple due to the influence of aspheric correction.

Figure 47A:
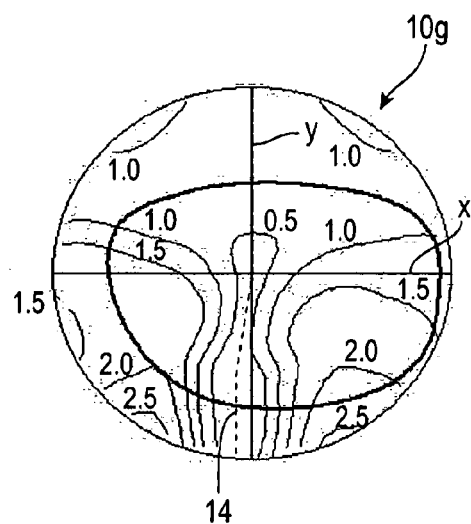
FIG. 47A is an astigmatism distribution of a progressive power lens of Example 4.
Figure 47B:
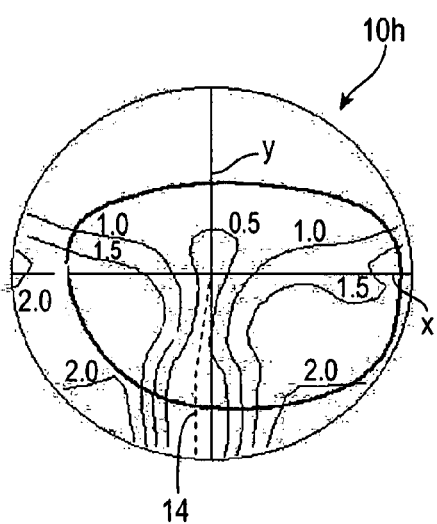
FIG. 47B is an astigmatism distribution of a progressive power lens of Comparative Example 4.
Figure 48A:
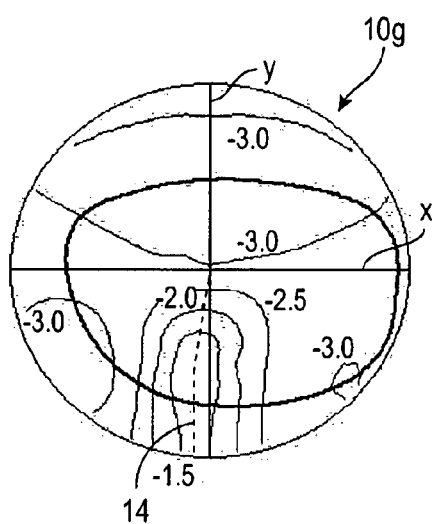
FIG. 48A is an equivalent spherical power distribution of a progressive power lens of Example 4.
Figure 48B:
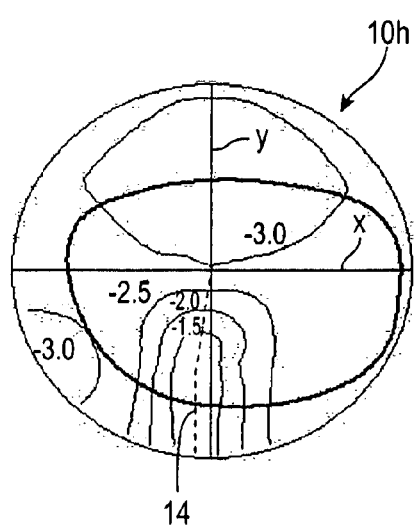
FIG. 48B is an equivalent spherical power distribution of a progressive power lens of Comparative Example 4.

FIG. 47A shows an astigmatism distribution when observation is done through each position on the lens in the progressive power lens 10g of Example 4, and FIG. 47B shows an astigmatism distribution when observation is done through each position on the lens in the progressive power lens 10h of Comparative Example 4. FIG. 48A shows an equivalent spherical power distribution when observation is done through each position on the lens in the progressive power lens 10g of Example 4, and FIG. 48B shows an equivalent spherical power distribution when observation is done through each position on the lens in the progressive power lens 10h of Comparative Example 4.

The astigmatism distribution of the progressive power lens 10g of Example 4 shown in FIG. 47A is substantially the same as the astigmatism distribution of the progressive power lens 10h of Comparative Example 4 shown in FIG. 47B. The equivalent spherical power distribution of the progressive power lens 10g of Example 4 shown in FIG. 48A is substantially the same as the equivalent spherical power distribution of the progressive power lens 10h of Comparative Example 4 shown in FIG. 48B. Accordingly, it is understood that, with the effective use of aspheric correction, a progressive power lens which has much the same performance as the progressive power lens 10h of Comparative Example 4 from the viewpoint of the astigmatism distribution and the equivalent spherical power distribution is obtained as the progressive power lens 10g of Example 4.

Figure 49:
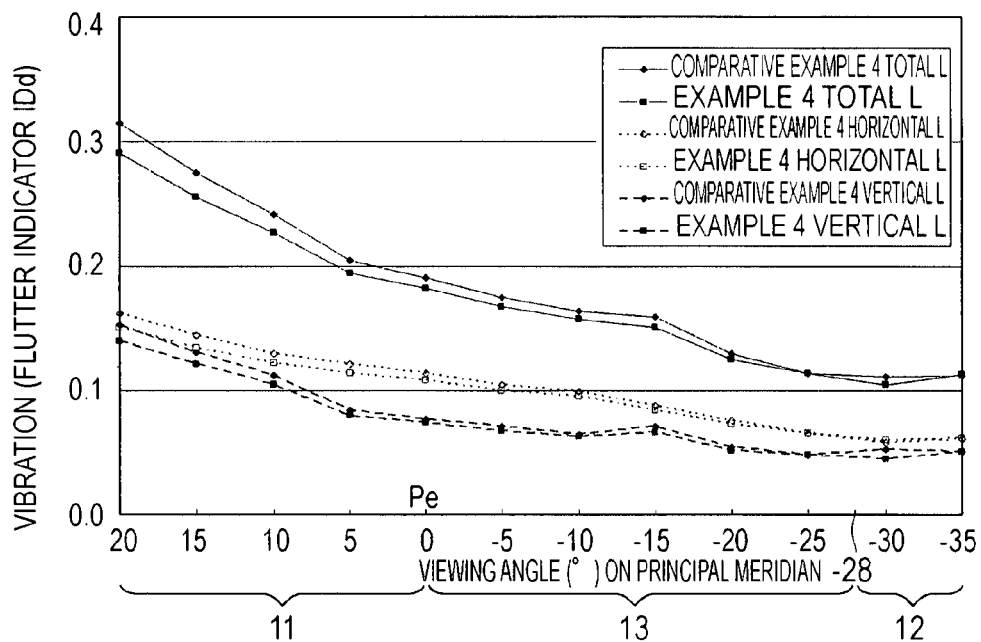
FIG. 49 is a diagram showing vibration (sway indicator IDd).
Figure 50:
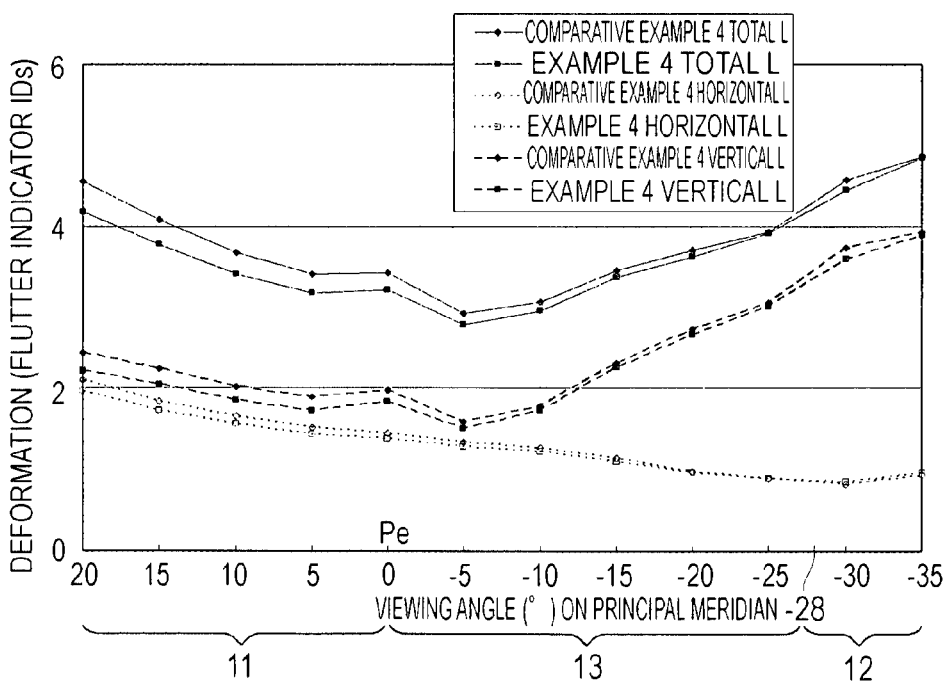
FIG. 50 is a diagram showing a deformation amount (sway indicator IDs).

FIG. 49 shows the indicator IDd relating to vibration obtained by the sway evaluation method. FIG. 50 shows the indicator IDs relating to a deformation amount obtained by the sway evaluation method. In FIG. 50, the indicator IDs relating to a deformation amount represents the deformation amount by the proportion (%). As in Embodiment 3, in regard to the indicator IDd relating to vibration, "horizontal L", "vertical L", and "total L" are represented, and in regard to the indicator IDs relating to a deformation amount, "horizontal L", "vertical L", and "total L" are represented.

It is understood that image sway obtained by the progressive power lenses 10g and 10h of Embodiment 4 is relatively smaller than image sway obtained by the progressive power lenses 10e and 10f of Embodiment 3. For this reason, the difference between the indicators IDd and IDs of the progressive power lens 10g and the indicators IDd and IDs of the progressive power lens 10h is small. However, it is understood that the indicators IDd and IDs of the progressive power lens 10g of Example 4 are equal to or smaller than the indicators IDd and IDs of the progressive power lens 10h of Comparative Example 4 over all the regions of the distance portion, the intermediate portion, and the near portion on the principal meridian 14, and sway is improved by the progressive power lens 10g of Example 4. In particular, sway is reduced in a wide range from the distance portion 11 to the intermediate portion 13.

6. Embodiment 5

6.1 Example 5

Figure 51A:
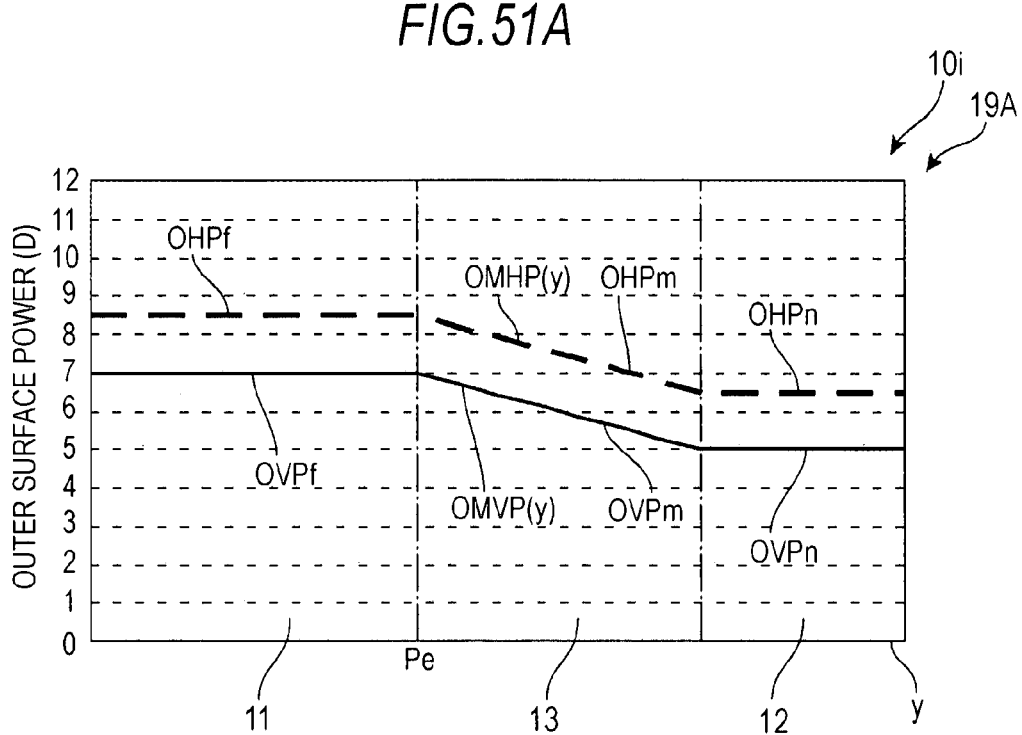
FIG. 51A is a diagram showing a surface power on a principal meridian on the outer surface of a progressive power lens of Example 5.
Figure 51B:
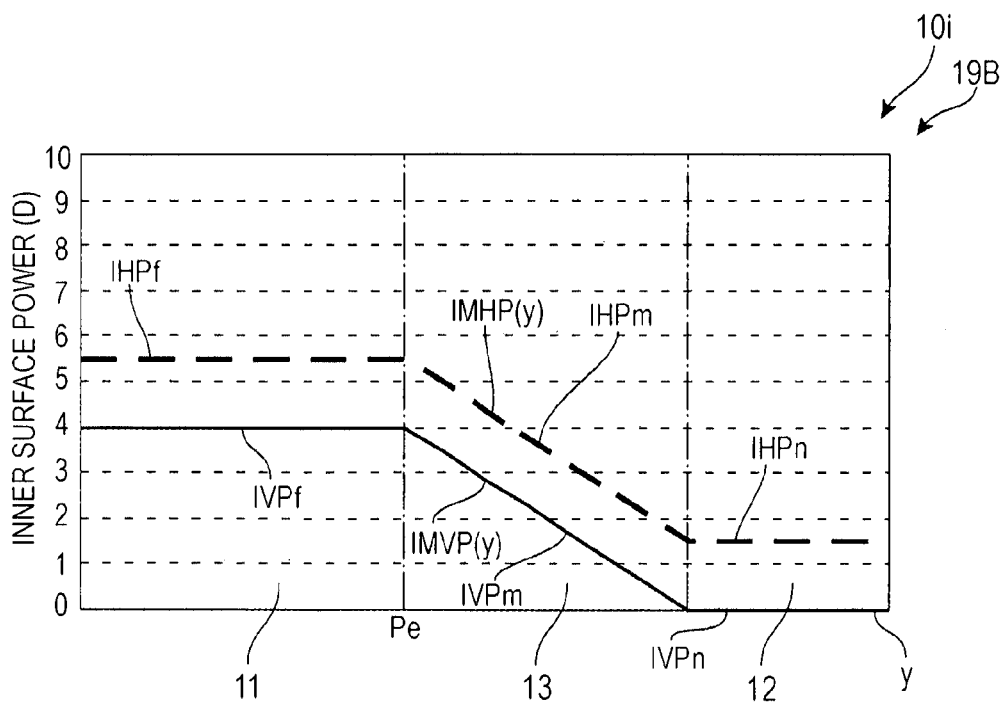
FIG. 51B is a diagram showing a surface power on a principal meridian on the inner surface of a progressive power lens of Example 5.

FIG. 51A shows a surface power OMHP(y) in a horizontal direction and a surface power OMVP(y) in a vertical direction along a principal meridian 14 on an outer surface (object-side surface) 19A of a progressive power lens 10i of Example 5 in terms of dioptre (D). FIG. 51B shows a surface power IMHP(y) in the horizontal direction and a surface power IMVP(y) in the vertical direction along a principal meridian 14 on an inner surface (eye-side surface) 19B of the progressive power lens 10i in terms of dioptre (D).

In the progressive power lens 10i of Example 5 and the progressive power lens 10j of Example 6, it is preferable to manipulate the surface power of the eye-side surface (inner surface) 19B according to the conditions (14a) and (15a) so as to cancel elements of a toric surface applied to the object-side surface (outer surface) 19A. However, in a thin lens having a sufficiently small thickness, it is possible to substantially cancel the elements of the toric surface according to the conditions (14) and (15). Accordingly, as in Examples 1 to 4, in Examples 5 and 6, the invention will be described as to a thin lens having a sufficiently small thickness.

The progressive power lens 10i of Example 5 was designed by applying the spectacle specification, including a progressive zone length of 14 mm, a prescription power (distance portion power, Sph) of 3.00 (D), and an addition power (Add) of 2.00 (D), to a progressive power lens "SEIKO P-1 SYNERGY 1.67 AS (refractive index 1.67) manufactured by SEIKO EPSON CORPORATION. The diameter of the lens 10i is 65 mm, and an astigmatic power is not included.

In the progressive power lens 10i of Example 5, the outer surface 19A is constituted by a progressive surface (regressive surface) which includes elements of a toric surface (toroidal surface) with the surface power OHP in the horizontal direction greater than the surface power OVP in the vertical direction. The inner surface 19B is constituted by an inner progressive surface which includes elements of a toric surface to cancel shifts in the surface power by the elements of the toric surface on the outer surface.

Specifically, on the outer surface 19A shown in FIG. 51A, the surface power OVPf in the vertical direction (longitudinal direction) of the distance portion 11 is constant and 7.0 (D), the surface power OVPm in the vertical direction of the intermediate portion 13 regressively decreases, and the surface power OVPn in the vertical direction of the near portion 12 is constant to 5.0 (D). Accordingly, the surface power OVPn in the vertical direction of the near portion 12 decreases from the surface power OVPf in the vertical direction of the distance portion 11 by 2.0 (D) (regression).

The surface power OHPf in the horizontal direction of the distance portion 11 on the outer surface 19A is constant and 8.5 (D), and is shifted in a direction to be greater than the surface power OVPf in the vertical direction by 1.5 (D). The surface power OHPn in the horizontal direction of the near portion 12 is constant and 6.5 (D), and is shifted in a direction to be greater than the surface power OVPn in the vertical direction by 1.5 (D), similarly to the distance portion 11. In the intermediate portion 13, similarly, the surface power OHPm in the horizontal direction is shifted by 1.5 (D) in a direction in which the surface power OHPm in the horizontal direction is greater than the surface power OVPm in the vertical direction. Accordingly, the regions of the distance portion 11, the near portion 12, and the intermediate portion 13 include elements of a toric surface having a major meridian in the horizontal direction of 1.5 (D) uniformly.

On the inner surface 19B shown in FIG. 51B, the surface power IVPf in the vertical direction (longitudinal direction) of the distance portion 11 is constant and 4.0 (D), the surface power IVPm in the vertical direction of the intermediate portion 13 progressively decreases, and the surface power IVPn in the vertical direction of the near portion 12 is constant to 0.0 (D). Accordingly, the surface power IVPn in the vertical direction of the near portion 12 decreases from the surface power IVPf in the vertical direction of the distance portion 11 by 4.0 (D). However, as described above, on the outer surface 19A, the surface power OVPn in the vertical direction of the near portion 12 decreases (regresses) from the surface power OVPf in the vertical direction of the distance portion 11 by 2.0 (D). For this reason, in the surface power in the vertical direction on the inner surface 19B, the addition power of 2.0 (D) is realized.

The surface power IHPf in the horizontal direction of the distance portion 11 on the inner surface 19B is constant and 5.5 (D), the surface power IVPm in the horizontal direction of the intermediate portion 13 progressively decreases, and the surface power IVPn in the horizontal direction of the near portion 12 is 1.5 (D). For this reason, in the surface power in the horizontal direction on the inner surface 19B, the addition power of 2.0 (D) is realized. Accordingly, the addition power of 2.0 (D) is realized in the horizontal direction and the vertical direction on the inner surface 19B.

In the regions of the distance portion 11, the near portion 12, and the intermediate portion 13, the surface power IHPf in the horizontal direction is shifted in a direction to be greater than the surface power IVPf in the vertical direction by 1.5 (D). For this reason, the inner surface 19B of the progressive power lens 10i includes elements of a toric surface which cancel shifts in the surface power by the elements of the toric surface on the outer surface 19A.

The progressive power lens 10i of Example 5 has all the conditions (11), (14) to (19), and (21) to (24), excluding the condition (19). That is, the surface power OHPf in the horizontal direction of the distance portion 11 in the region along the principal meridian 14 on the outer surface 19A is greater than the surface power OVPf in the vertical direction (condition (11)). The surface power OHPn in the horizontal direction of the near portion 12 in the region along the principal meridian 14 on the outer surface 19A is greater than the surface power OVPn in the vertical direction (condition (22)). The surface power OVPf in the vertical direction of the distance portion 11 is greater than the surface power OVPn in the vertical direction of the near portion 12 and becomes regressive (condition (23)). The surface power OHPm in the horizontal direction of the intermediate portion 13 in the region along the principal meridian 14 on the outer surface 19A is greater than the surface power OVPm in the vertical direction.

The difference between the surface power IVPf in the vertical direction of the distance portion 11 and the surface power IVPn in the vertical direction of the near portion 12 in the region along the principal meridian 14 on the inner surface 19B is greater than the difference between the surface power OVPf in the vertical direction of the distance portion 11 and the surface power OVPn in the vertical direction of the near portion 12 in the region along the principal meridian 14 on the outer surface 19A, and a addition power can be realized on the inner surface 19B relative to the regression on the outer surface 19A (condition (24)).

The distance portion 11 on the inner surface 19B includes the surface power IHPf in the horizontal direction and the surface power IVPf in the vertical direction which cancel shifts in the surface power OHPf in the horizontal direction and the surface power OVPf in the vertical direction on the outer surface 19A (condition (14)). The near portion 12 on the inner surface 19B also includes the surface power IHPn in the horizontal direction and the surface power IVPn in the vertical direction which cancel the surface power OHPn in the horizontal direction and the surface power OVPn in the vertical direction on the outer surface 19A (condition (15)). Similarly, the intermediate portion 13 on the inner surface 19B includes the surface power IHPm in the horizontal direction and the surface power IVPm in the vertical direction which cancel the surface power OHPm in the horizontal direction and the surface power OVPm in the vertical direction on the outer surface 19A.

The surface power IHPf in the horizontal direction of the distance portion 11 in the region along the principal meridian 14 on the inner surface 19B is greater than the surface power IVPf in the vertical direction (condition (16)). The surface power IHPn in the horizontal direction of the near portion 12 in the region along the principal meridian 14 on the inner surface 19B is greater than the surface power IVPn in the vertical direction (condition (17)). The surface power IHPf in the horizontal direction of the distance portion 11 is greater than the surface power IHPn in the horizontal direction of the near portion (condition (18)). The surface power IHPm in the horizontal direction of the intermediate portion 13 in the region along the principal meridian 14 on the inner surface 19B is greater than the surface power IVPm in the vertical direction.

In the progressive power lens 10i, the difference (shift) between the surface power OHPf in the horizontal direction and the surface power OVPf in the vertical direction of the distance portion 11 on the outer surface 19A and the difference (shift) between the surface power IHPf in the horizontal direction and the surface power IVPf in the vertical direction on the inner surface 19B have a constant value C1, and C1 is 1.5 (D) (conditions (21) and (21')). The difference (shift) between the surface power OHPn in the horizontal direction and the surface power OVPn in the vertical direction of the near portion 12 on the outer surface 19A and the difference between the surface power IHPn in the horizontal direction and the surface power IVPn in the vertical direction on the inner surface 19B have a constant value C2, and C2 is 1.5 (D) (conditions (21) and (21')).

6.2 Example 6

Figure 52A:
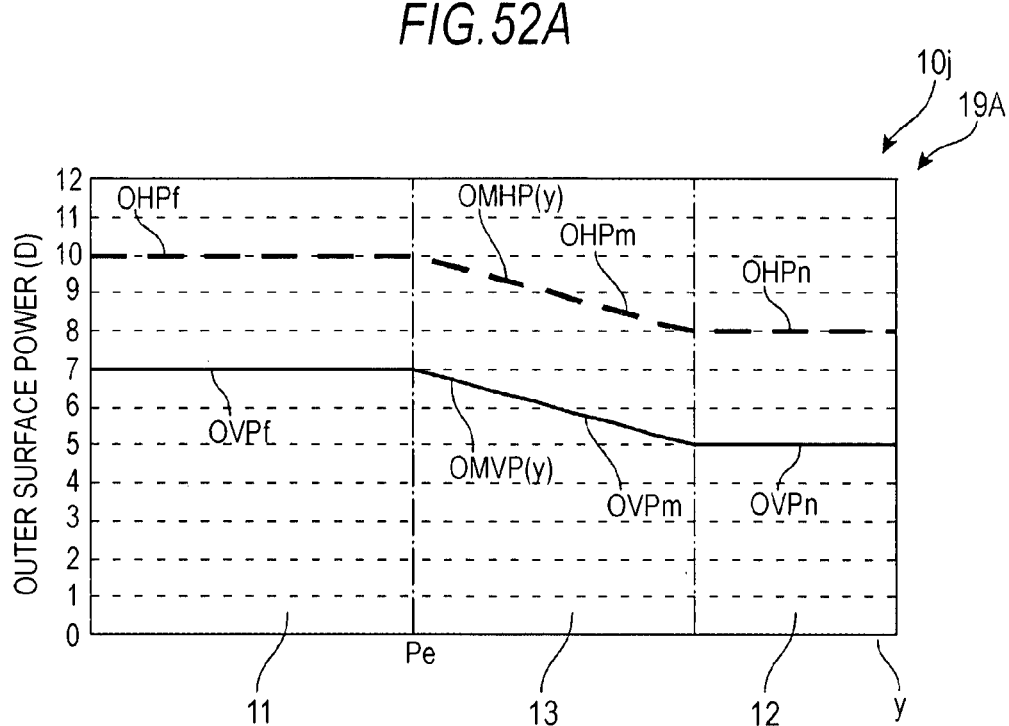
FIG. 52A is a diagram showing a surface power on a principal meridian on the outer surface of a progressive power lens of Example 6.
Figure 52B:
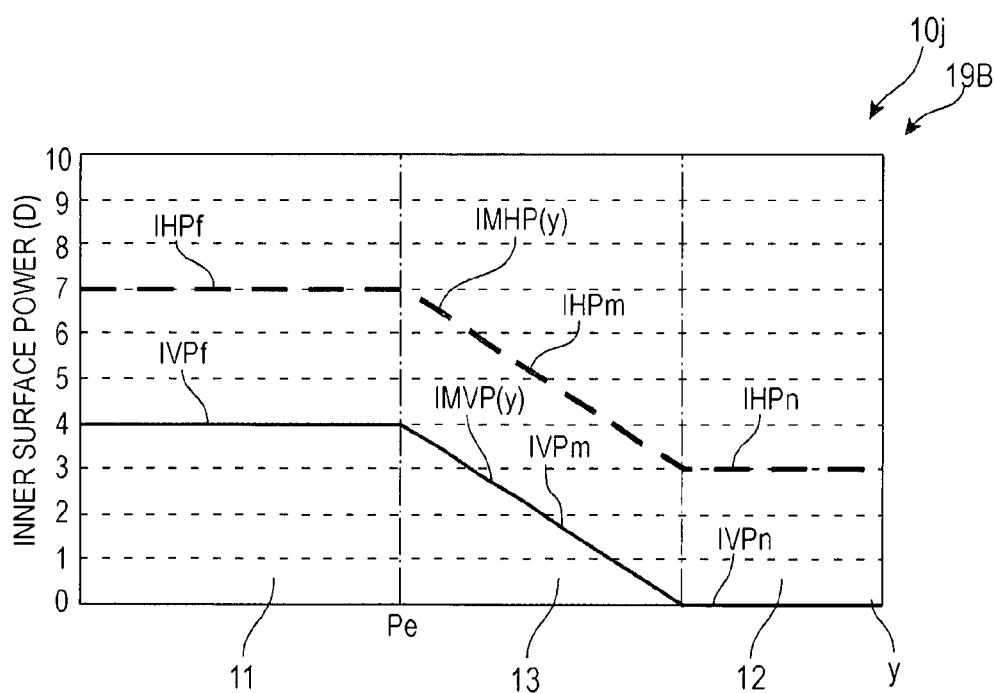
FIG. 52B is a diagram showing a surface power on a principal meridian on the inner surface of a progressive power lens of Example 6.

FIG. 52A shows a surface power OMHP(y) in a horizontal direction and a surface power OMVP(y) in a vertical direction along a principal meridian 14 on an outer surface (object-side surface) 19A of a progressive power lens 10j of Example 6 in terms of dioptre (D). FIG. 52B shows a surface power IMHP(y) in the horizontal direction and a surface power IMVP(y) in the vertical direction along a principal meridian 14 on an inner surface (eye-side surface) 19B of the progressive power lens 10j in terms of dioptre (D).

The progressive power lens 10j of Example 6 was designed by applying the same specification as Example 5 to a progressive power lens "SEIKO P-1 SYNERGY 1.67 AS (refractive index 1.67) manufactured by SEIKO EPSON CORPORATION.

In the progressive power lens 10j of Example 6, as in the progressive power lens 10i of Example 5, the outer surface 19A and the inner surface 19B include elements of a toric surface. Specifically, in the progressive power lens 10j of Example 6, the surface power OVPf in the vertical direction (longitudinal direction) of the distance portion 11 on the outer surface 19A is 7.0 (D), the surface power OVPm in the vertical direction of the intermediate portion 13 regressively decreases and reaches 5.0 (D) in the near portion 12, and the surface power OVPn in the vertical direction of the near portion 12 is 5.0 (D).

The surface power OHPf in the horizontal direction of the distance portion 11 on the outer surface 19A is constant and 10.0 (D), and is shifted in a direction to be greater than the surface power OVPf in the vertical direction by 3.0 (D). The surface power OHPn in the horizontal direction of the near portion 12 is also constant and 8.0 (D), and is shifted in a direction to be greater than the surface power OVPn in the vertical direction by 3.0 (D), like the distance portion 11. In the intermediate portion 13, similarly, the surface power OHPm in the horizontal direction is shifted by 3.0 (D) in a direction in which the surface power OHPm in the horizontal direction is greater than the surface power OVPm in the vertical direction. Accordingly, the regions of the distance portion 11, the near portion 12, and the intermediate portion 13 include elements of a toric surface having a major meridian in the horizontal direction of 3.0 (D) uniformly.

On the inner surface 19B, the surface power IVPf in the vertical direction of the distance portion 11 is 4.0 (D), the surface power OVPm in the vertical direction of the intermediate portion 13 progressively decreases and reaches 0.0 (D) in the near portion 12, and the surface power OVPn in the vertical direction of the near portion 12 is 0.0 (D). Accordingly, it is possible to cancel the regression of the surface power in the vertical direction on the outer surface 19A, thereby realizing a predetermined addition power (2.0 (D)). The surface power IHPf in the horizontal direction (lateral direction) of the distance portion 11 on the inner surface 19B is 7.0 (D), the surface power IHPm in the horizontal direction of the intermediate portion 13 progressively decreases, and the surface power IHPn in the horizontal direction of the near portion 12 is 3.0 (D), thereby realizing a predetermined addition power (2.0 (D)).

Accordingly, in all the regions of the distance portion 11, the near portion 12, the intermediate portion 13, the surface power IHPf in the horizontal direction is shifted in a direction to be greater than the surface power IVPf in the vertical direction by 3.0 (D). For this reason, in the progressive power lens 10j, the inner surface 19B includes elements of a toric surface which cancel shifts in the surface power by the elements of the toric surface on the outer surface 19A.

As in the progressive power lens 10i of Example 5, the progressive power lens 10j of Example 6 has all the conditions (11), (14) to (19), and (21) to (24), excluding the condition (19). The constant C1 is 3.0 (D), and the constant C2 is also 3.0 (D).

6.3 Comparative Example 5

For comparison with the progressive power lens 10i of Example 5 and the progressive power lens 10j of Example 6, as Comparative Example 5, an inner and outer progressive power lens 10k in which the outer surface 19A and the inner surface 19B were formed with a spherical surface as a base with the same spectacle specification as described above.

Figure 53A:
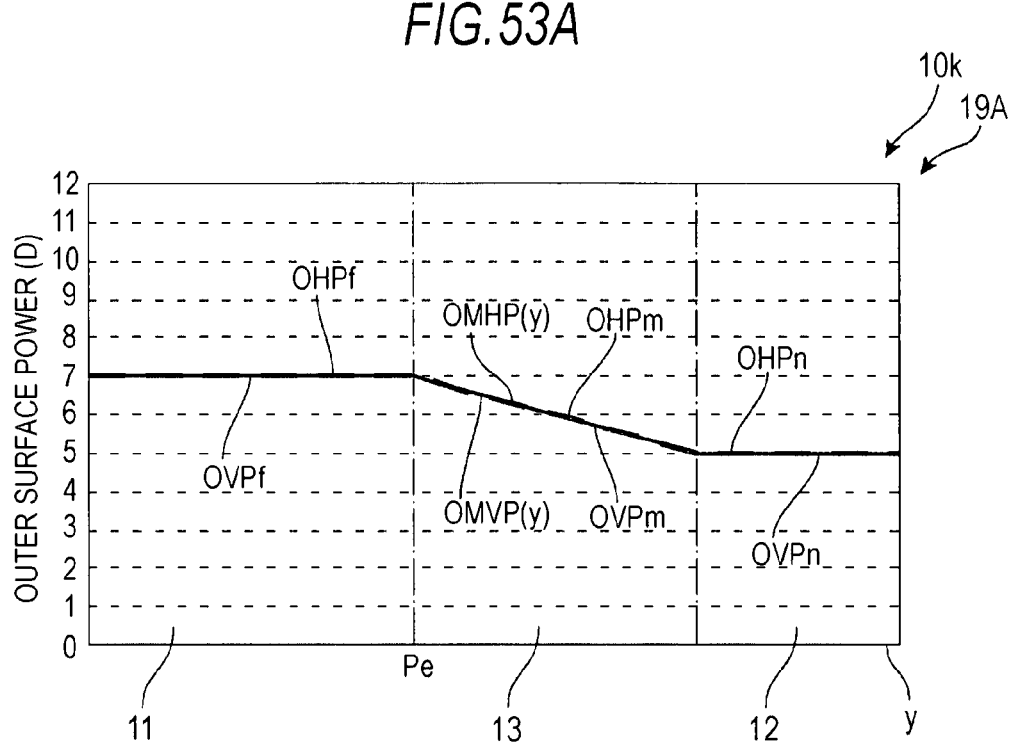
FIG. 53A is a diagram showing a surface power on a principal meridian on the outer surface of a progressive power lens of Comparative Example 5.
Figure 53B:
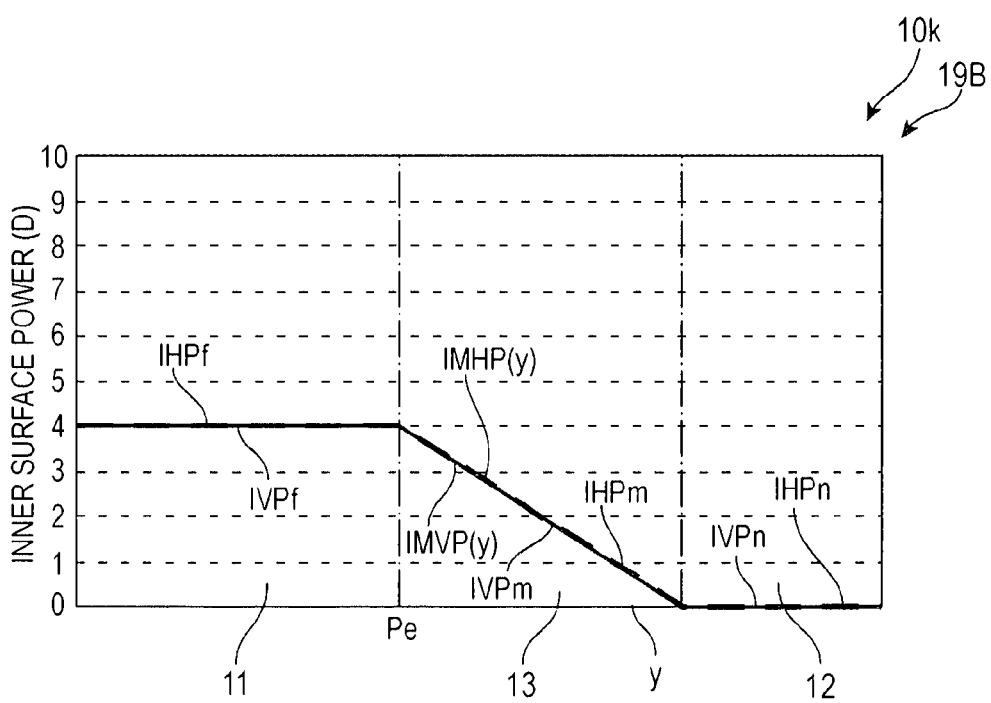
FIG. 53B is a diagram showing a surface power on a principal meridian on the inner surface of a progressive power lens of Comparative Example 5.

FIG. 53A shows a surface power OMHP(y) in a horizontal direction and a surface power OMVP(y) in a vertical direction along a principal meridian 14 on an outer surface (object-side surface) 19A of a progressive power lens 10k of Comparative Example 5 in terms of dioptre (D). FIG. 53B shows a surface power IMHP(y) in the horizontal direction and a surface power IMVP(y) in the vertical direction along a principal meridian 14 on an inner surface (eye-side surface) 19B of the progressive power lens 10k in terms of dioptre (D).

In the progressive power lens 10k of Comparative Example 5, the distance portion 11 on the outer surface 19A has a spherical surface in the vicinity of the principal meridian, and the surface power OHPf in the horizontal direction and the surface power OVPf in the vertical direction are identical and 7.0 (D). In the intermediate portion 13, the surface power OVPm in the vertical direction and the surface power OHPm in the horizontal direction regressively decrease and reach 5.0 (D) together in the near portion 12. The surface power OVPn in the vertical direction and the surface power OHPn in the horizontal direction of the near portion 12 are constant to 5.0 (D) together.

On the inner surface 19B, the distance portion 11 has a spherical surface in the vicinity of the principal meridian, and the surface power IHPf in the horizontal direction and the surface power IVPf in the vertical direction are identical and 4.0 (D). The surface power IHPm in the horizontal direction and the surface power IVPm in the vertical direction of the intermediate portion 13 progressively decrease and reach a predetermined addition power (2.0 (D)) in the near portion 12. The surface power IHPn in the horizontal direction and the surface power IVPn in the vertical direction of the near portion 12 are constant to 0.0 (D). Accordingly, it is possible to cancel the regression on the outer surface 19A, thereby realizing a predetermined addition power (2.0 (D)).

Variations in the surface power shown in FIGS. 51A and 51B, 52A and 52B, and 53A and 53B are simplified for understanding of the basic configuration. In actual design, aspheric correction which is intended to correct aberration in a lens peripheral vision is applied, and a few variations in the power in the vertical direction and the horizontal direction occur above the distance portion or in the near portion.

6.4 Comparison 5

The progressive power lens 10i of Example 5, the progressive power lens 10j of Example 6, and the progressive power lens 10k of Comparative Example 5 are progressive power lenses which can reduce the difference in magnification between images obtained through the distance portion 11 and the near portion 12, and can suppress image sway. That is, the magnification M of the spectacle lens is approximately expressed by Expression (29).

$$M = Ms \times Mp \quad (29)$$

Here, Ms is called a shape factor, and Mp is called a power factor. If the refractive index of a lens base material is n, a base curve (surface power) on the object-side surface of a lens is D (dioptre), the distance from the vertex (inner vertex) of the eye-side surface of the lens to an eyeball is L, the power of the inner vertex (inner vertex power) is P (power S), and the thickness of the lens center is t, Mp and Ms are expressed by Expressions (30) and (31).

$$Ms = 1/(1 - D \times t/n) \quad (30)$$

$$Mp = 1/(1 - L \times P) \quad (31)$$

In calculating of Expressions (30) and (31), dioptre (D) is used for the base curve D and the inner vertex power P, and meter (m) is used for the thickness t and the distance L.

Accordingly, Expression (29) is as follows.

$$M = \{1/(1 - D \times t/n)\} \times \{1/(1 - L \times P)\} \quad (32)$$

As will be understood from Expression (32), if the power P increases, the magnification M also increases, and the image magnification M increases in the near portion 12 to which the addition power is applied. If the base curve D, that is, the surface power on the outer surface 19A is reduced, the magnification M can be reduced. Therefore, it is possible to suppress variations in image magnification of the near portion 12 by reducing the surface power of the near portion 12 on the outer surface 19A.

In the progressive power lens 10i of Example 5 and the progressive power lens 10j of Example 6, the region along the principal meridian 14 on each of the outer surface 19A and the inner surface 19B includes elements of a toric surface, and shifts in the surface power by the elements of the toric surface on the outer surface 19A are cancelled by the elements of the toric surface on the inner surface 19B. For this reason, the same power as in the progressive power lens 10k of Comparative Example 5 is secured, and a variation in the angle at which the line of sight 2 passing through the progressive power lens 10i and the lens 10i intersect is reduced, thereby further suppressing image sway. Similarly, a variation in the angle at which the line of sight 2 passing through the progressive power lens 10j and the lens 10j intersect is reduced, thereby further suppressing image sway.

Figure 54A:
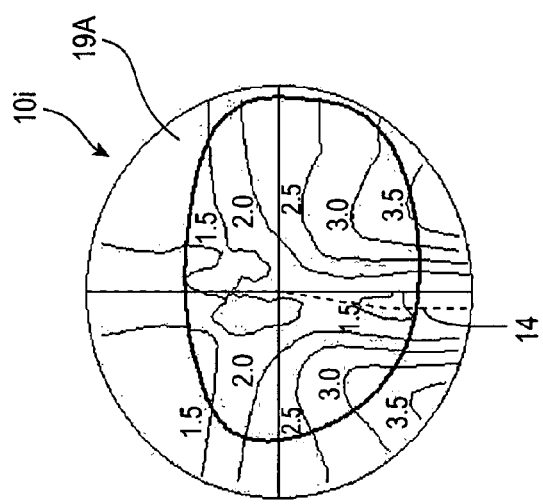
FIG. 54A is a diagram showing a surface astigmatism distribution on the outer surface of a progressive power lens of Example 5.
Figure 54B:
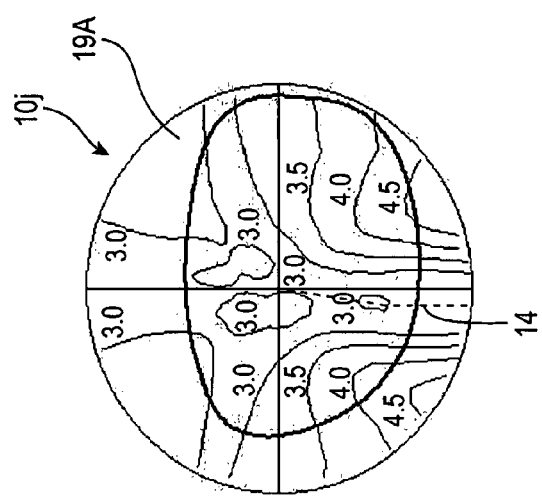
FIG. 54B is a diagram showing a surface astigmatism distribution on the outer surface of a progressive power lens of Example 6.
Figure 54C:
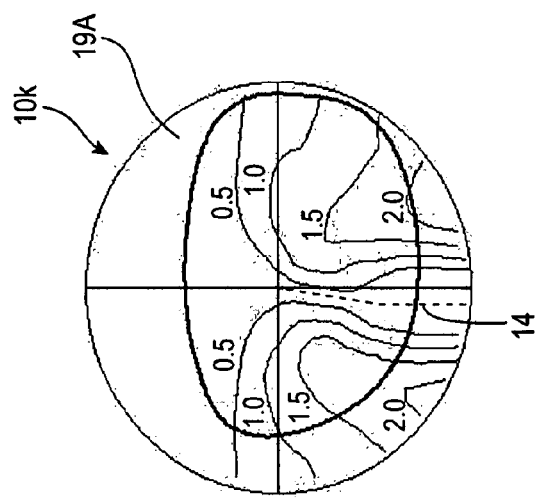
FIG. 54C is a diagram showing a surface astigmatism distribution on the outer surface of a progressive power lens of Comparative Example 5.

FIG. 54A shows a surface astigmatism distribution on the outer surface 19A of the progressive power lens 10i of Example 5, FIG. 54B shows a surface astigmatism distribution on the outer surface 19A of the progressive power lens 10j of Example 6, and FIG. 54C shows a surface astigmatism distribution on the outer surface 19A of the progressive power lens 10k of Comparative Example 5.

As shown in these drawings, in regard to the surface astigmatism on the outer surface 19A of the progressive power lens 10i of Example 5, astigmatism (1.5 (D)) having a major meridian in the horizontal direction is combined with the surface astigmatism on the outer surface 19A of the progressive power lens 10k of Comparative Example 5. In regard to the surface astigmatism on the outer surface 19A of the progressive power lens 10j of Example 6, astigmatism (3.0 (D)) having a major meridian in the horizontal direction is combined with the surface astigmatism on the outer surface 19A of the progressive power lens 10k of Comparative Example 5. However, a combination is not simple because aspheric correction is applied so as to adjust aberration. The same is also applied to the following description.

Figure 55C:
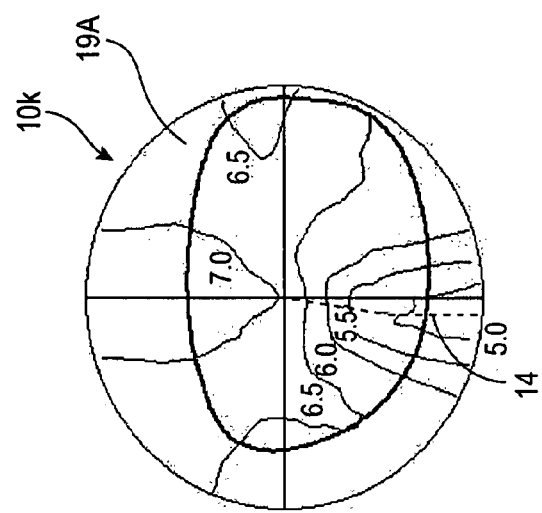
FIG. 55C is a diagram showing an equivalent spherical surface power distribution on the outer surface of a progressive power lens of Comparative Example 5.
Figure 55B:
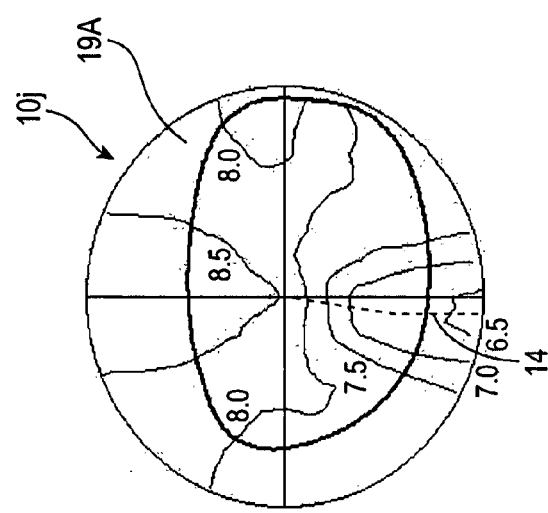
FIG. 55B is a diagram showing an equivalent spherical surface power distribution on the outer surface of a progressive power lens of Example 6.
Figure 55A:
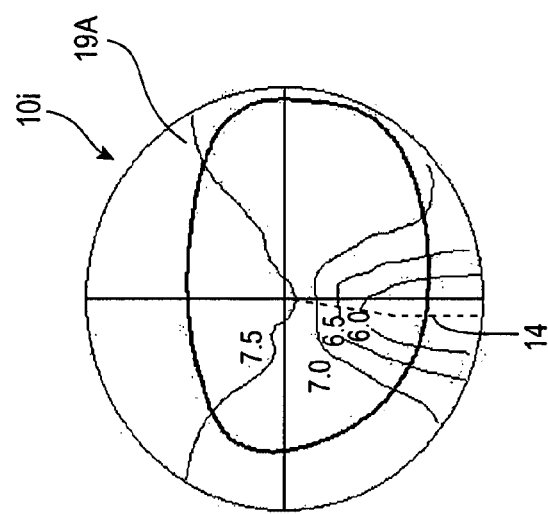
FIG. 55A is a diagram showing an equivalent spherical surface power distribution on the outer surface of a progressive power lens of Example 5.

FIG. 55A shows an equivalent spherical surface power distribution on the outer surface 19A of the progressive power lens 10i of Example 5, FIG. 55B shows an equivalent spherical surface power distribution on the outer surface 19A of the progressive power lens 10j of Example 6, and FIG. 55C shows an equivalent spherical surface power distribution on the outer surface 19A of the progressive power lens 10k of Comparative Example 5. An equivalent spherical surface power ESP is obtained by Expression (28).

As shown in these drawings, in regard to the equivalent spherical surface power distribution on the outer surface 19A of the progressive power lens 10i of Example 5, the equivalent spherical surface power of nearly 0.75 (D) is fully combined with the equivalent spherical surface power on the outer surface 19A of the progressive power lens 10k Comparative Example 5. In regard to the equivalent spherical surface power distribution on the outer surface 19A of the progressive power lens 10j of Example 6, the equivalent spherical surface power of nearly 1.5 (D) is fully combined with the equivalent spherical surface power on the outer surface 19A of the progressive power lens 10k of Comparative Example 5.

Figure 56A:
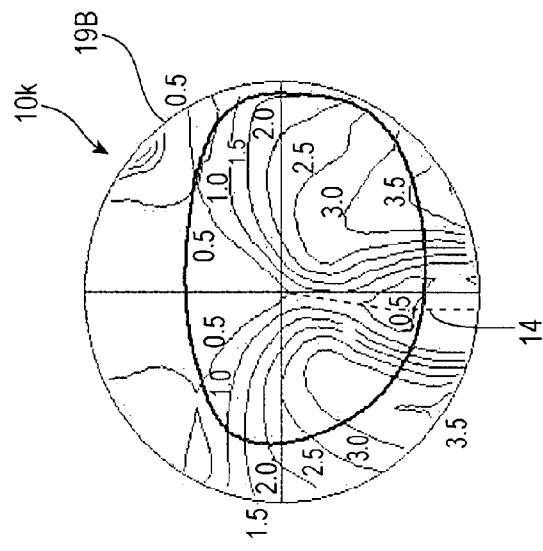
FIG. 56A is a diagram showing a surface astigmatism distribution on the inner surface of a progressive power lens of Example 5.
Figure 56B:
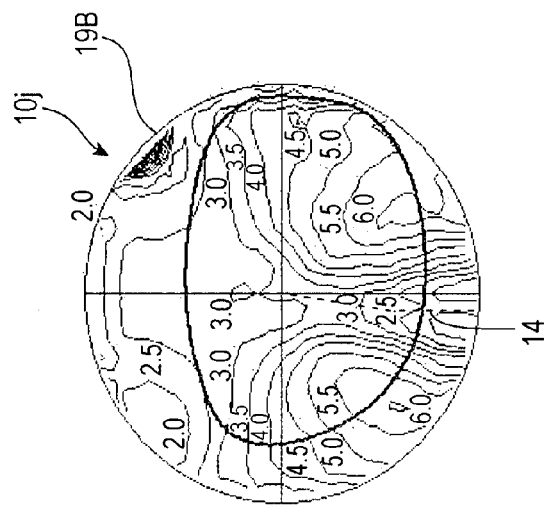
FIG. 56B is a diagram showing a surface astigmatism distribution on the inner surface of a progressive power lens of Example 6.
Figure 56C:
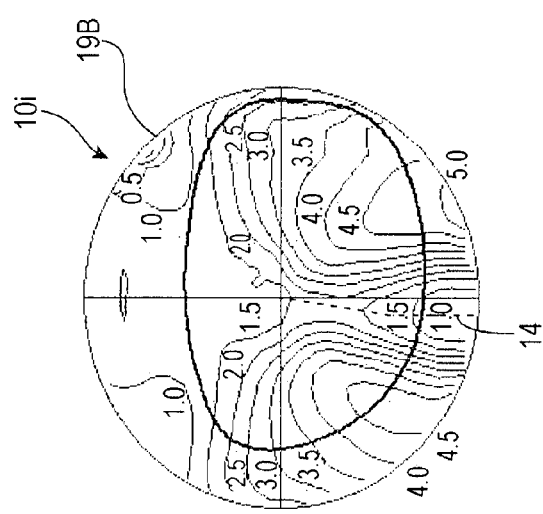
FIG. 56C is a diagram showing a surface astigmatism distribution on the inner surface of a progressive power lens of Comparative Example 5.

FIG. 56A shows a surface astigmatism distribution on the inner surface 19B of the progressive power lens 10i of Example 5, FIG. 56B shows a surface astigmatism distribution on the inner surface 19B of the progressive power lens 10j of Example 6, and FIG. 56C shows a surface astigmatism distribution on the inner surface 19B of the progressive power lens 10k of Comparative Example 5.

As shown in these drawings, in regard to the surface astigmatism on the inner surface 19B of the progressive power lens 10i of Example 5, astigmatism (1.5 (D)) having a major meridian in the horizontal direction is combined with the surface astigmatism on the inner surface 19B of the progressive power lens 10k of Comparative Example 5. In regard to the surface astigmatism on the inner surface 19B of the progressive power lens 10j of Example 6, astigmatism (3.0 (D)) having a major meridian in the horizontal direction is combined with the surface astigmatism on the inner surface 19B of the progressive power lens 10k of Comparative Example 5.

Figure 57A:
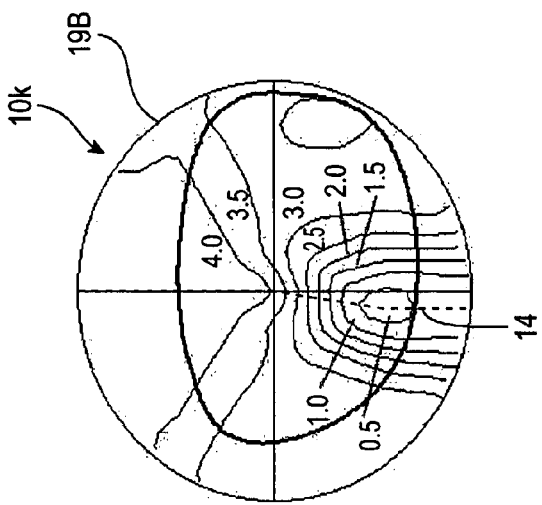
FIG. 57A is a diagram showing an equivalent spherical surface power distribution on the inner surface of a progressive power lens of Example 5.
Figure 57B:
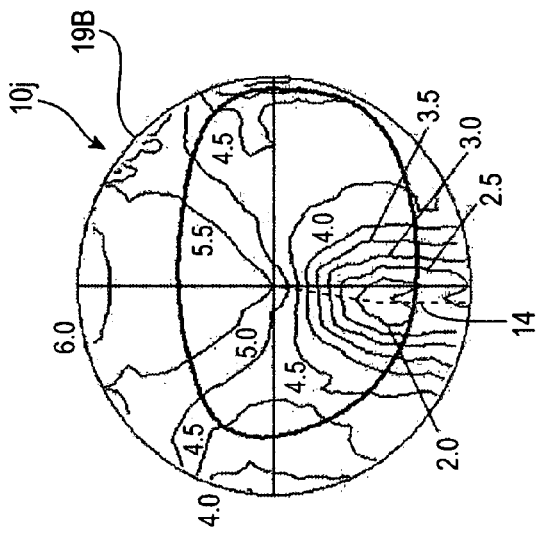
FIG. 57B is a diagram showing an equivalent spherical surface power distribution on the inner surface of a progressive power lens of Example 6.
Figure 57C:
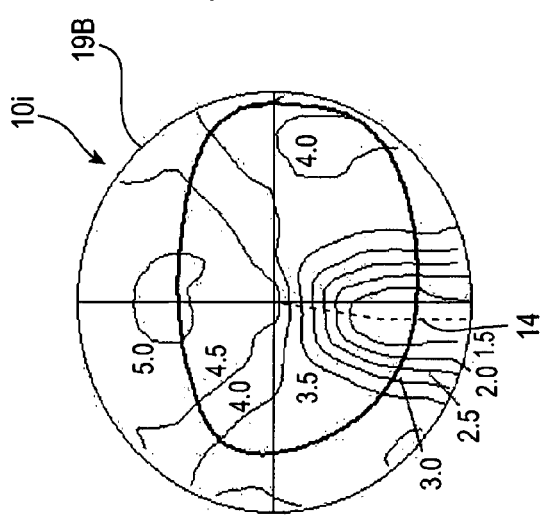
FIG. 57C is a diagram showing an equivalent spherical surface power distribution on the inner surface of a progressive power lens of Comparative Example 5.

FIG. 57A shows an equivalent spherical surface power distribution on the inner surface 19B of the progressive power lens 10i of Example 5, FIG. 57B shows an equivalent spherical surface power distribution on the inner surface 19B of the progressive power lens 10j of Example 6, and FIG. 57C shows an equivalent spherical surface power distribution on the inner surface 19B of the progressive power lens 10k of Comparative Example 5.

As shown in these drawings, in regard to the equivalent spherical surface power distribution on the inner surface 19B of the progressive power lens 10i of Example 5, the equivalent spherical surface power of nearly 0.75 (D) is fully combined with the equivalent spherical surface power on the inner surface 19B of the progressive power lens 10k of Comparative Example 5. In regard to the equivalent spherical surface power distribution on the inner surface 19B of the progressive power lens 10j of Example 6, the equivalent spherical surface power of nearly 1.5 (D) is fully combined with the equivalent spherical surface power on the inner surface 19B of the progressive power lens 10k of Comparative Example 5.

Figure 58A:
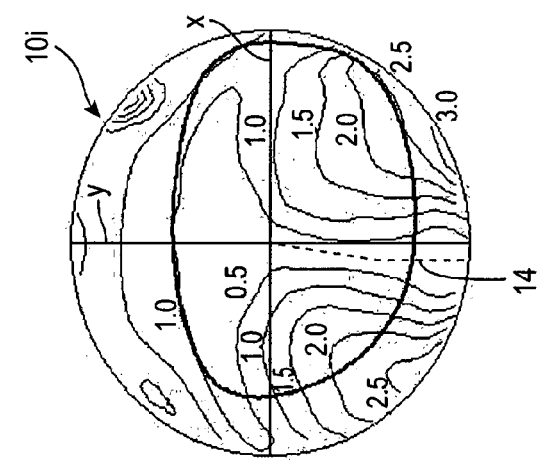
FIG. 58A is an astigmatism distribution of a progressive power lens of Example 5.
Figure 58B:
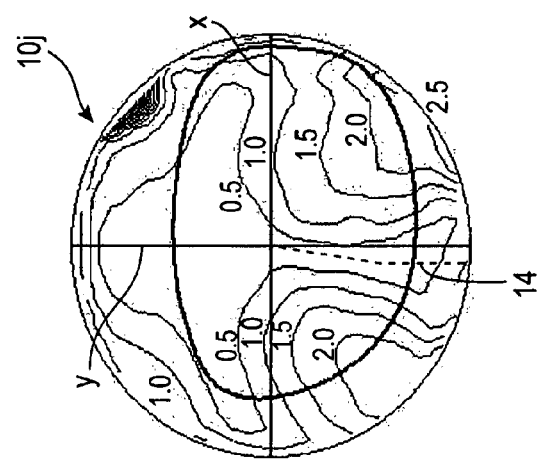
FIG. 58B is an astigmatism distribution of a progressive power lens of Example 6.
Figure 58C:
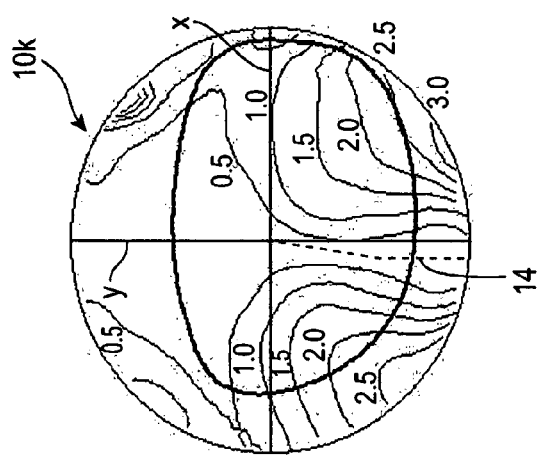
FIG. 58C is an astigmatism distribution of a progressive power lens of Comparative Example 5.

FIG. 58A shows an astigmatism distribution when observation is done through each position on the lens in the progressive power lens 10i of Example 5, FIG. 58B shows an astigmatism distribution when observation is done through each position on the lens in the progressive power lens 10j of Example 6, and FIG. 58C shows an astigmatism distribution when observation is done through each position on the lens in the progressive power lens 10k of Comparative Example 5. As shown in these drawings, the astigmatism distribution of the progressive power lens 10i of Example 5 and the astigmatism distribution of the progressive power lens 10j of Example 6 are substantially the same as the astigmatism distribution of the progressive power lens 10k of Comparative Example 5.

Figure 59C:
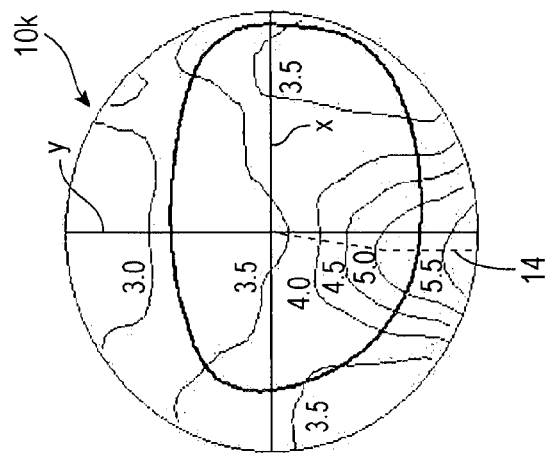
FIG. 59C is an equivalent spherical power distribution of a progressive power lens of Comparative Example 5.
Figure 59B:
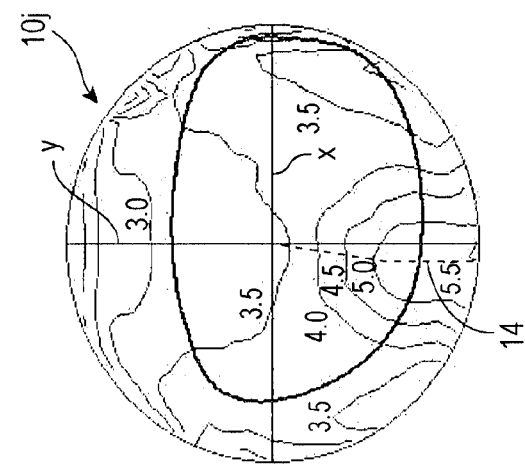
FIG. 59B is an equivalent spherical power distribution of a progressive power lens of Example 6.
Figure 59A:
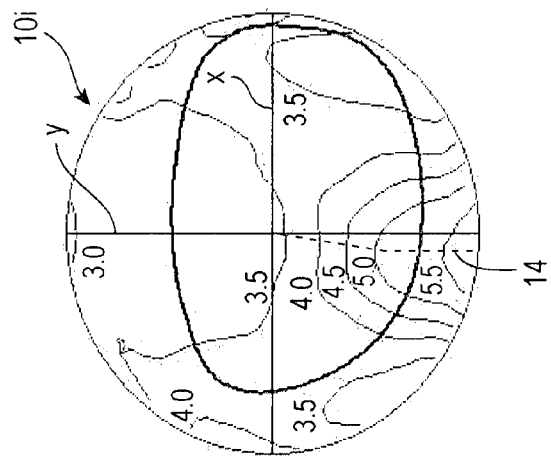
FIG. 59A is an equivalent spherical power distribution of a progressive power lens of Example 5.

FIG. 59A shows an equivalent spherical power distribution when observation is done through each position on the lens in the progressive power lens 10i of Example 5, FIG. 59B shows an equivalent spherical power distribution when observation is done through each position on the lens in the progressive power lens 10j of Example 6, and FIG. 59C shows an equivalent spherical power distribution when observation is done through each position on the lens in the progressive power lens 10k of Comparative Example 5. As shown in these drawings, the equivalent spherical power distribution of the progressive power lens 10i of Example 5 and the equivalent spherical power distribution of the progressive power lens 10j of Example 6 are substantially the same as the equivalent spherical power distribution of the progressive power lens 10k of Comparative Example 5.

Accordingly, it is understood that, with the effective use of aspheric correction, a progressive power lens which has much the same performance as the progressive power lens 10k of Comparative Example 5 from the viewpoint of the astigmatism distribution and the equivalent spherical power distribution is obtained as the progressive power lens 10i of Example 5 or the progressive power lens 10j of Example 6.

Figure 60:
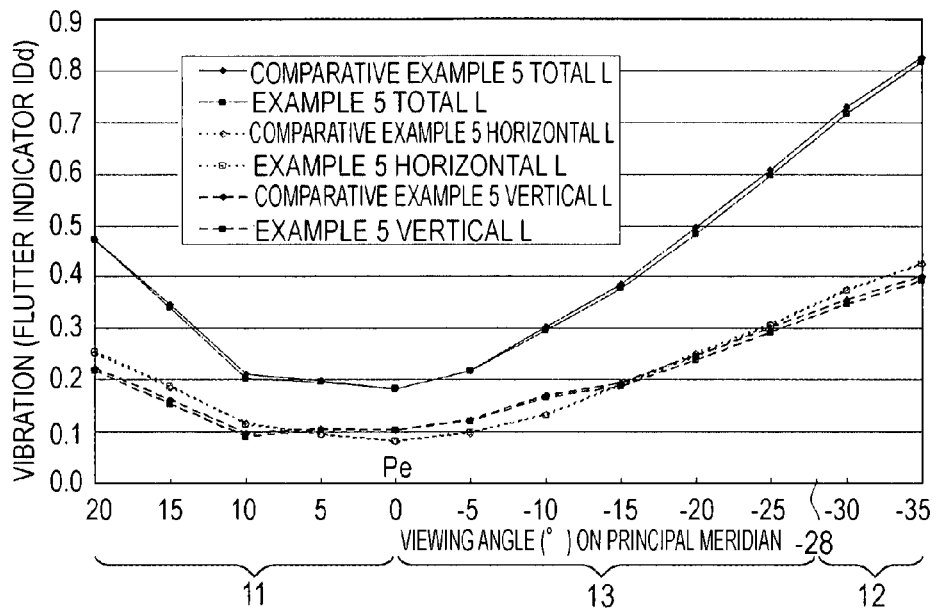
FIG. 60 is a diagram showing vibration (sway indicator IDd) of a progressive power lens of Example 5.
Figure 61:
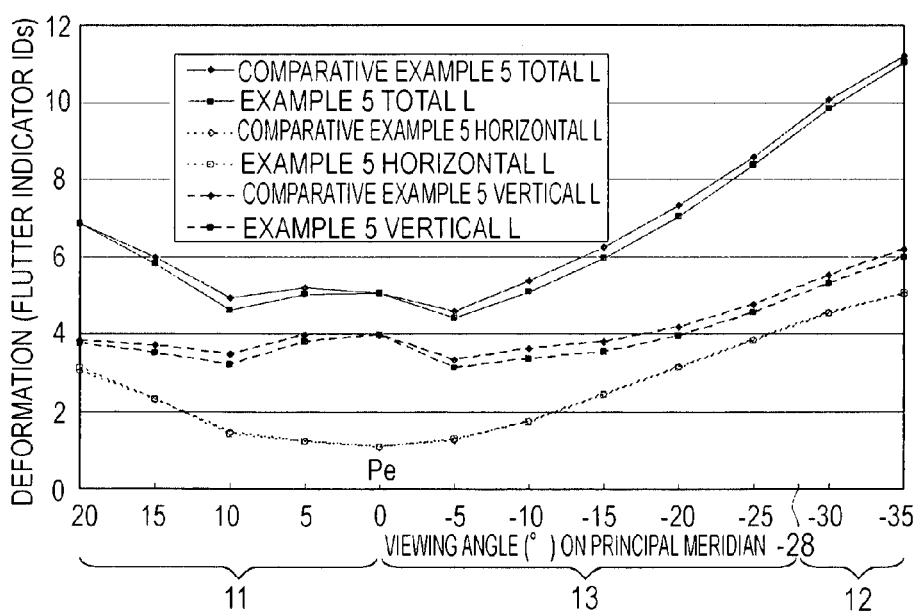
FIG. 61 is a diagram showing a deformation amount (sway indicator IDs) of a progressive power lens of Example 5.

FIG. 60 shows the indicator IDd relating to vibration of the progressive power lens 10i of Example 5 with respect to the progressive power lens 10k of Comparative Example 5 by the sway evaluation method. FIG. 61 shows the indicator IDs relating to a deformation amount obtained by the sway evaluation method.

As shown in FIGS. 60 and 61, the indicator IDd relating to vibration and the indicator IDs relating to a deformation amount in the progressive power lens 10i of Example 5 are smaller than those in the progressive power lens 10k of Comparative Example 5. The image sway improvement effect appears over all the regions of the distance portion, the intermediate portion, and the near portion on the principal meridian 14.

Figure 62:
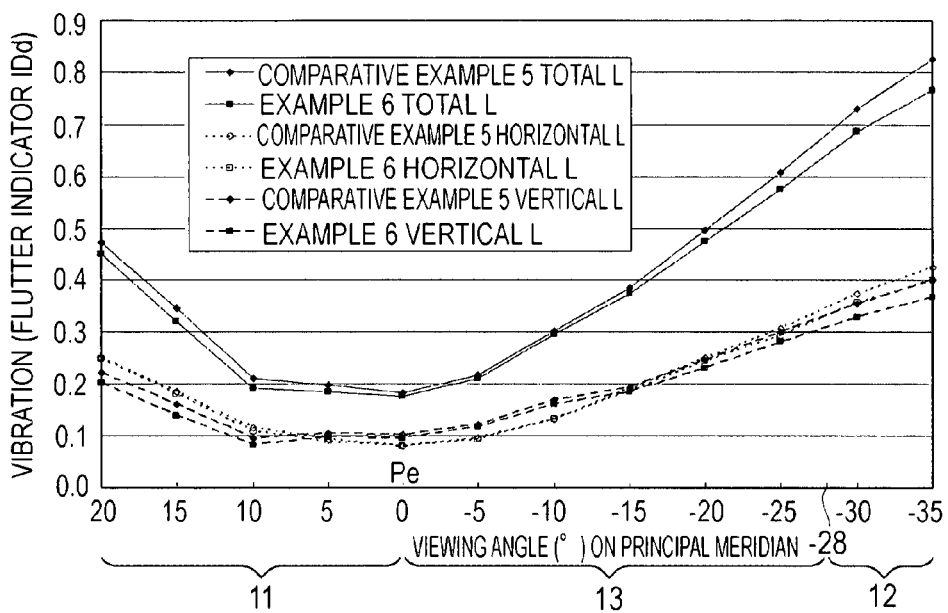
FIG. 62 is a diagram showing vibration (sway indicator IDd) of a progressive power lens of Example 6.
Figure 63:
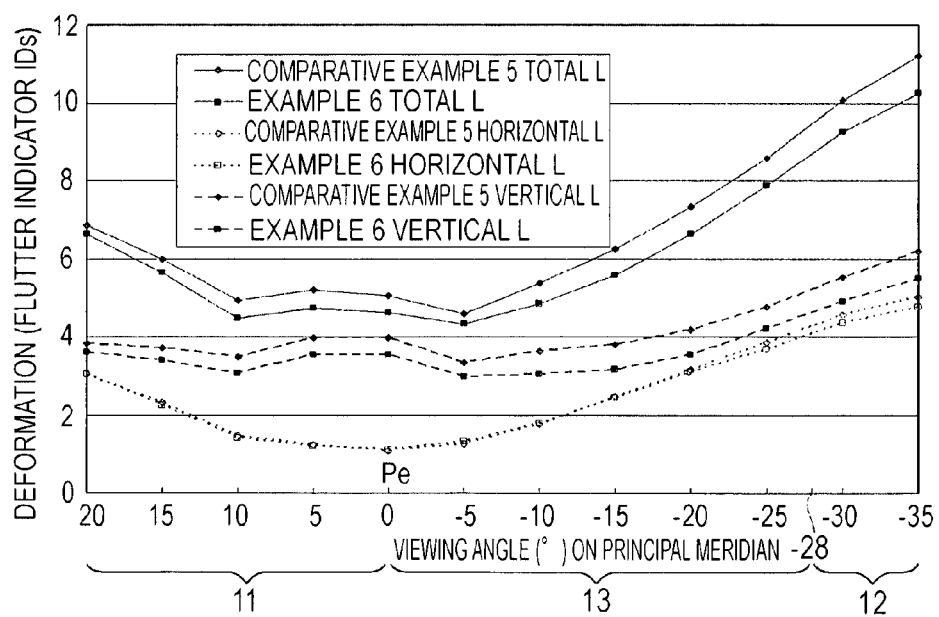
FIG. 63 is a diagram showing a deformation amount (sway indicator IDs) of a progressive power lens of Example 6.

FIG. 62 shows the indicator IDd relating to vibration of the progressive power lens 10j of Example 6 with respect to the progressive power lens 10k of Comparative Example 5 by the sway evaluation method. FIG. 63 shows the indicator IDs relating to a deformation amount obtained by the sway evaluation method.

As in the progressive power lens 10i of Example 5, the indicator IDd relating to vibration and the indicator IDs relating to a deformation amount in the progressive power lens 10j of Example 6 are smaller than those in the progressive power lens 10k of Comparative Example 5. The image sway improvement effect appears over all the regions of the distance portion, the intermediate portion, and the near portion on the principal meridian 14, and is larger than the progressive power lens 10i of the Example 5. In the progressive power lens 10j of Example 6, a shift in the surface power by, the elements of the toric surface provided on the outer surface 19A and the inner surface 19B is 3.0 (D) in the distance portion 11 and 5.0 (D) in the near portion 12, substantially two times larger than the shift amount in the progressive power lens 10i of Example 5. Accordingly, it is estimated that, the larger the shift amount of the surface power by the elements of the toric surface, the larger the image sway improvement effect.

As described above, in the progressive power lens 10i of Example 5 and the progressive power lens 10j of Example 6 in which the elements of the toric surface are introduced to the outer surface 19A and the inner surface 19B, the aberration distribution and the power distribution which are the general performance as a spectacle lens are the same as those in the progressive power lens 10k of Comparative Example 5 which has a spherical surface not including elements of a toric surface as a base (as a spectacle lens which is not intended for astigmatism correction). In the progressive power lens 10i of Example 5 and the progressive power lens 10j of Example 6, it is understood that it is possible to reduce image sway when the line of sight 2 (eyeball 3) moves by vestibulo-ocular reflex, compared to the progressive power lens 10k of Comparative Example 5. One reason for this is thought to be that the elements of the toric surface are introduced to the inner and outer surfaces, in particular, the elements of the toric surface are introduced to the regions along the principal meridian 14 on the inner and outer surfaces, thereby suppressing variations in the angle at which the line of sight 2 enters or is emitted from the spectacle lens 10i and the spectacle lens 10j when the line of sight 2 moves by vestibulo-ocular reflex and suppress variations in all aberrations when the line of sight 2 moves by vestibulo-ocular reflex.

Accordingly, the progressive power lens 10*i* of Example 5 and the progressive power lens 10*j* of Example 6 are spectacle lenses which are suitable for a user who is compatible with image sway with difficulty, or an application. In regard to the visual characteristics of a person when the progressive power lens 10 is used, the use frequency on the principal meridian 14 is very high, and image sway is found when a visual operation is carried out using near the principal meridian 14. Therefore, if a shift in the intensity direction of the surface power OHP in the horizontal direction on the outer surface 19A is within at least 10 mm in the horizontal direction with the principal meridian 14 as a center, it is possible to sufficiently obtain the image sway reduction effect.

Although in Embodiments 1 and 2, the invention has been described as to the spectacle lens 10 in which the surface power OHP in the horizontal direction and the surface power OVP in the vertical direction on the outer surface 19A are constant, not only the surface power OHP in the horizontal direction and the surface power OVP in the vertical direction but also the surface power OMHP in the horizontal direction and the surface power OMVP in the vertical direction along the principal meridian 14 or the vertical reference line may change in the vertical direction (y direction) and/or the horizontal direction (x direction). If the surface power OHP(x,y) in the horizontal direction at any coordinates on the outer surface 19A is greater than the surface power OVP(x,y) in the vertical direction, and the inner surface 19B includes elements of a toric surface which cancel shifts in the surface power on the outer surface 19A, as described above, it is possible to suppress a variation in the angle when the line of sight 2 transmits the spectacle lens 10 relative to the movement of the line of sight 2, thereby suppressing variations in all aberrations and easily improving sway.

In particular, even when the surface power OMHP(y) in the horizontal direction and the surface power OMVP(y) in the vertical direction along the principal meridian 14 or the vertical reference line change, if the surface power OMHP(y) in the horizontal direction at any coordinates is greater than the surface power OMVP(y) in the vertical direction, and the inner surface 19B includes elements of a toric surface which cancel shifts in the surface power on the outer surface 19A, the effect capable of suppressing image sway is large.

Although in Embodiments 1 and 2, an inner progressive type progressive power lens has been described, an outer progressive type progressive power lens may be used, or a progressive power lens which includes elements of a progressive surface (intermediate portion) on the inner and outer surfaces may be used.

Although in Embodiments 3 and 4, the progressive power lens 10 in which the surface power in the horizontal direction on the outer surface 19A is constant has been described, the whole or a part of a addition power may be attained by the surface power in the horizontal direction on the outer surface 19A. Although the progressive power lens 10 in which the surface power in the vertical direction on the inner surface 19B is constant has been described, the addition power of the surface power in the vertical direction may be distributed on the inner and outer surfaces. In all cases, it is preferable to select the surface power in the horizontal direction and the surface power in the vertical direction on the inner surface 19B so as to cancel shifts in the surface power due to the difference between the surface power in the horizontal direction and the surface power in the vertical direction on the outer surface 19A.

Although in Embodiment 5, the progressive power lens 10 in which the outer surface 19A is an inverted progressive surface of a progressive surface on the outer surface of a general outer progressive lens has been described, the surface power in the horizontal direction on the outer surface 19A may be constant. In all cases, it is preferable to select the surface power in the horizontal direction and the surface power in the vertical direction on the inner surface 19B so as to cancel shifts in the surface power due to the difference between the surface power in the horizontal direction and the surface power in the vertical direction on the outer surface 19A.

Figure 64:
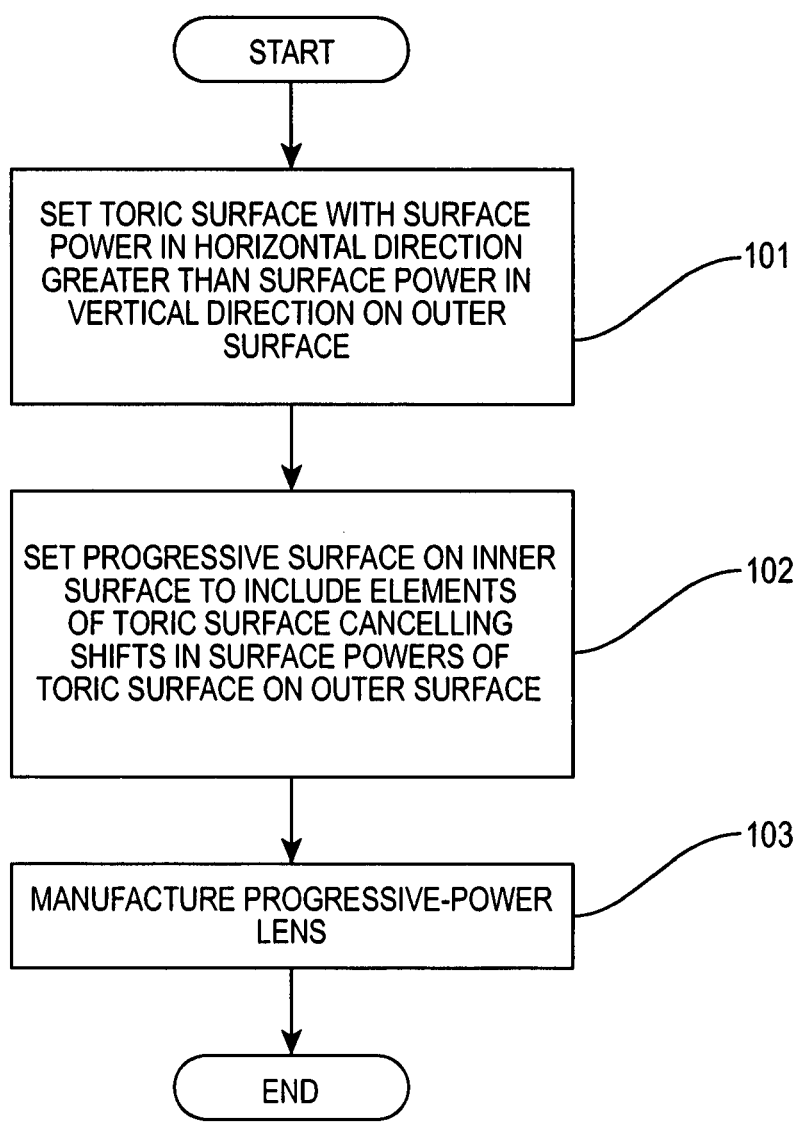
FIG. 64 is a flowchart showing design and a manufacturing process of a progressive power lens.

FIG. 64 shows the outline of design and a manufacturing process of a progressive power lens for spectacles of Example 1 or 2. In Step 101, on the outer surface 19A, a toric surface with the surface power OHP in the horizontal direction greater than the surface power OVP in the vertical direction is set. Next, in Step 102, on the inner surface 19B, a progressive surface which includes elements of a toric surface to cancel shifts in the surface power of the toric surface on the outer surface 19A, that is, with the surface power IHP in the horizontal direction greater than the surface power IVP in the vertical direction and satisfies a spectacle specification is set. In Step 103, the progressive power lens 10 for spectacles designed in the above-described steps is manufactured.

In the progressive power lens 10 for spectacles, the outer surface 19A is a toric surface with the surface power OHP in the horizontal direction greater than the surface power OVP in the vertical direction, and the inner surface 19B also includes elements of a toric surface the same as the outer surface 19A. Accordingly, the progressive power lens 10 is a lens which is configured such that the entire lens is curved in a toroidal shape along the user's face, and the horizontal direction on the outer surface of the lens is deeper than in the related art. For this reason, the progressive power lens 10 is suitable for designing spectacles, called a wraparound type, which is recently attracting attention and in which the lens wraps around the temple in accordance with the curve of the face.

Although in the above description, a case where there is no prescription for astigmatism in a prescription for a distance portion has been described, when there is a prescription for astigmatism, a component of a toric surface (toroidal surface) for astigmatism correction is combined on the inner surface, whereby a prescription for astigmatism can be included. When the thickness of the lens is large, correction is applied on the inner surface taking into consideration a shape factor, thereby providing a spectacle lens with higher precision.

The invention claimed is:
1. A progressive power lens for spectacles that has a distance portion and a near portion of different powers,
wherein a surface power OMHP(y) in a horizontal direction on an object-side surface along a principal meridian or a vertical reference line passing through a fitting point, a surface power OMVP(y) in a vertical direction on the object-side surface, the absolute value IMHP(y) of a surface power in a horizontal direction on an eye-side surface, and the absolute value IMVP(y) of a surface power in a vertical direction on the eye-side surface satisfy the following conditions:

$$OMHP(y) > OMVP(y)$$

$$IMHP(y) > IMVP(y)$$

$$OMHP(y) - OMVP(y) = IMHP(y) - IMVP(y)$$

where a prescription for astigmatism is not included, and y is a coordinate along the principal meridian or the vertical reference line.

2. The progressive power lens according to claim 1, wherein the following condition is further satisfied:

$$OMHP(y)-OMVP(y)=IMHP(y)-IMVP(y)=C0$$

where, C0 is a constant.

3. The progressive power lens according to claim 2, wherein the eye-side surface is a progressive surface.

4. The progressive power lens according to claim 2, wherein a surface power OHP(y) in the horizontal direction on the object-side surface within a range of ±10 mm with the principal meridian or the vertical reference line interposed, a surface power OVP(y) in the vertical direction on the object-side surface, the absolute value IHP(y) of a surface power in the horizontal direction on the eye-side surface, and the absolute value IVP(y) of a surface power in the vertical direction on the eye-side surface satisfy the following conditions:

$$OHP(x, y) > OVP(x, y)$$

$$IHP(x, y) > IVP(x, y)$$

$$OHP(x, y)-OVP(x, y)=IHP(x, y)-IVP(x, y)=C0$$

where, x is the coordinate of a horizontal reference line passing through the fitting point.

5. The progressive power lens according to claim 4, wherein the following conditions are further satisfied within a range of ±10 mm with the principal meridian or the vertical reference line interposed:

$$OHP(x,y)=C1$$

$$OVP(x,y)=C2$$

where, C1 and C2 are constants.

6. A progressive power lens for spectacles that has a distance portion and a near portion of different powers,
wherein an object-side surface or an eye-side surface includes elements of a toric surface with a curvature in a lateral direction greater than a curvature in a longitudinal direction along at least a principal meridian or a vertical reference line passing through a fitting point, and
the object-side surface and the eye-side surface include elements of a toric surface which cancel shifts in the surface power by the elements of the toric surface.

7. The progressive power lens according to claim 6, wherein the object-side surface is a toric surface.

8. A progressive power lens for spectacles that has a distance portion and a near portion of different powers,
wherein, when a surface power in a horizontal direction of the distance portion on an object-side surface along a principal meridian or a vertical reference line passing through a fitting point is OHPf, a surface power in a vertical direction is OVPf, a surface power in a horizontal direction of the near portion is OHPn, and a surface power in a vertical direction is OVPn,
the object-side surface includes elements of a toric surface with the surface power OHPf in the horizontal direction of the distance portion greater than the surface power OVPf in the vertical direction of the distance portion, and
an eye-side surface along the principal meridian or the vertical reference line includes elements that cancel shifts in the surface power by the elements of the toric surface on the object-side surface, and satisfy the following conditions:

$$OHPf+OHPn>OVPf+OVPn$$

$$OVPn>OVPf.$$

9. The progressive power lens according to claim 8, wherein a surface power IHPf in a horizontal direction and a surface power IVPf in a vertical direction of the distance portion on the eye-side surface along the principal meridian or the vertical reference line, and a surface power IHPn in a horizontal direction and a surface power IVPn in a vertical direction of the near portion satisfy the following conditions:

$$OHPf-OVPf=IHPf-IVPf$$

$$OHPn-OVPn=IHPn-IVPn$$

where, a prescription for astigmatism is not included, the surface powers IHPf, IVPf, IHPn, and IVPn are absolute values.

10. The progressive power lens according to claim 9, wherein a surface power IHPf in a horizontal direction and a surface power IVPf in a vertical direction of the distance portion on the eye-side surface along the principal meridian or the vertical reference line, and a surface power IHPn in a horizontal direction and a surface power IVPn in a vertical direction of the near portion satisfy the following conditions:

$$IHPf-IVPf=OHPf/(1-t/n*OHPf)-OVPf/(1-t/n*OVPf)$$

$$IHPn-IVPn=HPn/(1-t/n*OHPn)-OVPn/(1-t/n*OVPn)$$

where, t is the thickness (unit meter) of the progressive power lens, n is the refractive index of a base material of the progressive power lens, the surface powers IHPf, IVPf, IHPn, and IVPn are absolute values, and a prescription for astigmatism is not included.

11. The progressive power lens according to claim 10, wherein the following condition is further satisfied OHPn>OVPn.

12. The progressive power lens according to claim 11, wherein the following conditions are further satisfied:

$$IHPf>IVPf$$

$$IHPn>IVPn$$

$$IHPf>IHPn.$$

13. The progressive power lens according to claim 12, wherein the following conditions are further satisfied:

$$OHPf=OHPn$$

$$IVPf=IVPn.$$

14. The progressive power lens according to claim 10, wherein the conditions are satisfied within a range of at least ±10 mm with the principal meridian or the vertical reference line interposed.

15. A progressive power lens for spectacles that has a distance portion and a near portion of different powers,
wherein, when a surface power in a horizontal direction of the distance portion on an object-side surface along a principal meridian or a vertical reference line passing through a fitting point is OHPf, a surface power in a vertical direction is OVPf, a surface power in a horizontal direction of the near portion on the object-side surface along the principal meridian or the vertical reference line is OHPn, a surface power in a vertical direction is OVPn, a surface power in a vertical direction of the distance portion on an eye-side surface along the principal meridian or the vertical reference line is IVPf, and a surface power in a vertical direction of the near portion is IVPn, the object-side surface includes elements of a toric surface with a surface power OHPf in a horizontal direction of the distance portion on the object-side surface greater than a surface power OVPf in a vertical direction of the distance portion on the object-side surface and a surface power OHPn in a horizontal direction of the near portion on the object-side surface greater than a surface power OVPn in a vertical direction of the near portion on the object-side surface, and the eye-side surface along the principal meridian or the vertical reference line includes elements that cancel shifts in the surface power by the elements of the toric surface on the object-side surface, and satisfies the following conditions :

$OVPf > OVPn$ $IVPf - IVPn > OVPf - OVPn$ where, the surface powers IVPf and IVPn are absolute values.

16. The progressive power lens according to 15,
wherein a surface power IHPf in the horizontal direction of the distance portion on the eye-side surface along the principal meridian or the vertical reference line, and a surface power IHPn in the horizontal direction and a surface power IVPn in the vertical direction of the near portion satisfy the following conditions:

$OHPf - OVPf = IHPf - IVPf$ $OHPn - OVPn = IHPn - IVPn$ where, a prescription for astigmatism is not included, and the surface powers IHPf and IHPn are absolute values.

17. The progressive power lens according to claim 16,
wherein a surface power IHPf in the horizontal direction and a surface power IVPf in the vertical direction of the distance portion on the eye-side surface along the principal meridian or the vertical reference line, and a surface power IHPn in the horizontal direction and a surface power IVPn in the vertical direction of the near portion satisfy the following conditions:

$IHPf - IVPf = HPf/(1 - t/n \times OHPf) - OVPf/(1 - t/n \times OVPf)$ $IHPn - IVPn = HPn/(1 - t/n \times OHPn) - OVPn/(1 - t/n \times OVPn)$ where, t is the thickness (unit meter) of the progressive power lens, n is the refractive index of a base material of the progressive power lens, the surface powers IHPf, IVPf, IHPn, and IVPn are absolute values, and a prescription for astigmatism is not included.

18. The progressive power lens according to claim 17,
wherein the following conditions are further satisfied:

$IHPf > IVPf$ $IHPn > IVPn$ $IHPf > IHPn.$

19. The progressive power lens according to claim 18,
wherein the following condition is further satisfied OHPf–OHPn.

20. The progressive power lens according to claim 17,
wherein the conditions are satisfied within a range of at least ±10 mm with the principal meridian or the vertical reference line interposed.

* * * * *